(12) United States Patent
Georgiev

(10) Patent No.: US 7,552,122 B1
(45) Date of Patent: Jun. 23, 2009

(54) METHODS AND APPARATUS FACILITATING ACCESS TO STORAGE AMONG MULTIPLE COMPUTERS

(75) Inventor: Ivan I. Georgiev, Sofia (BG)

(73) Assignee: Sanbolic, Inc., Watertown, MA (US)

( * ) Notice: Subject to any disclaimer, the term of this patent is extended or adjusted under 35 U.S.C. 154(b) by 323 days.

(21) Appl. No.: 11/115,098

(22) Filed: Apr. 26, 2005

Related U.S. Application Data

(60) Provisional application No. 60/576,082, filed on Jun. 1, 2004.

(51) Int. Cl.
*G06F 17/30* (2006.01)
(52) U.S. Cl. .................................. 707/9; 726/1; 709/213
(58) Field of Classification Search ................... 707/8, 707/9, 100; 726/1; 709/213
See application file for complete search history.

(56) References Cited

U.S. PATENT DOCUMENTS 5,806,065 A * 9/1998 Lomet ............................ 707/8

2004/0034642 A1 * 2/2004 Szilagyi et al. ............. 707/100
2006/0004758 A1 * 1/2006 Teng et al. ..................... 707/9

* cited by examiner

*Primary Examiner*—Khanh B Pham
*Assistant Examiner*—Ann J Chempakaseril
(74) *Attorney, Agent, or Firm*—Chapin IP Law, LLC; Paul P. Kriz, Esq.

(57) ABSTRACT

Multiple computers in a cluster maintain respective sets of identifiers of neighbor computers in the cluster for each of multiple named resource. A combination of the respective sets of identifiers define a respective tree formed by the respective sets of identifiers for a respective named resource in the set of named resources. Upon origination and detection of a request at a given computer in the cluster, a given computer forwards the request from the given computer over a network to successive computers in the hierarchical tree leading to the computers relevant in handling the request based on use of identifiers of neighbor computers. Thus, a combination of identifiers of neighbor computers identify potential paths to related computers in the tree.

23 Claims, 44 Drawing Sheets

METHODS AND APPARATUS FACILITATING ACCESS TO STORAGE AMONG MULTIPLE COMPUTERS

RELATED APPLICATIONS

This application claims the benefit of U.S. Provisional Application No. 60/576,082 entitled "METHODS AND APPARATUS SUPPORTING SHARED USE OF STORAGE," filed on Jun. 1, 2004, the entire teachings of which are incorporated herein by this reference. This application is also related to:

i) co-pending U.S. patent application Ser. No. 11/114,905 entitled "METHODS AND APPARATUS FACILITATING ACCESS TO SHARED STORAGE AMONG MULTIPLE COMPUTERS," describing functionality associated with transaction management, ii) co-pending U.S. patent application Ser. No. 11/115,041 entitled "METHODS AND APPARATUS FOR SHARED STORAGE JOURNALING," describing functionality associated with journaling, iii) co-pending U.S. patent application Ser. No. 11/114,943 entitled "METHODS AND APPARATUS FACILITATING VOLUME MANAGEMENT," describing functionality associated with volume management, iv) co-pending U.S. patent application Ser. No. 11/114,913 entitled "METHODS AND APPARATUS FACILITATING ACCESS TO SHARED STORAGE AMONG MULTIPLE COMPUTERS," describing functionality associated with cluster management, all of which have been filed on the same date as the present application, the entire teachings of which are also incorporated herein by this reference.

BACKGROUND

In certain conventional applications, computer systems sometimes include one or more processors and corresponding software that supports access to corresponding externally attached storage. For example, according to certain conventional applications, multiple computers may couple and communicate to a common shared storage system that stores large volumes of data. Depending on access configuration information, two or more of the computers may be afforded access to the same files stored in the shared storage system.

To prevent file corruption, conventional applications supporting access to the shared storage typically employ some means for preventing two or more users from modifying the same file at the same time. Otherwise, the two or more computers having write access to a given file in the shared storage system may simultaneously access and modify the same file. For example, one user may modify the given file with a first set of changes. Another user may attempt modify the given file with a second set of changes. Without an accounting for each user's changes, some of the changes to the given file may be lost when the users eventually store the modified file back to the shared storage system. It is quite possible in such applications that the latter user writing the file to storage may overwrite changes by the first user storing the file to storage. Thus, simultaneous access to the same file in storage is sometimes avoided altogether.

There exist conventional techniques to enable multiple users to work on the same file in a storage system without corruption. For example, according to one conventional application, each of multiple computers couple to a server device that, in turn, selectively provides access to a corresponding storage system. While a first user at a corresponding computer modifies a file in the storage system, the server device prevents other users from accessing (both reading and writing to) the same file to prevent two different users from simultaneously modifying the same file or one user to read stale data. After the first user completes any modifications and updates to the file in the storage device, the server device may allow another user to access the file in the storage system. Thus, the server device prevents corruption of shared files in the storage system by restricting access to any files presently being modified by other users. In other words, only one user is allowed to access and modify a file at a time. There also exist conventional techniques for allowing multiple computers shared access which shared access is devoted only to reading the file, and thus allows no corruption. Whenever some of the computers need to modify the file, the server device revokes the shared access from the other computers and grants write access to the requesting computer ensuring no computer keeps stale file contents.

SUMMARY

Conventional computer applications that support access to files in a shared storage system via a dedicated server device suffer from a number of deficiencies.

As discussed above, one method of supporting shared access to storage involves use of a centralized arbiter such as a server device attached to the shared storage to prevent data corruption. During operation, the server device receives requests for access from the computers and grants permission to the computers such that no two computers have conflicting access to the same location at the same time. Unfortunately, use of a server device to arbitrate access has drawbacks. For example, use of the central arbiter such as a server to grant access rights can create a bottleneck limiting access when the server has too many requests to handle at the same time. The requirement that every access to the storage must be preceded and followed by client-server communication also reduces the performance of the cluster. The server also presents a single point of failure since without server none of the clients can access the storage. Thus, this technique of granting access rights can be inefficient.

In contradistinction to conventional methods, embodiments of the invention enable computers to compete, communicate, and coordinate amongst each other for access to shared storage without the need for a server. There is no strict dependence on a statically located, centralized arbiter that handles all requests for access to the shared storage. Instead, computers in a cluster negotiate and grant permission amongst each other for access to specific regions of the shared storage based on formation of hierarchical trees of computers in the cluster.

Embodiments of the invention as described herein can be implemented to support network environments in which multiple computers form a cluster and have access to a volume in a SAN (Storage Area Network). Use of locking operations and clustering techniques herein (and as described in related applications) enables users to easily manage networked storage as a single pool of data, greatly reducing complexity and giving users much more flexibility in how the users can access their data. One embodiment of the invention has been designed to support multiple operating systems and storage hardware platforms in a wide variety of complex environments demanding very high reliability. Thus, users at the different computers are not limited to using a specific operating system to share editing of a file (or parts thereof) in storage. Embodiments of the invention therefore significantly overcome the aforementioned and other deficiencies of conventional network management applications in which only one computer in a cluster can modify a file at any given time.

According to an embodiment of the invention, a cluster is set of computers that have common access to a shared resource at the same time. The computers in a cluster are able to communicate directly with each other. The cluster-wide shared resource is logically broken into many fine-grained abstract shared resources. Each resource is assigned a name from a cluster-wide namespace. In one embodiment of the invention, this namespace comprises 2^128 names, inhabited with the first 2^128 ordinals. The oplock manager assigns access right for each named shared resource to every computer in the cluster. The access right is one of none, shared or exclusive. For a single named resource, all of the computers are assigned non-conflicting access rights in the following sense: exclusive access at one computer conflicts with shared or exclusive access at any other computer. Upon request, the oplock manager can change the access assigned to the computers in the cluster for specific named shared resources. To accomplish this task, the oplock manager maintains a "per-computer state" for each shared named resource. The oplock manager groups the identical state of shared resources named by successive ordinals to reduce memory consumption. The oplock manager at each computer reacts to changes in the cluster by updating the affected states it maintains for the shared resources throughout the new cluster in order to continue providing access changes to requesting computers.

The per-computer state of named shared resource further includes set of identifiers of computers that need to be queried in order to increase a computer access to the particular shared resource named neighbors of the computer for that shared resource. The neighborhood relation defines a tree within the cluster for every shared resource. Trees are rooted by defining additional leadership relation: for the state of given named shared resource at most one of the neighbors is chosen to be leader and no two neighbors are mutual leaders. At most, one computer can have no leader.

Computers having "none" access (e.g., no access) to a named shared resource have one neighbor in the same state. Computers having shared access to a named shared resource each can have a limited number of neighbors in the same corresponding state. Computer having exclusive access to a named shared resource have no neighbors in its corresponding state.

According to one embodiment, the oplock techniques herein provide two access patterns: one for reading and one for writing. While granting read (shared in our own terminology) access to some computer in the cluster, it has provided that no other computer has write (exclusive) access to the corresponding resource. On the other hand it can also grant write access to computer, and does this only after ensuring that all other computers have no access (neither shared nor exclusive access rights). Computers can still have shared access to the storage (because hardware configuration allows them)—and shared here means that they have the opportunity to simultaneously read and write. simultaneously, whether they are going to use it does not depend on the oplock.

One innovation discussed herein pertains to providing locking without need for server in the environment of failing computers and connections. This is achieved in an efficient (as communication and memory usage) way by adapting to usage patterns as to not disturb computers that at the time are not interested in particular shared resource.

According to one embodiment, the oplock protocol does not impose restrictions on the use of shared storage. It only helps its users synchronize their use of certain user-understandable shared resources. That is, the oplock protocol provides a state (one of NONE, SHRD, EXCL) for fictitious (for the oplock) resources. Additionally, oplock allows users to ask for SHRD or EXCL state for some resource, and be notified when they have been granted such rights. Via this technique, the oplock methods provide information about the state of the same resource (or at least same resource name—the name<-> as resource relation is not controlled by the oplock) at the other computers. For example, if one computer has EXCL state for some resource name, all other computers will have NONE state for the same resource name. If a computer in a cluster has SHRD—no other computer in the cluster will have EXCL for the same shared storage resource name. The oplock does not know the resources, it knows their names only. This allows oplock users to maintain caches of shared storage so that they are consistent amongst themselves. Accordingly, modifications at one computer are visible to others that they request such information. As discussed, a particular embodiment of the invention includes mechanisms and techniques for enabling multiple computers in a cluster to have concurrent shared access or enabling a single computer to have exclusive access to a region of the shared storage system. Each computer in the cluster executes an application that interfaces to a transaction manager application to coordinate access to shared storage locations (such as a volume or portions thereof) in a storage system. The transaction managers at each of the multiple computers utilize a unified address space that maps locations in the storage system to corresponding access properties maintained by respective oplock managers in the computers. The access properties (e.g., byte properties) indicate an access status associated with different regions or locations (potentially down to a byte granularity) in the shared storage system. In one embodiment, the access properties associated with the unified address spaces are stored locally at each computer in a given cluster so that different computers in a cluster reference the same storage area based on use of common addresses in the unified address space.

In further embodiments, the object-based opportunistic locking file system application and transaction manager as described herein can be used in enterprise and high performance storage environments. As discussed in related applications, the file system application herein also supports journaling for fast recovery, advanced locking mechanisms for file sharing, innovative design for fast access to files, complete SAN-NAS integration, maintenance of computers included in a cluster, etc. Thus, the opportunistic lock techniques herein can be used in conjunction with other applications such as the transaction manager, journaling, and cluster manager application, etc. as discussed in related applications to achieve this end.

More general embodiments of the invention include a technique of facilitating a transfer of access rights to regions of a shared storage system amongst multiple computers in a cluster.

An embodiment of the invention may impose a limit on the size of the neighbors set for a named shared resource, otherwise the set of a specific computer may grow to a number proportional to the number of computers in the cluster. A saturation technique, described further below allows the protocol to operate with smaller sets. The minimum size of such a set is two elements—that is, the set must be capable of storing zero, one or two pointers, although for reasonable performance, larger sets can be used such as over two pointers. In one embodiment of the invention, sets are capable of storing up to four pointers.

For example, multiple computers in a cluster maintain corresponding neighbor sets containing pointers identifying other computers in the cluster. A combination of the pointers contained in the sets amongst the computers pointing from one computer to another computer in the cluster form a hierarchical tree of computers having a root computer. Upon origination and detection of a request at a given computer in the cluster, the given computer sends the request to one or more of the computers stored in its neighbor set. The request is forwarded by receiving computers to other computers stored in their neighbor sets until every computer that has access that conflict with the request gets notified. When ready, computers transfer their access by either sending confirmation messages back to the tree, or directly to the requesting computer. These messages transform the tree, so that future requests will not have to be passed to irrelevant computers, thus improving performance. The tree is transformed by changing the neighbor sets holding pointers to other computers in the sending and receiving computer.

Upon receipt of the forwarded request, a computer capable of satisfying it, determines whether to relinquish its current access rights (if it needs to do so prior to granting the request) to the region of shared storage in favor of a computer requesting corresponding access rights. A computer that needs access, attaches priority to it. If the request has a higher associated priority than the priority with which the asked computer uses conflicting access, the receiving computer transfers access rights in the region of shared storage to the given computer. In response to the given computer obtaining access rights in the associated region, the computers in the cluster coordinate amongst themselves and update contents of the corresponding neighbor sets of computers in the cluster so that the given computer becomes reachable via these neighbor sets by all other computers. Thus, upon further requests by one or multiple other computers in the cluster for access to the region in shared storage, the corresponding computers in the cluster can appropriately forward such requests via use of pointers in the corresponding neighbor sets to the computers having current access rights (either shared or exclusive) in the region. So, in certain cases, forwarded messages are handled prior to being received at the root computer. In other embodiments, a computer between the requesting computer and a root computer of the cluster handles the request on behalf of the requesting computer.

In one embodiment, a type of current access rights associated with a given computer prior to originating the request is either: a.) shared rights in which the given computer has concurrent access with at least one other of the multiple computers in the cluster to the region of the shared storage system, or b.) none (e.g., no rights) in which the given computer has no current access rights to the region of the shared storage system. The type of access rights to the region associated with the given computer after obtaining the access rights to the region is either: c.) exclusive rights in which the given computer in the cluster has sole access rights for accessing the region of the shared storage system, or d.) shared rights in which the given computer has concurrent access with at least one other of the multiple computers in the cluster to the region of the shared storage system. In other words, the given computer may currently have shared access rights but request exclusive rights over the region. Alternatively, the given computer may have no access rights in the region and request either shared or exclusive access rights in the region.

New computers can join a current cluster having access to a volume in the shared storage. As the new computers join the cluster, they become part of the hierarchical tree by updating the neighbor sets of pointers in the computers. For example, adding a new member to the tree can involve adding a pointer to the neighbor set of the newly joining member (e.g., computer) so that the new member points to an existing member of the hierarchical tree. Thus, the hierarchical tree grows as new members join the cluster. On the other hand, the hierarchical tree shrinks as members leave the cluster. That is, the neighbor sets in the computers are updated when a member leaves so that there are no disconnections in the tree. The new members attach to arbitrary existing members of the cluster.

In a case when the new member of the cluster requests shared access to the region in shared storage and the particular computer to which the new member is attached presently has no access to a corresponding region in the shared storage system, the particular computer redirects the request to another computer in the cluster based on use of a pointer in the neighbor set of the particular computer. This process repeats itself from computer to computer until the request arrives at computer in the cluster that can grant it.

According to another embodiment, a first computer joining a cluster is given exclusive access to the region of the shared storage system. For successive computers joining the cluster after the first computer, the newly added members of the cluster are initially provided no access rights to the region of the shared storage system. The new members must communicate with the current members for access rights. This prevents access conflicts between existing members of the cluster and newly added members of the cluster that become part of the hierarchical tree.

In one embodiment, the computers associated with the hierarchical tree maintain a different number of pointers in corresponding neighbor sets depending on an access right status associated with the computers. For example, a neighbor set of a corresponding computer in the cluster having no access to the region includes only one pointer to another computer in the hierarchy. A neighbor set of a corresponding computer in the cluster having shared access to the region includes one or more pointers to other computers that also have shared access in the hierarchy. A neighbor set of a corresponding computer in the cluster having exclusive access to the region has no pointers to other computers in the cluster because it does not need to communicate to any other computer in the cluster as it can not increase its access any more. The shared scenario has a root too, it's still with shared access, and does have non-empty neighbor set.

Note that the technique of creating a hierarchy for access to a region in the shared storage can be duplicated for purposes of maintaining a hierarchy for each of multiple different regions of the shared storage. For example, a given computer in a cluster can maintain multiple neighbor sets of pointers for corresponding multiple regions of the shared storage system and respective hierarchical trees. The given computer utilizes respective pointers stored in the multiple neighbor sets at the given computer to forward access requests to different corresponding computers in the cluster having access to the multiple regions of the shared storage system. Based on this technique, the given computer can request access to different regions of the shared storage. In one embodiment, not every message or request gets forwarded to root. Forwards go up until a 'competent' computer is reached—if shared access is needed, the forwarding stops at the first computer with shared access, as it has the authority to grant shared access to other computers. If some computer has exclusive access, it is the only one with any access, and then it is the only one that can grant access, and it can grant everything—shared and exclusive.

In one embodiment, the root computer receiving a request for access from another computer determines whether to relinquish rights in the region to the requesting computer. For example, in furtherance of the above discussion, the root computer in the hierarchical tree receives a request for access to the region. The root computer then compares a first priority value associated with the given computer and the request to a second priority value associated with the root computer to determine whether the root computer will relinquish access rights in the region to the given computer. In one embodiment, the first priority value and second priority value are based at least in part on a time associated with when the given computer and the root computer initially requested access to the region. In other words, in one embodiment, times associated with when the given computer and root computer request access to the region are compared to determine whether the given computer shall be granted the request. A concept of cluster time is discussed in related applications.

If the first priority value and the second priority value are equal, the root computer additionally compares an identifier associated with the given computer to an identifier associated with the root computer to determine whether to grant the given computer access rights to the region in lieu of the root computer.

In one embodiment, a computer in the cluster intercepts the request for access transmitted over a network. The intercepting computer, on behalf of the given computer generating the request, initiates consolidation of access rights in the region among other computers in the cluster to the particular computer. The intercepting computer then passes obtained access rights (e.g., exclusive access rights obtained from a previously existing shared access rights among multiple computers) in the region to the given computer requesting the access rights. In this way, a computer with no access rights can rely on another computer in the cluster to initiate "drainage" and "passing" of access rights over to the computer previously having no access rights.

The hierarchical tree is susceptible to being broken as a result of a computer failing in the cluster. To preserve continuity of the tree, an embodiment of the invention fixes the links such that the hierarchical tree is whole again when a member computer of the hierarchical tree fails. For example, a member of the cluster can detect a broken link in the hierarchical tree based on a failed computer in the cluster of computers forming the hierarchical tree. In response to detecting the failed member, the member of the cluster initiates a routine to repair the hierarchical tree to be whole again by reconnecting separated portions of the hierarchical tree produced by the broken link. The repair process includes modifying pointers in the neighbor sets of at least some of the computers in the cluster so that the hierarchy is whole again without any broken links.

In one embodiment, the tree exists in order to state which computers have to serve one computer's requests, thus avoiding (or at least reducing) communication with unrelated computers, so if several computers compete for shared and exclusive access over some shared resource, only these computers will communicate with each other. And in the case where several computers have shared access, it is not the root computer that is enough to ask for exclusive access, the request is forwarded (sometimes after being edited) in a way as to reach every computer that has at this time shared access, so these computers, after being notified, drop their access rights. Thus, the root computer need not always be central to usage of a respective tree. In other embodiments, each computer in the cluster contributes to facilitating a transfer of access rights. For example, in a given computer which is one of multiple computers in a cluster potentially having access to a shared storage system, an embodiment of the invention involves: i) maintaining a neighbor set for storing pointers identifying other computers in the cluster, the neighbor set at least partly defining a hierarchical tree formed by the multiple computers in the cluster, ii) at the given computer, receiving a request for permission to access a region of the shared storage system, and iii) in response to receiving the request, forwarding the request from the given computer over a network to a successive computer in the hierarchical tree as identified by a pointer in the neighbor set in order to acquire access rights to the region of the shared storage system.

In furtherance of the above embodiment, maintaining the neighbor set in the given computer of the cluster includes storing a first pointer in the neighbor set identifying the successive computer in the cluster known to be part of a path to a root computer in the hierarchical tree having access rights in the region. The successive computer that receives the forwarded request from the given computer also includes a neighbor set for storing pointers to another successive computer in the hierarchical tree in which to forward the request toward the root computer. Thus, a requesting computer can follow a distributed hierarchical tree to find a root computer at highest level of the tree (or multiple root computers at the highest set of levels of the tree if talking about multiple computers with shared access, that case still has single root. The fact that one of them is a root is a bit of useless history during normal operation. But recovery needs it: the root has different task then, and during recovery, multiple roots may actually arise) to identify a current owner or owners of access rights to the region.

Each computer in the cluster stores information associated with access rights to each named shared shared resource. For example, in one embodiment, each computer maintains an object associated with access right of a corresponding region of the shared storage system. The object includes: i) a record of requests for access to the region by the given computer, ii) pending requests by other computers in the cluster for access rights to the region of the shared storage system, iii) access rights, currently granted to the computer for that region, iv) neighbor set containing other computers in the cluster, which the computer can consult in order to increase its own access, or to handle some other computer's request for access, v) one computer from the neighbors set may be denoted as leader computer. The given computer utilizes contents of the object to identify a current status of requested access rights.

In another embodiment, a given computer in the cluster maintains an object for the region of the shared storage system. The object includes at least one of: i) identification of a range of addresses associated with the region of the shared storage system, ii) identifiers of at least one computer in the cluster that has current access rights to the range, and iii) a type of current access rights associated with the given computer with respect to the region. Each computer in the hierarchy stores objects associated with corresponding ranges or regions of shared storage. The information in the objects can be modified and objects themselves can be copied to accommodate access to new ranges in the shared storage. For example, a given computer in the cluster maintains a first object including access right information associated with a first region in shared storage. The access right information includes identification of a range of addresses associated with the first region. The computer receives an indication for access to a new range that is different than the range of addresses associated with the first region. For example, the computer receives a request for access to a sub-portion of the range associated with the first object. The computer initiates a routine to split the range into appropriate subparts in order to maintain access rights associated with each of the ranges such as the new range and a leftover portion of the original first range not carved out by the new range. The routine for establishing an object for the new range includes copying contents of the first object to produce a second object. The second object is then modified for maintaining access right information associated with the new range while the first object is used to modify and maintain information associated with a balance of the original range. The computer maintaining the second object modifies the access right status information in the second object to reflect a status of access rights associated with the new range. Based on this technique of cloning and maintaining and modifying objects, the computer can track access right information associated with different ranges of the shared storage.

A type of current access rights associated with a computer in the cluster can be one of: a.) exclusive rights in which the given computer in the cluster has sole access rights for accessing the region of the shared storage system, b.) shared rights in which the given computer has concurrent access with at least one other of the multiple computers in the cluster to the region of the shared storage system, or c.) none in which the given computer has no current access rights to the region of the shared storage system.

A computer in the hierarchical tree can limit the number of pointers in the neighbor set to a specified amount such as two. In one embodiment, each of the pointers in a given neighbor set corresponds to a direct association or link in the hierarchical tree between the corresponding computer maintaining the neighbor set and another computer in the hierarchical tree. At most one direct association created by a pointer in the neighbor set is at least part of a path to a root computer in the cluster having access rights (probably shared with other computers) to the region as previously discussed.

Receiving Exclusive Access

In response to forwarding a request, a given computer can be granted exclusive access rights to a region of the shared storage. In response to receipt of exclusive access rights, the given computer updates its neighbor set to include no pointers to other computers in the cluster. That is, the given computer now has no pointers to other computers in the cluster because no other member of the cluster can help it gaining additional access, as it has the maximum possible access. Note that when computers have shared access, one of them is still the root, but it does have pointers to some of the other shared owners. Thus, being a root computer in a cluster does not induce an empty neighbor set. And, unless recovery is being implemented, there is no need for the neighbors set to have distinguished root)

Priority

A determination of which computer to grant access rights among competing computers in a cluster can depend on a comparison of priority metrics associated with members of the cluster. For example, a given computer in a cluster maintains a corresponding priority metric that is used to determine which of multiple computers in the cluster competing for access to the region will be granted access rights. The corresponding priority metric includes a first priority metric based on whatever oplock users seems fit such as a time of when a given computer generates a request for access rights. Older requests are generally given higher priority than younger requests. A second, backup priority metric is an identifier assigned to the given computer when entering the cluster. The second priority metric is used as a backup or tiebreaker when competing computers have the same priority with respect to the first priority metric.

As discussed, techniques of the invention are well suited for use in applications in which multiple computers in a networked computer system communicate (e.g., arbitrate negotiate, coordinate, compete, etc.) amongst each other to coordinate access to the same regions of shared storage. The distributed tree structure according to one embodiment reduces a requirement for communications because the tree itself stores a partial history of access rights among the computers in a network. It should be noted, however, that embodiments of the invention are well suited for applications other than those discussed above and thus are not limited to such use.

One embodiment of the invention includes one or multiple computerized devices (e.g., a host computer, workstation, etc.) configured to support the aforementioned method operations disclosed herein as embodiments of the invention to access shared storage. In such an embodiment and related embodiments, a computerized device includes a display, a memory system, a processor (e.g., a processing device) and an interconnect (e.g., electronic circuitry such as a data bus, data transfer circuit, etc.). The interconnect supports local communications among the display, the processor and the memory system. The computerized device also includes a network interface supporting communications with other computers. The memory system is encoded with a corresponding opportunistic locks manager application that, when executed on the processor, produces an opportunistic lock (e.g., OpLock) manager process. The opportunistic lock manager application as well as other related functions support all of the method embodiments and operations explained herein as embodiment of the invention.

Yet other embodiments of the invention disclosed herein include software programs to perform the method embodiment and operations summarized above and as further disclosed in detail below under the heading Detailed Description of Preferred Embodiments. More particularly, a computer program product (e.g., a computer-readable medium) including computer program logic encoded thereon may be executed on a computerized device to support operations as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention.

One embodiment of the invention is directed to a computer program product that includes a computer readable medium having instructions stored thereon for supporting management of network resources among multiple computers. The instructions, when carried out by a processor of the first data communication device, cause the processor to perform the steps of: i) maintaining a neighbor set for storing pointers identifying at other computers in the cluster, the neighbor set at least partly defining a hierarchical tree formed by the multiple computers in the cluster; ii) at the given computer, receiving a request for permission to access a region of the shared storage system; and iii) in response to receiving the request, granting, denying or sending additional requests from the given computer over a network to a successive computers in the hierarchical tree as identified by pointer(s)

in the neighbor set in order to acquire access rights to the region of the shared storage system, iv) communicating with other members of the cluster, not only those mentioned in its neighbor set when the tree needs to be recovered. Other arrangements of embodiments of the invention that are disclosed herein include software programs to perform any of the method embodiment steps and operations summarized above and disclosed in detail below.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

One embodiment of the invention involves facilitating a transfer of access rights to regions of a shared storage system amongst multiple computers in a cluster. For example, multiple computers in a cluster maintain corresponding neighbor sets for storing pointers identifying other computers in the cluster. A combination of the pointers stored in the neighbor sets amongst the computers pointing from one computer to another computer in the cluster form a hierarchical tree of computers having a root computer (or a set multiple root computers at uppermost levels of the tree). Upon origination and detection of a request at a given computer in the cluster, the given computer forwards the request from the given computer over a network to successive computers in the cluster leading to the computers having conflicting access in the hierarchical tree based on use of pointers in the neighbor sets.

As discussed, each computer in the cluster has a neighbor set storing pointers. The pointers identify paths to all other computers that have current access. The pointers also identify a potential path to an uppermost computer or higher computers in the tree. For example, a first computer includes a pointer identifying a second computer in the tree. The second computer includes a pointer to a third pointer in a tree, and so on. A computer in the chain eventually points to the root computer. If some computer have more than one pointer to other computers (stored in its neighbor set), and this computer is not root computer, one of is pointers—the one that leads (either directly, or indirectly) to the root computer—is marked, so if that computer needs to send message to its root, it will send via the marked pointer. The marked computer is called a leader of the computer. For non-root computer that have exactly one pointer to another computer, that other computer is its leader. In one embodiment, the tree is distributed to the extent that each computer stores a neighbor set of pointers associated with the structure of the tree. One or more computers (including the root computer) have current access rights to a specific region of shared storage for a corresponding hierarchical tree. Thus, according to an embodiment of the invention, the computers in the cluster that have no access, forward a request to their leader computers, which forwarding is guaranteed to reach computer having access rights. The forwarding is based on pointers or identifiers in the neighbor sets of the computers in the cluster.

Figure 1:
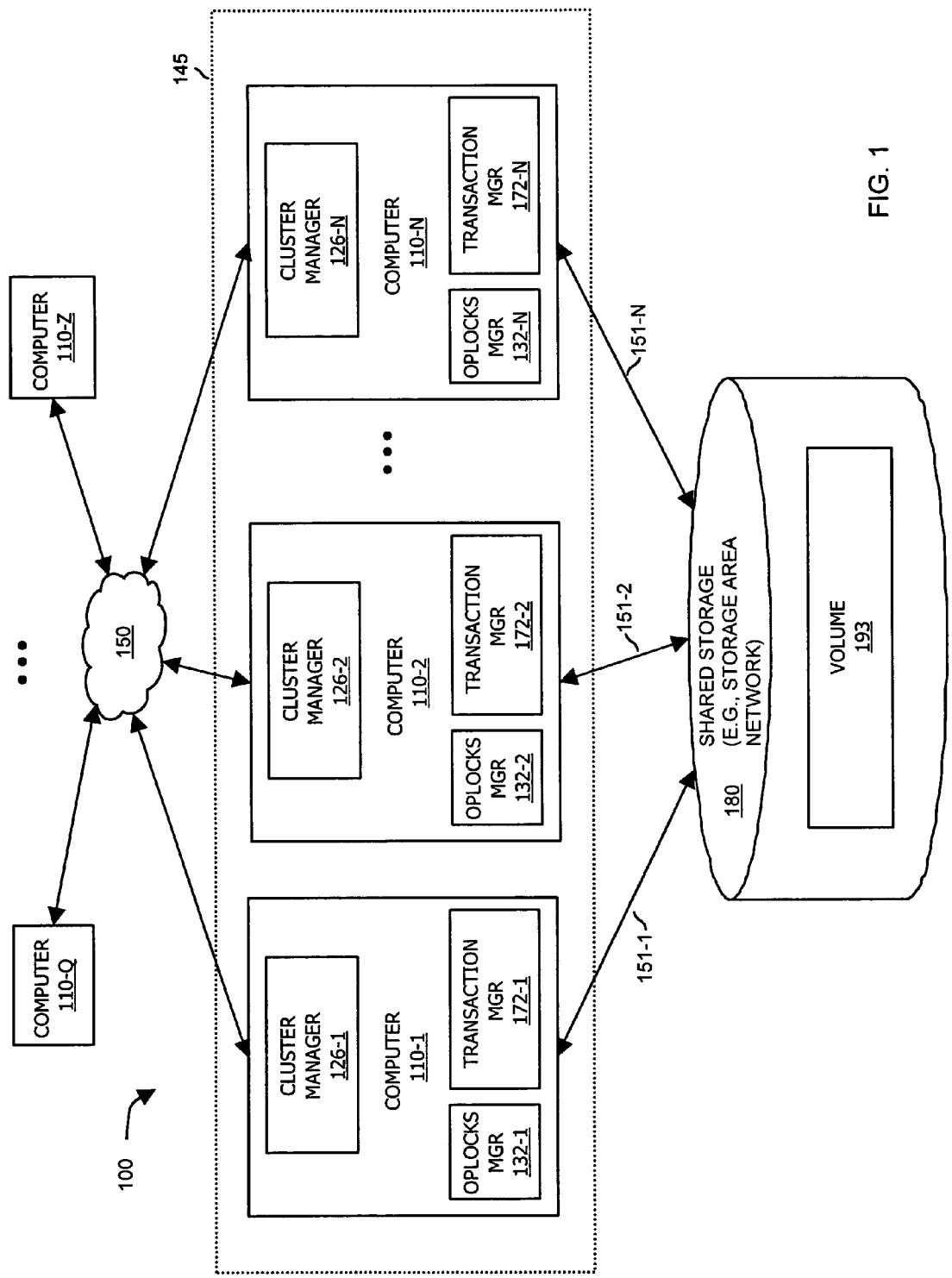
FIG. 1 is a block diagram of a shared storage system architecture according to an embodiment of the invention.

FIG. 1 illustrates a system 100 (e.g., network environment) suitable for explaining an operation of example embodiments of the invention. As shown, system 100 includes a network 150, links 151-1, 151-2, . . . , 151-N (e.g., links independent of network 150 or links being part of network 150), cluster 145 including computers 110-1, 110-2, . . . , 110-N, (collectively, computers 110 or individually computer 110), and shared storage system 180. Each of the computers 110 in cluster 145 includes a respective cluster manager 126-1, 126-2, . . . , 126-N (e.g., a distributed software application), an oplocks manager 132-1, 132-2, . . . 132-N, a respective transaction manager 172-1, 172-2, . . . , 172-N, journal manager, etc. Functionality provided by the cluster manager 126, transaction manager 172, journal manager, etc. are discussed in related applications incorporated by reference.

In general, cluster managers 126 enable computers 110, in a distributed manner, to manage which computers 110 shall be maintained or included in a cluster 145. Shared storage system 180 includes regions (such as volume 193) accessible by computers 110 for retrieving and storing information. In one embodiment, the shared storage 180 includes one or more mechanical mechanisms to access disk media (e.g. spinning disk storage media) for storing digital information. Shared storage may also be configured as recording tape media and/or electrically addressable memory such as RAM, ROM, EEPROM, etc.

Computers 110 (which form cluster 145) communicate over network 150 (e.g., a TCP/IP network) to coordinate access to a region such as portions of volume 193 in the shared storage system 180. In one embodiment, each cluster 145 in system 100 can access or mount a common volume 193 in the shared storage 180. Thus, multiple remotely located computers 110 with respect to the shared storage 180 can access the volume 193 or parts thereof at the same time. System 100 can include multiple clusters, each having access to a different volume in shared storage 180. The transaction managers 172 manage respective transactions (such as reads and writes to shared storage 180) associated with each of the computers for address ranges in the unified address space.

The oplocks managers 132 maintain information regarding access rights to regions of a shared storage system 180 amongst multiple computers 110 in a cluster 145. For example, in one embodiment, the oplock managers 132 maintain corresponding neighbor sets for storing pointers identifying zero or more other computer 110 in the cluster. A combination of the pointers stored in the neighbor sets corresponding to given region amongst the computers pointing from one computer to another computer in the cluster 145 form a hierarchical tree of computers having a root computer. The mapping associated with the hierarchical tree enables the computers in the cluster more easily change access rights associated with which one or multiple computers has access to a particular region in shared storage 180.

In one embodiment, the shared storage 180 is a Storage Area Network (SAN) accessible by computers 110 via links 151. Links 151 from the computers 110 to the shared storage 180 provide a wide channel (e.g., a channel having high bandwidth) capable of transferring (in either direction) a large amount of data. However, even though a link 151 (e.g., fiber channel) itself may be quite fast, the actual latency associated with accessing data in the shared storage 180 can be quite long due to, at least in part, the time it takes to access a disk in the shared storage 180 storing the data of interest.

In one embodiment, some or all computers 110 in the cluster 145 have full read/write access to portions of the shared storage 180. As discussed, computer members of the cluster 145 synchronize among themselves in order to read/write to overlapping regions of the shared storage 180. In certain cases, cluster member computers 110 exchange information to support further data processing. The exchange of information typically occurs over a secondary channel or communication link (e.g., network 150 such as the Internet, Intranet, LAN, WAN, etc.) that is designated for exchanging commands and for data synchronization between machines (e.g., computers in a cluster). According to one embodiment, the communication link such as network 150 for communicating between computers in a cluster 145 is a TCP connection over Ethernet. Bandwidth associated with the TCP connection may be quite limited. However, such connections typically have a relatively low latency.

In one embodiment, system 100 includes computers 110 that form multiple different clusters, each of which has access to a corresponding volume in shared storage 180.

As discussed, a cluster 145 includes a set of computers 110, which cooperate with each other to access shared storage 180. In one embodiment, a cluster 145 in system 110 is built around a common shared storage system 180 that provides input data to be processed by computers in the cluster 145. Data processed and generated by the computers 110 in the cluster 145 is generally read from and thereafter written back to shared storage 180. Cache in computers 110 provide a local region to modify the contents retrieved from shared storage 180. The storage is divided into small cacheable portions. When such portion is in cache, reads or writes to that portion are redirected to the cache without waiting for disk 10. For each portion of the disk, a corresponding region is maintained by the Oplock managers on each computer. Reading some portion into cache is only allowed if the requesting computer has shared or exclusive access for the corresponding region. Modifying the cache is allowed only if the corresponding region at the requesting computer has exclusive access. If current access at the corresponding region is not sufficient for the required operation, the Oplock manager is asked to raise access at that region. The Oplock manager sends requesting messages via the network 150 using the neighbor set of pointers stored into that region. Receiving of these messages is handled using the corresponding region at the receiving computers. In this process, all computers, which corresponding regions keep conflicting access, get notified to decrease their access. Before the Oplock manager reduces exclusive access to shared, the cache of the corresponding portion at that computer is stored to disk. If a computer is asked to reduce shared access to none access, it discards its cache of the corresponding area. Such use of the Oplock protocol allows easy maintaining of cache coherency among multiple computers in a cluster by not only sequencing attempts to modify common portion of the shared storage 180, but by also ensuring that if some computer has cache over some such portion, that portion is in sync with the caches of the other computers.

For example if one computer decides to change the content of some portion of the disk, it has to gain exclusive access over its corresponding region. When the Oplock manager grants exclusive access to that computer, it's guaranteed that all other computers in the cluster have none access to the regions that correspond to the computers' cache of that same portion of the disk, thus all other computers have discarded their cache of that portion of the disk. Having exclusive access, that computer can read and write to its cache without communication with other cluster members and without disk access. If some other computer requests to read that portion of the disk, it will attempt to fetch it into its cache. But reading into cache is preceded by requesting shared access to the corresponding region. The Oplock manager, again using the pointers to other computers sends it request. The request reaches the computer that has exclusive access. That computer writes its cache to disk, reduces its access to shared, and also grants shared access to the requesting computer. Then the requesting computer fills its cache from the disk. As the reading is guaranteed to happen after the write (from the first computer), the reader will receive the last changes made by the first computer.

Accordingly, multiple computers 110 can retrieve a common portion of shared storage 180, modify the data locally in cache, and then write modified data back to the shared storage by competing amongst one another for exclusive access to the shared storage 180 via use of a distributed tree as will be discussed further. In this way, multiple computers 110 in a cluster 145 can virtually modify data in the shared storage 180 at the same time even though they have write access rights at different times. Portions of a modified file in caches of different computers 110 can be written to shared storage 180 so that multiple users can modify a file at the same time. Having multiple regions for different portions of storage allows multiple computers in the cluster to perform unrelated tasks without any need of communication, thus every computer has the chance to process its data at the full speed that the hardware allows, irrespective of the fact that it neighbors the storage with other computers in the cluster. For example if two or more computers in shared storage have the task of modifying their own files (all stored on the same shared storage), it may be possible for an implementation to grant each computer exclusive access to the regions that correspond to the needed files. If all these computers work only with these granted regions, there will be no communication, so no communication delays. The benefit of shared storage is that if some computer needs access to the file that another has just modified, it will have it with still small amount of communication. The distributed tree helps reduce this communication so overall load among the computers in the cluster is kept small.

Figure 2:
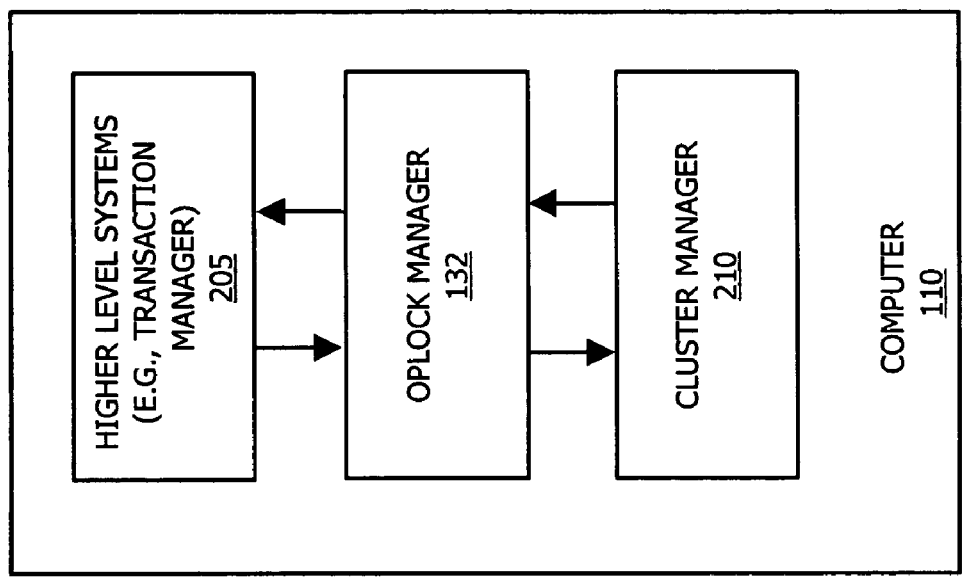
FIG. 2 is a block diagram of a computer including and oplock manager and related applications according to an embodiment of the invention.

FIG. 2 is a diagram, illustrating how the oplocks manager 132 relates to other applications in computer 110. For example, computer 110 also executes higher level systems 205 as well as cluster manager 210. Higher level systems 205 represent user applications that request access to particular regions of shared storage 180. The cluster manager 210 manages communications over network 150 to other computers 110 in cluster 145.

Figure 3:
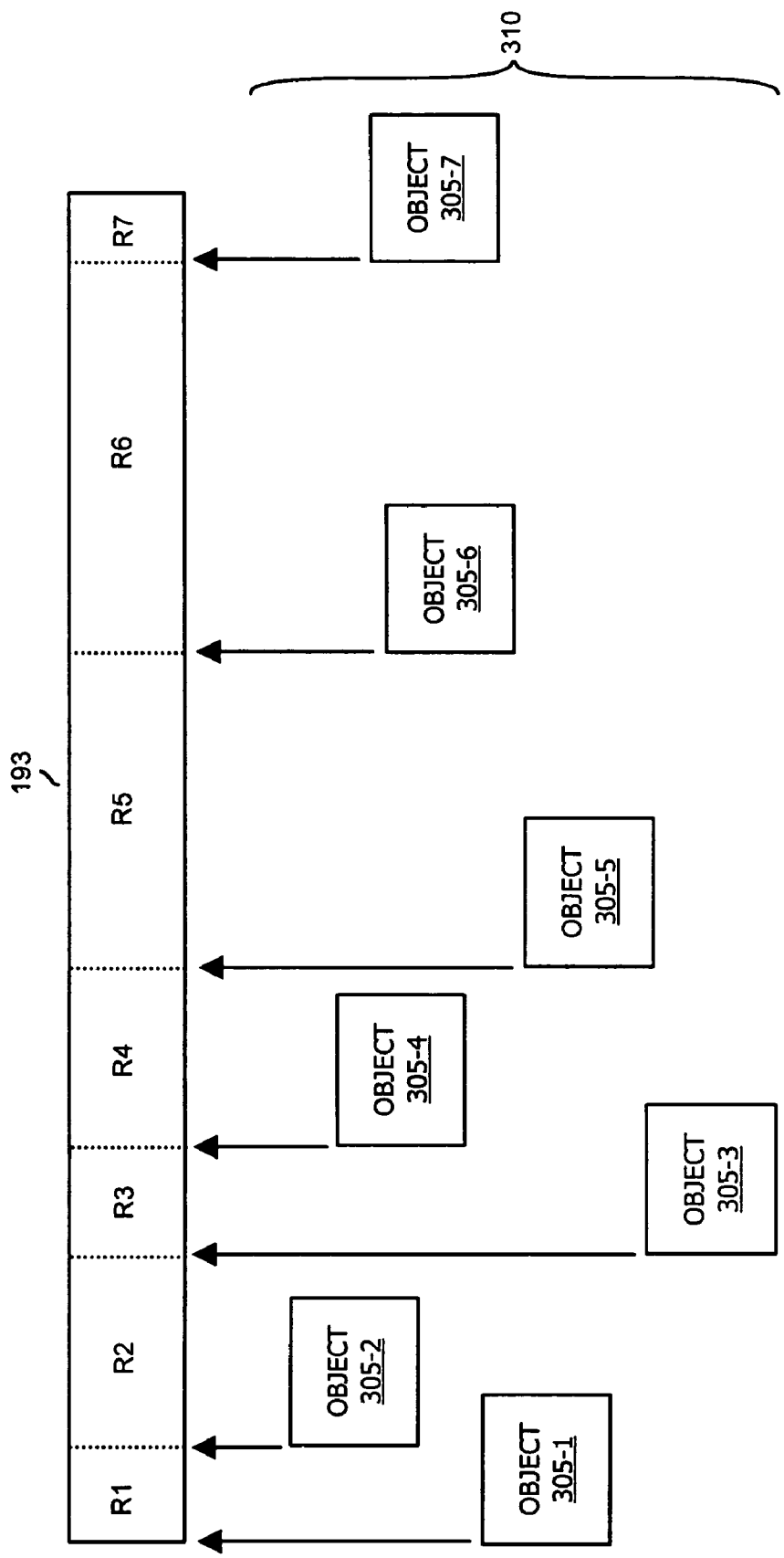
FIG. 3 is a diagram of a technique for storing access property information according to an embodiment of the invention.

FIG. 3 is a diagram illustrating ranges of addresses in the volume 193 of shared storage 180 and associated access tracking information (e.g., objects 305) according to an embodiment of the invention. As shown, each oplocks manager 132 in respective computers 110 includes a library 310 of objects 305. Each object 305 tracks access property information associated with a corresponding range in the shared storage. For example, object 305-1 includes information associated with range R1, object 305-2 includes information associated with range R2, object 305-3 includes information associated with range R3, and so on. Ranges represent regions of shared storage 180. In one embodiment, the ranges are part of a unified address space as discussed in the related transaction manager application.

According to one embodiment, a range can be subdivided to provide more fine grained locking with respect to ranges of addresses in the shared storage 180. For example, range R5 can be split into two ranges. In such an event, the oplocks manager 132 clones object 305-5 into two produce separate objects: the original object as well as a new object. One object corresponds to a first part of the subdivided range while the other object corresponds to another part of the subdivided range. The oplocks manager 132 initiates modification of the information in the objects to reflect new access right properties associated with the ranges. Consequently, based on this technique, an original owner of R5 can retain access rights in a first portion of the subdivided range R5 based on original information in object 305-5 while the information in the object resulting form cloning can be modified so that another computer in cluster has access to a balance of subdivided range R5.

Figure 4:
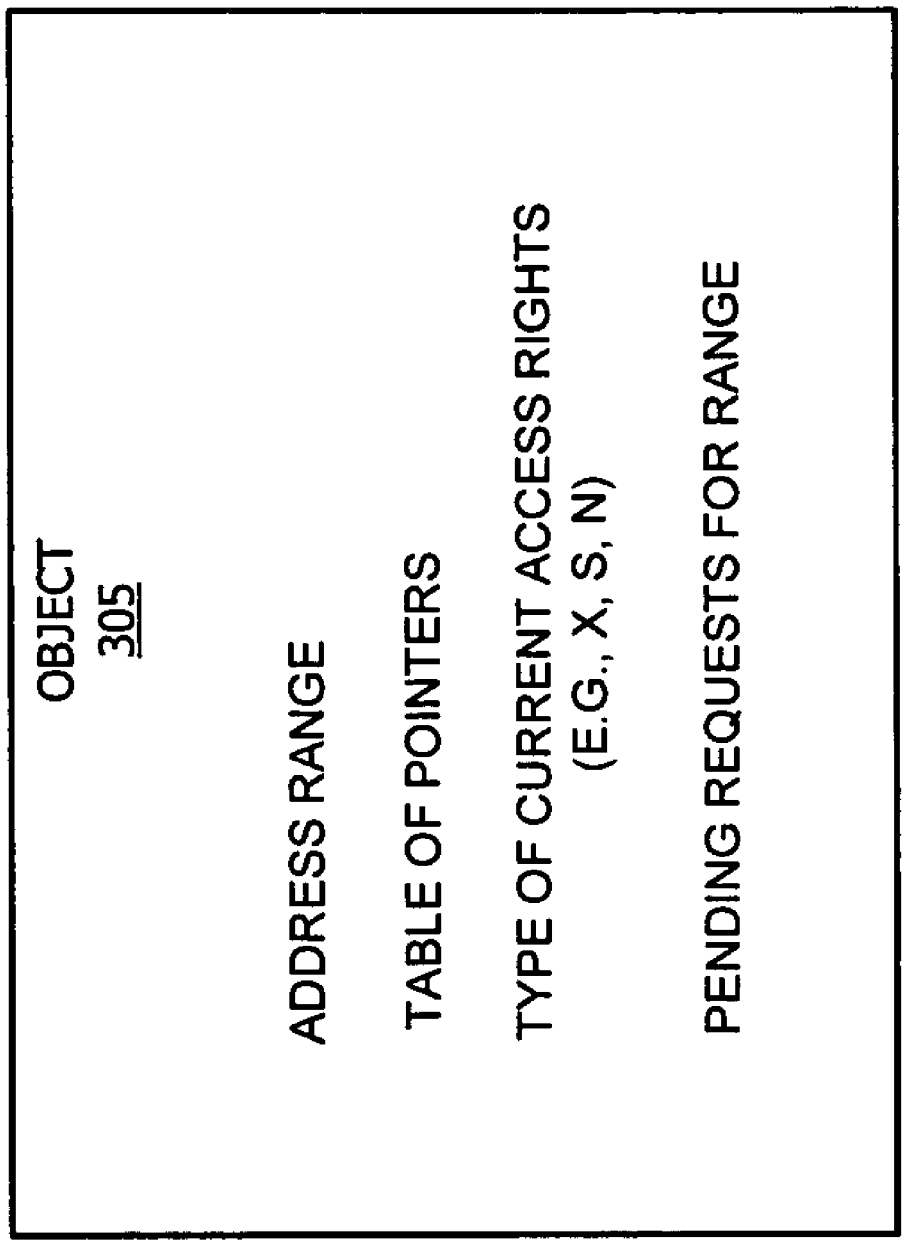
FIG. 4 is a diagram of an object and corresponding access property information according to an embodiment of the invention.

FIG. 4 is a diagram of an object 305 and corresponding contents according to an embodiment of the invention. As shown, the object 305 includes access property information associated with a corresponding range. For example, an object 305 includes a neighbor set of pointers, a type of current access rights, pending requests, record of active access requests, recovery state etc. for a given address range. The neighbor set of pointers (e.g., identifiers) includes as few as no pointers up to a fixed number of pointers identifying corresponding computers 110, if any, in cluster 145. The larger the neighbor set, the more efficient some operations are, but in order to reduce memory consumption, an embodiment of the Oplock protocol may limit the size of the neighbor set. If an implementation is expected to work in cluster with three or more computers, that neighbor set must have room for at least two pointers. In one embodiment, the pointers in the corresponding pointer neighbor sets in computers 110 form a hierarchical tree having a root computer. The root computer identifies a computer in the tree that has either exclusive or shared access rights for the particular range of addresses associated with an object 305.

The type of access rights associated with each computer 110 in the cluster 145 differs for a given range. For example, a computer 110 in the cluster can have rights such as exclusive access rights to the range (as denoted by the letter X), shared access rights to the range (as denoted by the letter S), and none or no access rights to the range (as denoted by N). At any given time, only one computer 110 in the cluster 145 can have exclusive rights to the range. Thus, for the given range, the balance of computers 145 in the cluster 145 will have no access to the range. Computers 110 with exclusive access can read and write to the corresponding range identified by the object. Enabling only a single computer 110 to write to the shared storage for a range prevents corruption of data that may occur as a result of simultaneous writes to the same storage location.

Also, several computers in a cluster 145 can have shared access while a balance of computers 110 have no access to the range. Computers 110 with shared access have rights to read data from the corresponding addresses associated with the range.

Figure 5:
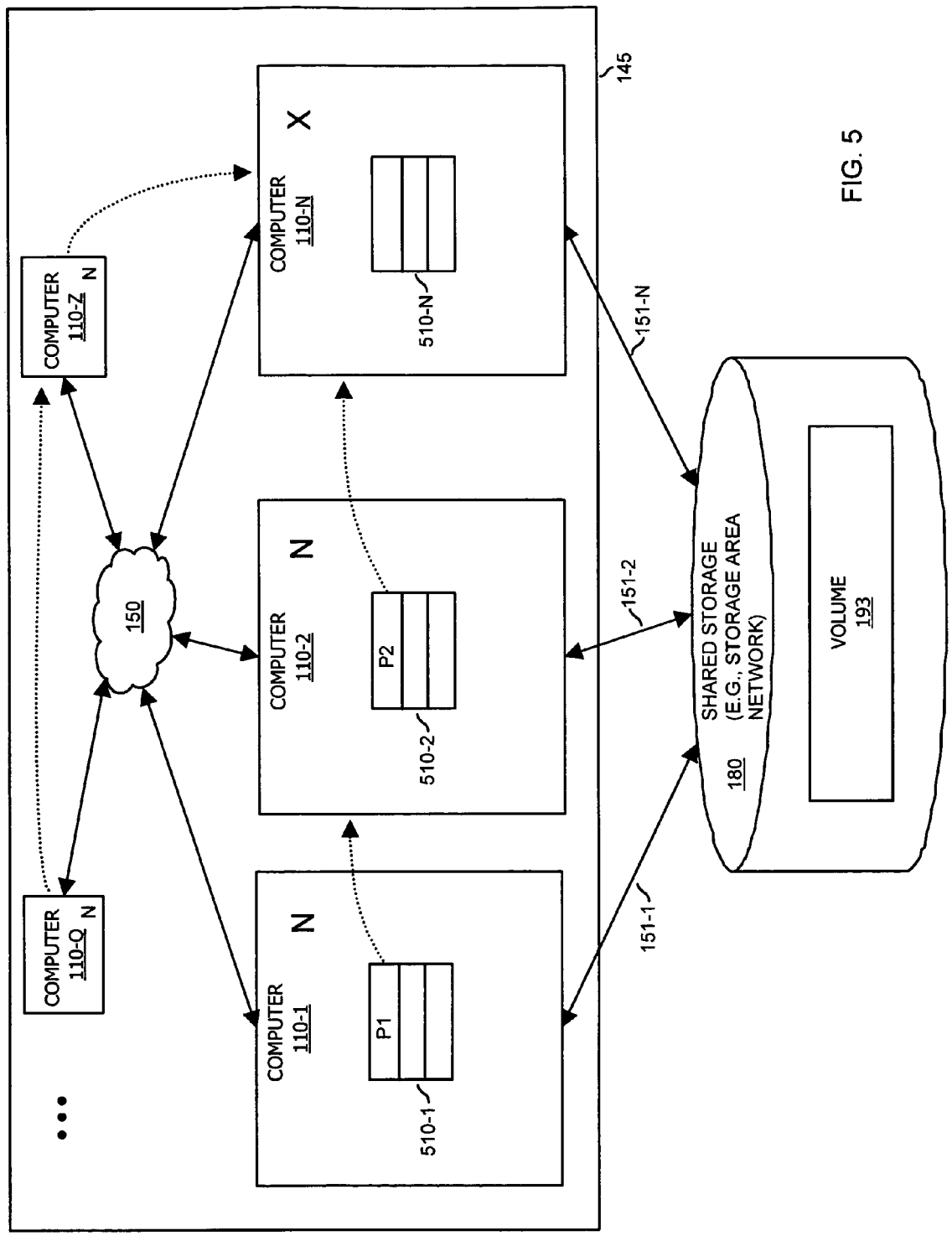
FIG. 5 is a diagram illustrating connectivity associated with a distributed hierarchal tree according to an embodiment of the invention.

FIG. 5 is a diagram illustrating a use of pointers according to an embodiment of the invention. As shown, computers 110 in the cluster 145 include pointers to one other. For example, computer 110-1 includes a pointer P1 in neighbor set 510-1 (of a corresponding object 305 associated with a range) identifying computer 110-2; computer 110-2 includes a pointer P2 in neighbor set 510-2 (of a corresponding object 305 associated with a range) identifying computer 110-N; computer 110-Q includes a pointer identifying computer 110-Z; and, computer 110-Z includes a pointer identifying computer 110-N. Thus, a string of links between computers forms a tree in which computer 110-N is the root computer having exclusive access to a corresponding range in shared storage 180. Computers 110 other than the root computer 110-N have no access to the shared storage 180 for the corresponding range. Note that this root computer changes (as well as the hierarchical tree created by pointer values in neighbor sets to each computer) when another computer in the cluster 145 gains shared or exclusive access rights to the range (or region) of shared storage 180 over computer 110-N.

Figure 6:
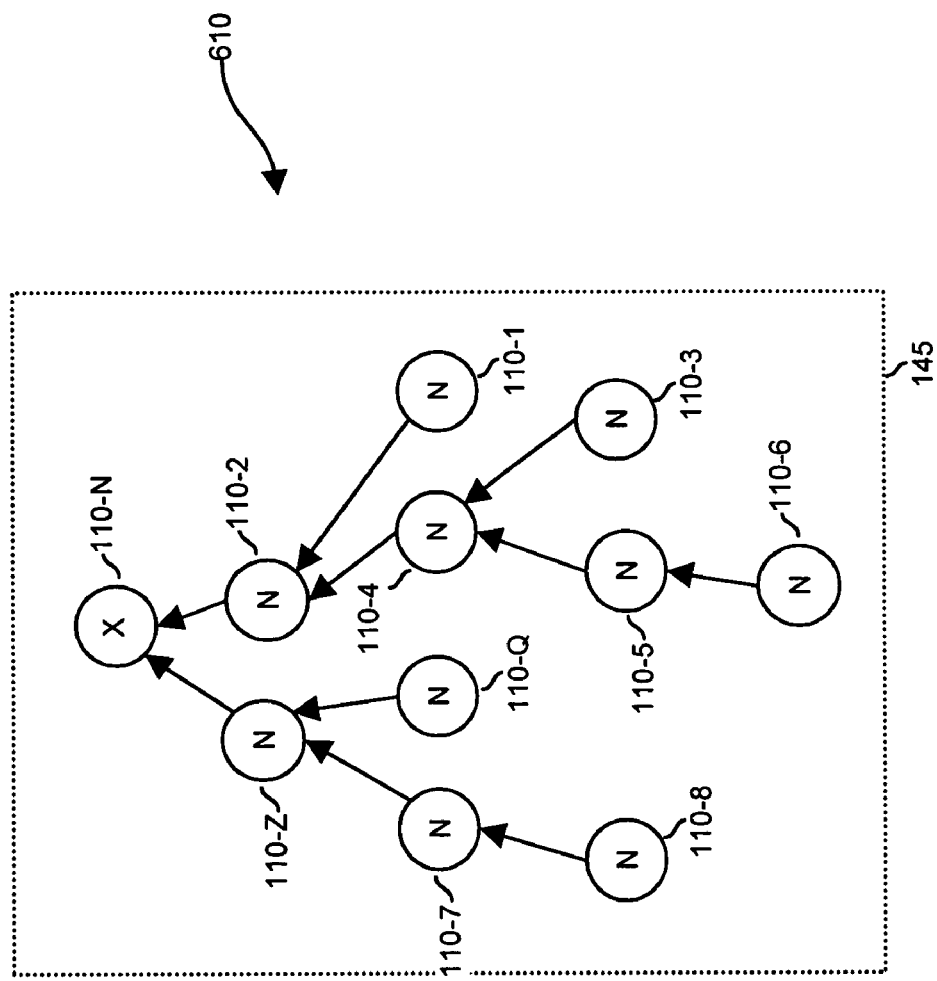
FIG. 6 is a diagram of a hierarchical tree formed by pointers in respective computers in a cluster according to an embodiment of the invention.

FIG. 6 is a diagram illustrating a hierarchical tree 610 (e.g., a binary tree) in cluster 145 according to an embodiment of the invention. As shown, the root computer (e.g., computer 110-N) has exclusive access rights while other computers have no access rights in the corresponding region. The direction of the arrow from one computer to another indicates which computer stores a pointer to the next successive computer in the tree 610. For example, the tail of an arrow or link identifies a computer storing a computer such that computer 110-8 stores a pointer identifying computer 110-7, computer 110-7 stores a pointer identifying computer 110-Z, and so on.

As discussed, the oplock managers 132 at computers support negotiations and facilitate transfer of access rights among computers for access to a given region in shared storage 180. Thus, a configuration of the tree can change over time to identify that different member has exclusive access rights that as shown in FIG. 6. Further, a configuration of the tree 610 can change to identify that multiple computers 110 in the cluster 145 have shared access to the corresponding region in shared storage 180 as more particularly shown in FIG. 7 Unless an implementation supports cluster recovery, there is no need to distinguish one of the computers that have shared access (except to support an optional method described below: DRAIN message's master flag): the non-recovery-related portion of the Oplock protocol can work as if all the shared computers are some kind of 'common root'. Recovery, as will be explained below, needs one of the computers with shared access be known as root, and also requires that every other computer that has more than one pointer in its neighbor set to know which pointer leads to the root.

Note that although tree 610 is a binary tree in which no parent computer has no more than two children, other embodiments include parent computers with more than two children.

Figure 7:
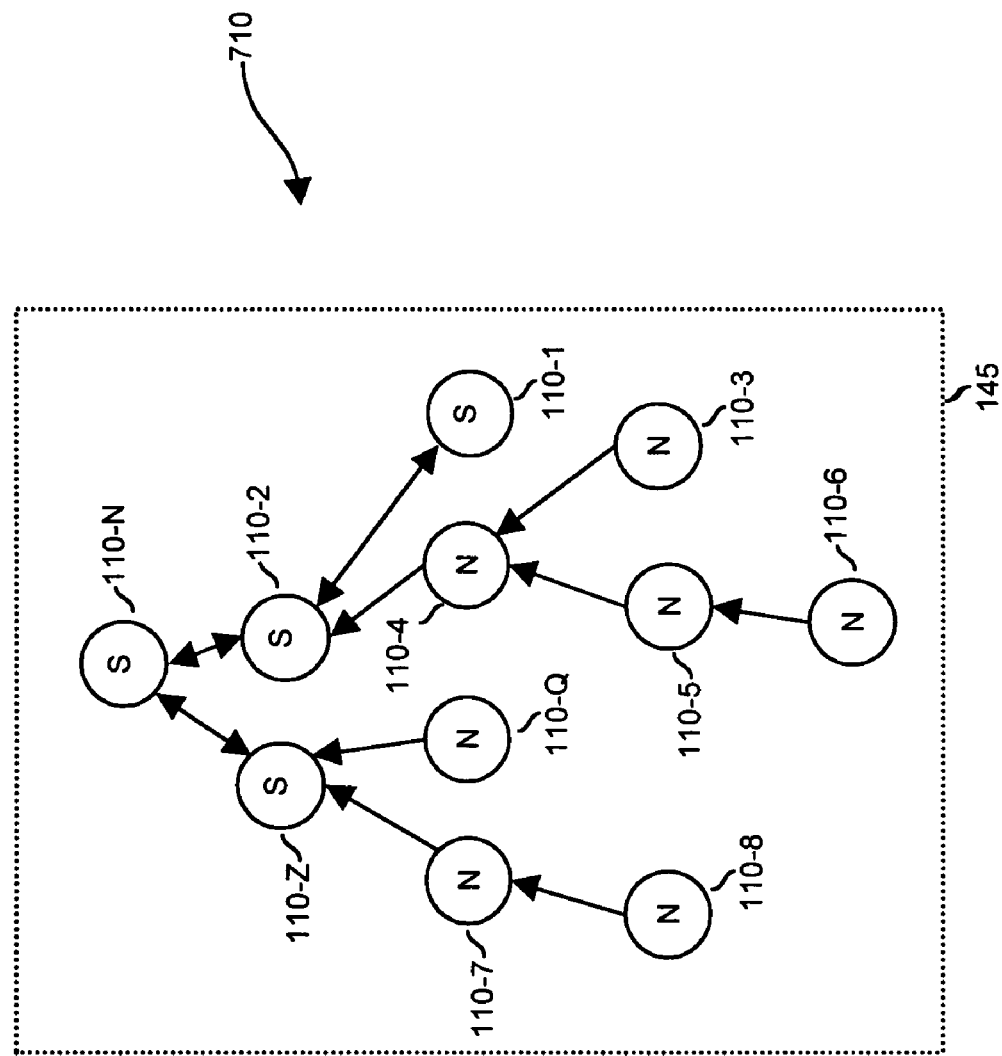
FIG. 7 is a diagram of a hierarchical tree formed by pointers in respective computers of a cluster according to an embodiment of the invention.

FIG. 7 is a diagram illustrating a hierarchical tree 710 in cluster 145 according to an embodiment of the invention. As shown, the root computer (e.g., computer 110-N) has shared access rights to the corresponding region along with computers 110-Z, 110-2, and 110-1, while other computers (e.g., 110-7, 110-8, 110-Q, 110-3, 110-4, 110-5, 110-6) have no access rights in the corresponding region. As discussed, the direction of the arrow from one computer to another indicates which computer stores a pointer to the next successive computer in the tree 610. For example, the tail of an arrow or link identifies a computer storing pointer to a computer such that computer 110-8 stores a pointer identifying computer 110-7, computer 110-7 stores a pointer identifying computer 110-Z, and so on.

Note that computers having shared access rights potentially have multiple pointers (as opposed to only a single pointer for computers having none access, or zero pointers for a computer with exclusive access) in corresponding neighbor sets. For example, computer 110-N has a pointer to computer 110-Z as well as pointer to 110-2, computer 110-2 has a pointer to computer 110-N as well as computer 110-1, and so on.

Figure 8:
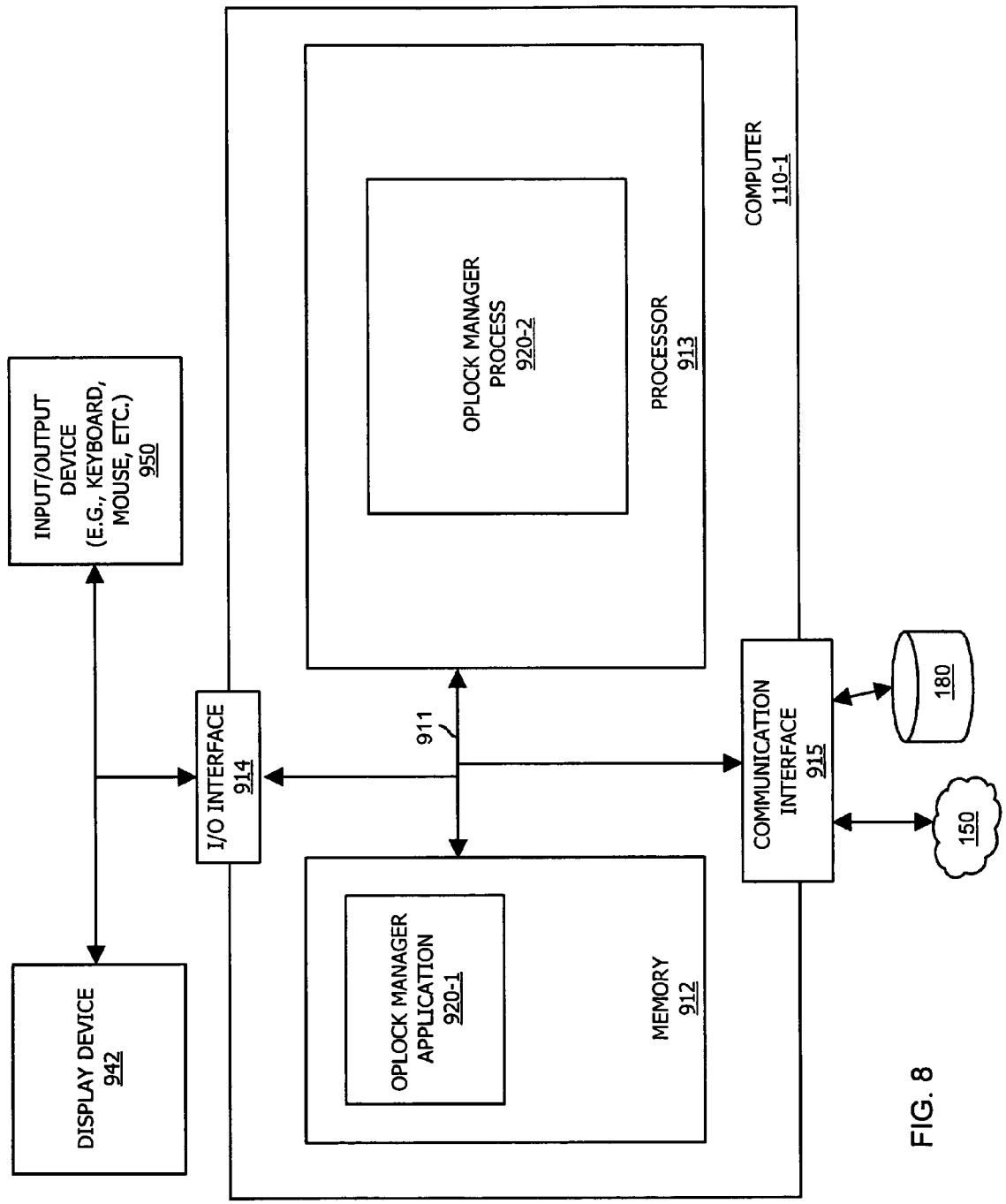
FIG. 8 is a block diagram of a sample oplock manager interfacing with a transaction manager according to an embodiment of the invention.

FIG. 8 is a block diagram illustrating an example architecture of computer system 110 in cluster 145 according to embodiments of the invention. Computer system 110 may be a computerized device such as a personal computer, workstation, portable computing device, console, network terminal or the like. As shown, computer system 110 of the present example includes an interconnect 911 that couples a memory system 912, a processor 913, an input/output interface 914, and a communication interface 915 to network 150. Input/Output devices 950 (e.g., one or more viewer controlled devices such as a keyboard, mouse, etc.) couple to and provide commands to processor 913 through I/O interface 914. The input/output devices 950 enable a user at computer 110 to provide input commands from applications running on computer 110. Display device 942 provides information to a user of computer 110 and enables computer 110 to display information. Computer 110 couples to shared storage 180 via a respective link 151 (e.g., a fiber cable supporting high speed communications). Communications interface 915 enables computer system 110 (and corresponding user 108 at computer 110) to communicate with other computers in a cluster via network 150.

As shown, memory 912 is encoded with oplock manager application 920-1 supporting the functionality as discussed herein as well as in related applications. The oplock manager application 920-1 may be embodied as software code such as data and/or logic instructions (e.g., code stored in the memory or on another computer readable medium such as a disk) that supports processing functionality according to different embodiments of the invention as described. During operation, processor 913 accesses memory 912 via the interconnect 911 in order to launch, run, execute, interpret or otherwise perform the logic instructions of the oplock manager application 920-1. Execution of oplock manager application 920-1 produces processing functionality in oplock manager process 920-2. In other words, the oplock manager process 920-2 represents one or more portions of the oplock manager application 920-1 (or the entire application 920-1) performing within or upon the processor 913 in the computerized device 110. In a similar vein, computer 110 also supports functionality associated with other modules discussed above.

Figure 9:
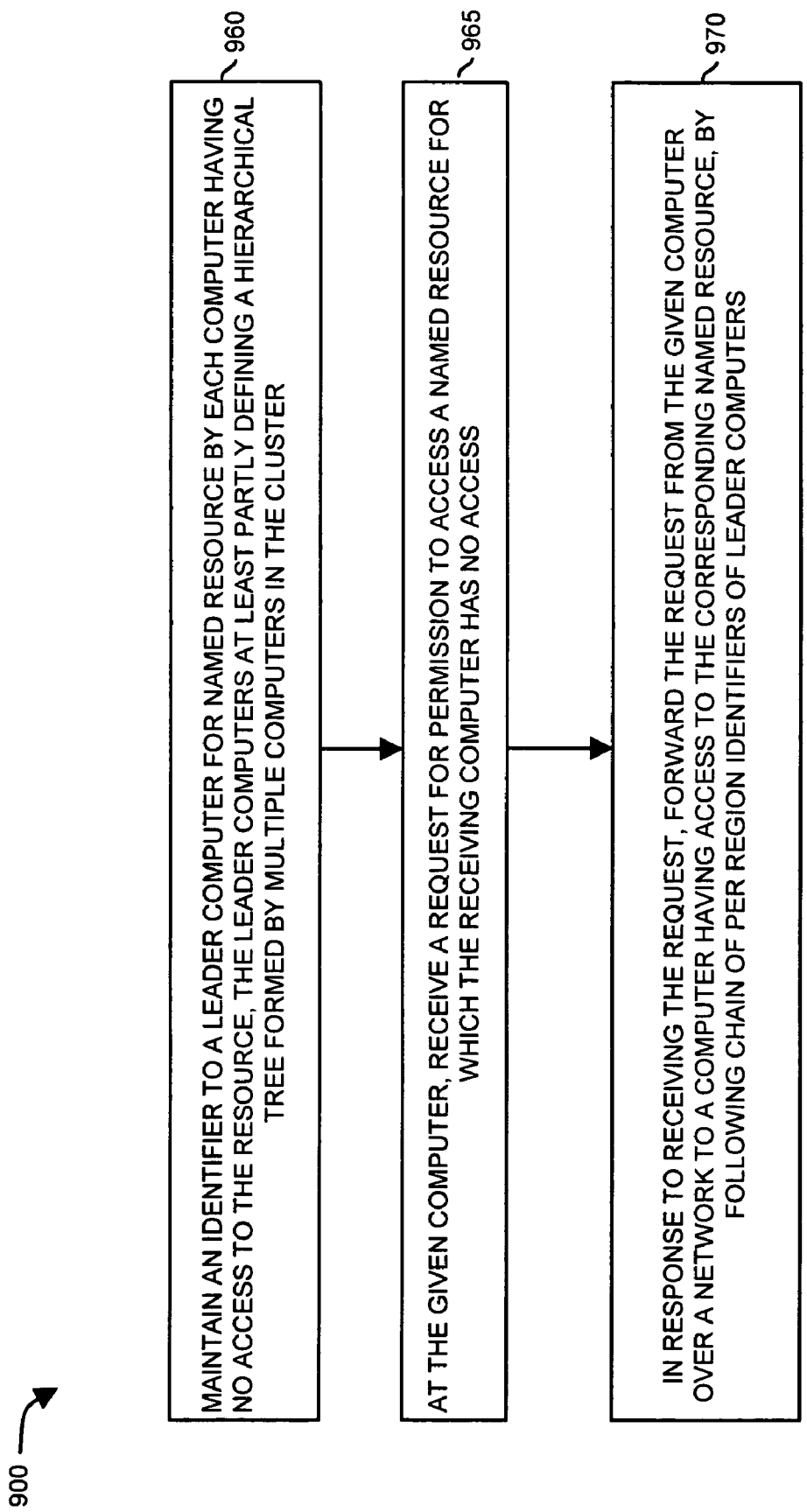
FIG. 9 is a flowchart illustrating a technique according to an embodiment of the invention.

FIG. 9 is a flowchart illustrating a technique of using a distributed tree to obtain access to named resource by computer having no access to the resource.

In step 960 a given computer, having no access to some named resource, maintains an identifier to a leader computer, which either has access to the resource, or leads to such computer.

In step 965 a computer without access to given named resource receives request for access to that resource.

In step 970 the receiving computer forwards the request to its leader computer. If the receiving computer also has no access to the named resource, the request is also forwarded until it finally reaches computer with access to the resource.

Figure 10:
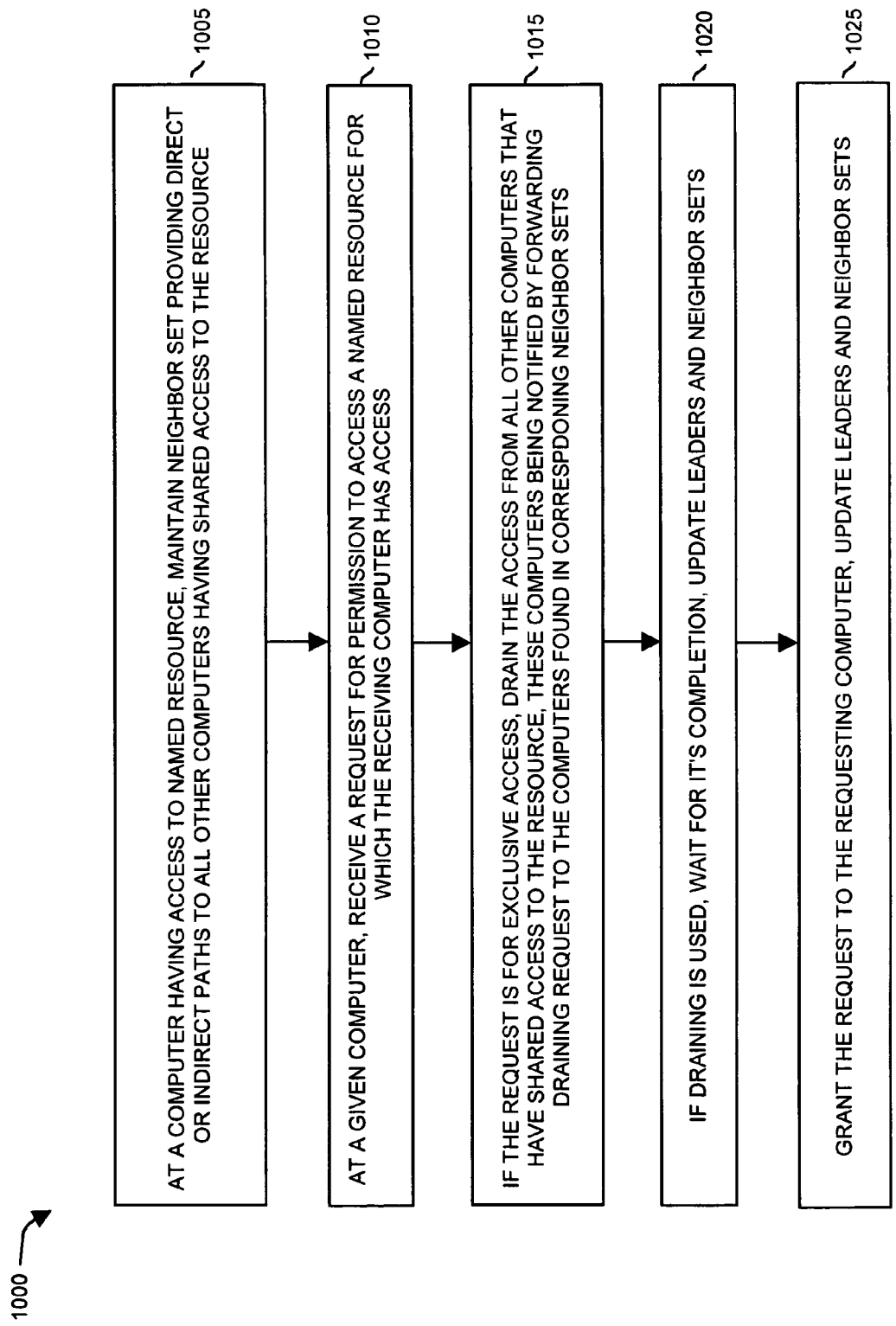
FIG. 10 is a flowchart illustrating a technique according to an embodiment of the invention.

FIG. 10 is a flowchart 1000 illustrating a technique of maintaining a distributed hierarchical tree to facilitate access to shared storage 180 from a system perspective according to an embodiment of the invention. Forwarding stops at the first computer capable of serving the request. This is the first computer with SHRD or EXCL access. For SHRD requests, they are handled immediately (unless when saturated, when the request is passed to SHRD neighbor according to the saturation technique), EXCL request is granted by a computer with EXCL access. If that computer has SHRD access it drains the SHRD access from all the others, gains EXCL and passes it to the requestor.

In step 1005, computers 110 with access to given named resource in a cluster 145 maintain corresponding neighbor sets 510 for identifying other computers 110 in the cluster 145 that also have access to the resource. A combination of the identifiers stored in the neighbor sets amongst the computers pointing from one computer 110 to another computer 110 in the cluster 145 form a hierarchical tree of computers 110.

In step 1010, a given computer 110 in cluster 145 originates a request for access rights to named resource, part of shared storage 180; the request is received by computer having current access to the resource.

In step 1015, in response to detecting the request, if the request is for exclusive access, the given computer 110 forwards a draining message to all computers in its neighbors set. The set contains only computers having shared access to the named resource.

In step 1020, the draining message is propagated via forwarding to all computers having shared access to the resource, the computers release their shared access and notify back. The drain starter waits to become the only computer having access to the resource.

In step 1025, after all conditions for satisfying the request are met, the request is granted to the requesting computer. Neighbor sets and identifiers to leader computers are updated for further requests.

In one embodiment, the tree is distributed to the extent that each computer stores a neighbor set of pointers associated with the structure of the tree. The root computer has current access rights to a specific region of shared storage for a corresponding hierarchical tree. Thus, according to an embodiment of the invention, the computers in the cluster forward a request to the root computer based on pointers or identifiers in the neighbor sets of the computers in the cluster.

In step 1020, the root computer 110 in the tree such as a computer 110 having exclusive access rights receives the request for access originated by the given computer 110 in cluster 145. If the requesting computer has a higher associated priority, the root computer then transfers access rights in the region to the requesting computer 110.

In step 1025, computers 110 in the cluster 145 modify contents of the corresponding neighbor sets 510 of computers in the cluster 145 so that the given computer 110 becomes the root computer of the hierarchical tree.

In one embodiment, the oplocks manager 132 supports an Oplock Protocol, which is a communication protocol allowing computers 110 in a cluster 145 to share a single resource object (e.g., object 305 and associated information). A resource is an entity (e.g., storage entity) that may be locked for reading and writing. Only one computer is allowed to write at given instant of time, while many computers may read concurrently. Simultaneous reading and writing is not allowed.

Computers communicate via some kind of network. The underlying communication protocol is required to provide guaranteed delivery of sent data. The set of computers that share the resource is named cluster, and an external component named here the Cluster Manager provides all the computers with consistent information regarding what other computers participate in the cluster. The Oplock implementation relies on the Cluster Manager to notify its implementation in every computer for changes in the cluster.

When a computer requests shared or exclusive lock to the resource it must somehow ensure that no one of the other computers has conflicting lock in effect. But computer state cannot be examined or manipulated directly by other computers, and to achieve its goal a computer needs to communicate through its communication channels with the other computers. One solution could simply broadcast the desired request and wait for all the computers to agree. For many needs the time this communication takes can become major bottleneck, and in many cases, it seems superfluous.

The Oplock Protocol tries to avoid some of the superfluous communication and thus reduce communication delays. For every computer the protocol maintains what access it has and answers such or lower requests immediately. When the computer has insufficient access, communication is still required. To reduce that communication, the computers are linked in a distributed tree structure that holds partial history of recent access changes among the computers. This structure allows requests to be propagated only to the computers of interest. For example, if several computers compete for shared and exclusive locks, they will communicate only with themselves. Other computers in the cluster won't receive any notification of this competition. If some of the computers stop requesting the resource, or if other computers join the competition, the system will adapt and only the new subset will have to answer each other's requests.

Every request for access to the resource may be bundled with priority, which is labeled gravity here. When conflicting requests occur, higher gravity ones attract stronger and are satisfied first. When computer requests access that conflicts with already granted lock of another computer, depending on which request has higher gravity, the new one either waits for the granted computer to unlock, or the granted one is immediately asked to unlock. When the granted computer releases its lock, the new request is satisfied.

The protocol allows two extensions to the resource interface: coloring and denial of requests. A computer may decide to deny request when it is asked to release the access it currently has. Denial may happen either because the computer has trouble releasing its access or because it determines that the request cannot be satisfied—for example to emulate sharing violation upon file open requests. Certain colors might be regarded as unimportant and users of the Oplock may decide to deny such requests (because of heavy load or other criteria), without denying important requests. This behavior is up to the Oplock users and is not defined in this document.

The protocol is optimized so an implementation needs only small amount of memory to maintain the per computer state. This allows large number of resources to be used simultaneously by the computers.

Operational Characteristics of Computers in a Cluster

When computer 110-1 desires access to a specific region or a volume in the shared storage system 180, computer 110-1 mounts the given volume and negotiate with other computers 110-2, . . . , 110-n for inclusion in the cluster 145 and access to shared storage system 180. Each computer 110 maintains a constantly updated cluster list (via the cluster manager 126) identifying computers 110 (and corresponding network address, etc.) listed as members of the cluster 145, a newly requesting computer 110-1 waits until it negotiates permission for shared or exclusive access to portions of a given volume. Oplocks manager 132 provides functionality to lock access rights so that a given computer 110 can read or modify contents of shared storage 180 without corruption by another computer 110 in cluster 145 accessing a same area of the volume. The Oplock manager does not protect from corruption, it only manages to notify when computers change access, so for example a computer that caches content can keep their cache consistent with other computer's caches. Unlike exclusive WRITE access rights, READ access rights need not be exclusive. In other words, multiple computers 110 may simultaneously have rights to READ from specific regions in shared storage system 180. Read access rights still conflict with write access. So before obtaining read access, a computer must be sure that there is no other computer that has write access, and before obtaining write access, a computer must be sure that no other computer has read access. Computer with write access is still allowed to read. One method of ensuring proper access is to implement an OP-LOCK function (e.g., via oplock managers 132) in which one computer has exclusive or shared or none access to shared storage 180. Based on this function, certain computers 110 in cluster 145 are locked out of accessing the specific storage region in shared storage system 180. Locked out computers 110 do not interfere with computer 110-1 by reading or writing to locked out portions of shared storage 180 when a particular computer 110-1 in the cluster has shared or exclusive access to the specific regions of volume 193 in the shared storage system 180. If one computer has exclusive access to a portion of the shared storage, it is guaranteed that all other computers are locked out from that portion. If some computer has shared (not exclusive) access, it is guaranteed that there is at least one other computer, that has shared access too, and there still may be other computers that are locked out. The difference between computers with shared access and computers with none access is that computers with shared access have control over the process of granting exclusive access to some cluster member, while computers with none access cannot reliably detect if some computer had obtained exclusive access. Thus, although no computer can modify the corresponding portion of the shared storage (because there are computers with shared access), the computers with none access cannot read from that portion. Note that at any given time, different computers 110 may negotiate permission to access different portions of shared storage system 180 at the same time. Thus, computer 110-1 may access a specific region in a volume while computer 110-2 has access to a different region of the same volume.

In one embodiment, computers 110 reference locations or regions in the shared storage system 180 based on use of a unified address space utilized by the transaction manager 172. For example, locations or content in the shared storage system 180 are mapped to a 128-bit address space. Each of computers 110 utilize the same addresses in the unified address space to reference the same locations in shared storage space 180. Use of the unified address space allows fine grain locking down to potentially bytes of the shared storage system. Computers 110, when negotiating for access to a region in shared storage system 180, utilize the same addresses in the unified address space to identify same storage regions so there is no confusion as to ownership of a range of addresses in the shared storage 180.

After negotiating permission to access a specific region in shared storage system 180, computer 110-1 retrieves corresponding data from shared storage and stores the retrieved data in its cache. That is, computer 110-1 communicates over network 151 to shared storage system 180. If computer 110-1 has exclusive access, User at computer 110-1 can modifies the data stored in its cache. As computer 110-1 modifies the data in its cache, a respective journal system logs the corresponding operations (e.g., transactions) associated with the modifications. In one embodiment, a user modifies aspects of a file in a volume and journal system logs changes to metadata associated with the file. Eventually, computer 110-1 flushes the modified data in its cache back to the shared storage system 180. This involves writing the modified data in cache to the shared storage system 180. When computer 110-1, having exclusive access to portion of the shared storage is asked by some other computer 110-2 (using described further below communication), the computer ensures it has flushed its cache of that portion to the shared storage before actually allowing shared access to computer 110-2.

In one embodiment, shared storage system 180 includes dedicated journal data regions for storing journal data associated with respective computers 110. For example, computer 110-1 (when appropriate) writes its journal data from journal system to journal data region shared storage 180.

Prior to flushing modified data from a cache in computer 110-1 to shared storage system 180 for the above example, computer 110-1 writes associated transactions (e.g., journal data) logged in its journal system in computer 110-1 to journal data region in the shared storage 180. Thereafter, computer 110-1 proceeds to write the modified contents (e.g., modified metadata) of cache to the proper locations in shared storage.

In the event that computer 110-1 crashes (e.g., becomes inoperative) during the process of writing modified data in cache to shared storage 180, the journal data written to the journal data region prior to the flush of the cache may be replayed by another non-crashed computer (e.g., computer 110-2, . . . computer 110-*n*) for recovery purposes. In other words, as a result of the crash, computer 110-1 may corrupt metadata associated with files in the shared storage system. Other computers 110-2, . . . , 110-*n* learn of the crash as a result of a communication timeout with the crashed computer 110-1. In response, the first computer such as computer 110-2 learning of the failure checks the journal data region associated with the crashed computer 110-1 to determine whether the journal needs to be replayed. If so, the computer 110-2 replays the journal to recover metadata in shared storage system 180. Computers 110 may determine who is presently in the cluster 145 or who is a dead member of cluster 145 via cluster manager 126.

Note that terms 'healthy/sick' are properties of a shared named resource (along with current access, and the neighbor set) of computer that is still in the cluster. That state is used during tree recovery. One or more cluster members (e.g., a non-failing computers) may detect a failure in a computer having access to the shared storage system 180. The failure can be detected as a result of at least one of the computers 110 in the cluster 145 failing to receive a heartbeat signal, which may be expected to be received from another computer 110 in the cluster 145. A heartbeat signal is an occasional communication from one computer to another computer 110 in a cluster 145 to indicate that the sending member is still alive and functioning. According to such an embodiment, computers 110 in a cluster 145 are programmed to communicate with other computers 110 in the cluster 145 by at least occasionally communicating with each other via a heartbeat signal. If no heartbeat signal is detected in a timeout period but is expected, a computer 110 may assume that another computer 110 in the cluster 145 has failed and that the failing computer 110 should be removed from the cluster 145. The computer detecting such a condition may send a message to the potentially failing computer 110 to initiate communications. If the potentially failing target computer 110 does not respond, it can be assumed that the target computer 110 has crashed or failed. An inquiring computer 110 may further check with other computers 110 in the cluster 145 to determine whether the other computers can communicate with the non-responding target computer. If the other computers 110 in the cluster also cannot communicate with the target computer 110, this corroborates the inquiring computer's suspicion that the target computer 110 in the cluster has crashed. Thus, techniques for detecting a crashed computer condition includes receiving a message from another non-failing computer that the computer experiences the failure, and/or attempting to communicate with the computer but failing to receive an acknowledgment message. There may be other methods to discover what other computers remain in the cluster, and whether the checking computer is still in the cluster depending on the specific implementation of the Cluster Manager. One or more members of the cluster 145 may initiate removal of a non-responsive member. The cluster manager 126 at each computer 110 provides functionality for maintaining a list of members in a cluster 145.

The computers 110 in the cluster 145 may also monitor their own health. For example, if access to shared storage 180 are too slow or disappears, the machine recognizing this event stops communicating with the other members. One of the living machines then removes the dead member from the cluster, updates the cluster neighbor set in shared storage, notifies others of the dead member, and replays the journal of the dead member so that data in the shared storage 180 does not become corrupt.

In response to detection of a failed computer in the cluster 145, the oplocks manager 132 may initiate a routine to repair the hierarchical tree formed by pointers associated with the members of a cluster 145 for the regions of shared storage where this is necessary. For example, if the neighbors set for some region at some computer points to failed computer, the tree may become split after the exclusion of the failed computer from the cluster. The tree at this region needs to be recovered in order for the remaining computers in the cluster to change their access into this region. The computers at such broken ends of the tree are marked as sick (non healthy) and they initiate recovery procedure. Note that this health status is per region and thus a computer in a cluster may have many healthy and sick regions simultaneously. Despite such broken state, some of the cluster members 110 may still be able to receive shared or exclusive access even before the whole tree is recovered. And an implementation of the protocol may defer recovery until necessary.

Figure 12:
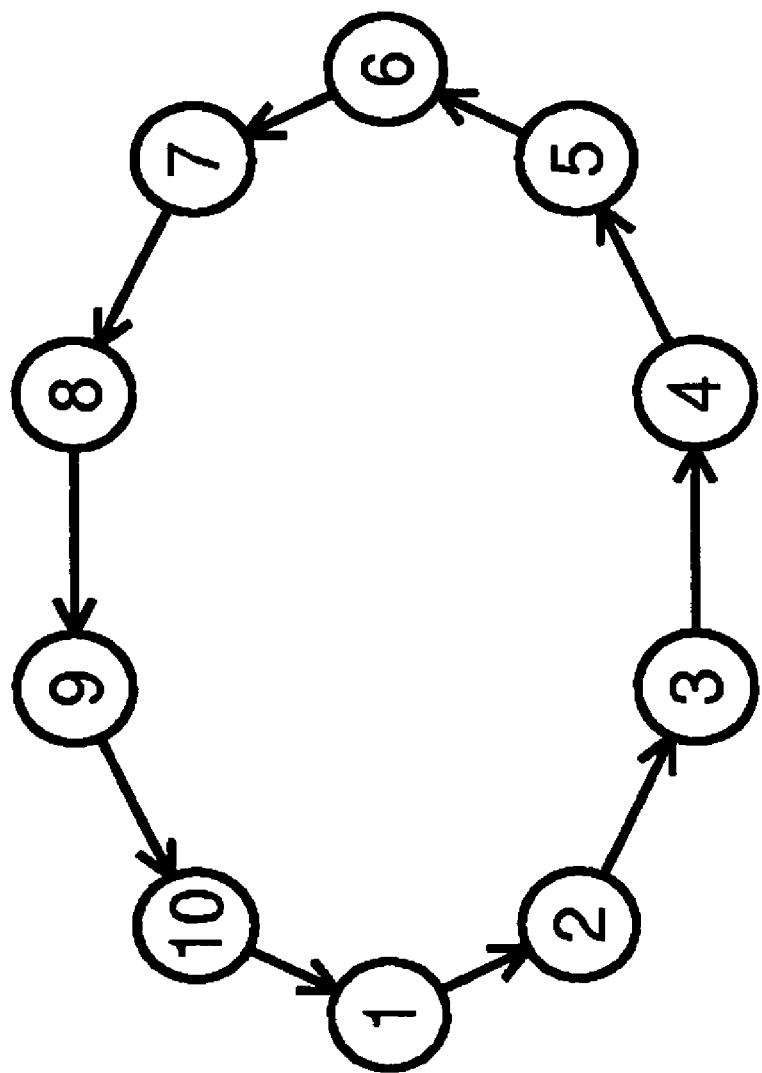
FIG. 12 is a diagram of a virtual computer ring according to an embodiment of the invention.

FIG. 12 is a diagram of a virtual computer ring according to an embodiment of the invention. As shown, computers 1 through 10 are linked together to form a ring. Thus, in the event that a computer in the hierarchical tree fails, the computers can communicate with a next computer in order.

In general, computers 110 have a total ordering among them. That is, every computer ID corresponding to a computer 110 is either greater or smaller than any other computers. The order is stable meaning that no matter which computer compares which two computers, the result is always the same. The order is stable in yet another meaning: two computers compare the same way (that is one compares less than the other) even after some other computers have entered or leaved the cluster. In the examples presented here, computers are identified by distinct natural numbers and inherit their own ordering.

Thus, according to one embodiment, computers in the cluster exist as members of a virtual ring, where every computer is virtually connected to its right computer. A right computer is the next computer in the ring having the smallest ID that is a higher ID than itself. If there is no higher computer, the right computer is the smallest computer in the cluster.

Further Discussion of OpLocks Manager Operation in Relation to Cluster Manager

The cluster manager 126 provides each computer with events regarding changes in the cluster 145. The following events are sent by the cluster manager 126 to the oplock manager 132 for the reasons as discussed:

| Name | Description |
| --- | --- |
| CreateCluster | New cluster is created. The receiving computer is the only one in the cluster. |
| JoinCluster (computers) | Entered existing cluster. The computers set is list describing what other computers are there |
| NewMembers (computers, phase) | The set of members represents computers that have entered the cluster. Every other computer in the cluster receives this notification. |
| DeadMembers (computers, phase) | The computers are no longer in the cluster. |
| Reconnected (computers, phase) | The computers are in cluster, but direct communication with them was temporary down. Every other computer in the cluster must receive a RelinkedOther event. |
| ReconnectedOther | Reconnected (n, p) event was dispatched to some other cluster member |

The phase parameter, found in some of the events above, represent one of two phases: A and B, as joining new members, removing old members and reconnection need two-phase process to avoid race conditions.

Every notification that mentions some other computer provides the computer ID (for simplicity described via number here). Some notifications also provide communication channel, usable for sending messages to that computer. Thus the JoinCluster and NewMembers(phase B) notifications provide initial communication channel between new and old computers; Reconnected(phase B) provides replacement channel for computers that had lost their previous channel, but have established new one. NewMembers(phase A), Reconnected (phase A) and DeadMembers(phases A and B) need not provide channel to the oplock manager.

Figure 11A:
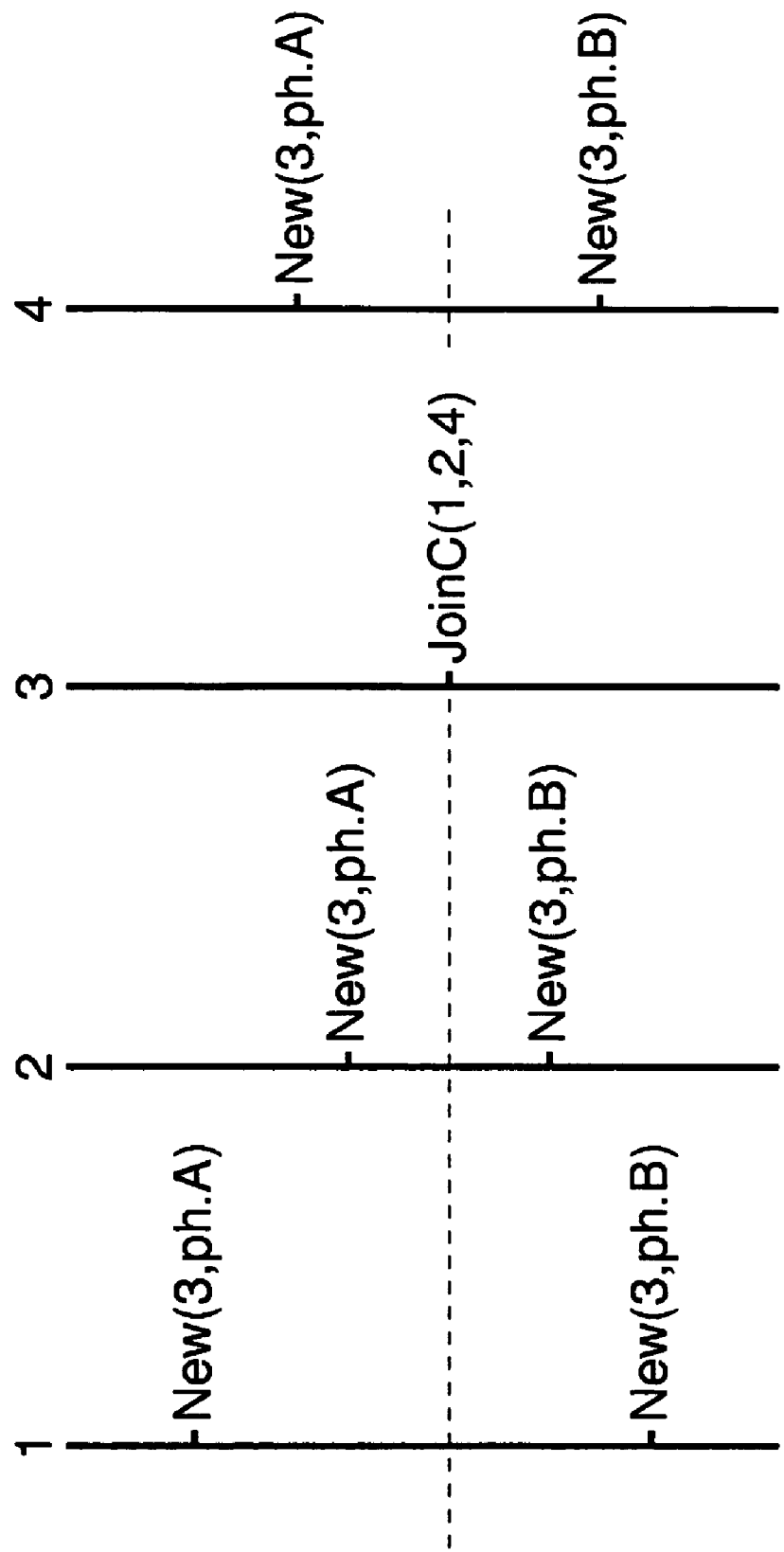
FIGS. 11a, 11b, and 11c are diagrams of a two-phase shut down technique according to an embodiment of the invention.

FIG. 11a is a diagram of a two-phase addition of new member (computer 3) to the cluster. First, all computers that already exist in the cluster (computers 1, 2 and 4) receive NewMembers(computer 3,phase A) notification. After that, computer 3 receives notification of its own entering into the cluster via JoinCluster(computers 1,2,4) notification. Finally, the other members receive NewMembers(3,phase B) notification.

The computers passed in NewMembers(phase A) notification are added to the virtual ring (e.g., as in FIG. 12), but any messages devoted to new member are queued until corresponding NewMembers(phase B) is received.

This is an example log where computers enter a cluster:

| Event | Notification received at corresponding computers |
| --- | --- |
| computer 1 enters empty cluster | computer 1 receives CreateCluster |
| computer 2 enters the cluster | computer 1 receives NewMembers (2, phase A) |
| | computer 2 receives JoinCluster (1) |
| | computer 1 receives NewMembers (2, phase B) |

-continued

| Event | Notification received at corresponding computers |
|---|---|
| computer 3 and 4 enter too | computer 1 and 2 receive NewMembers (3, 4, phase A) computer 3 receives JoinCluster (1, 2) computer 1 receives NewMembers (3, phase B) computer 3 receives NewMembers (4, phase A) computer 4 receives JoinCluster (1, 2, 3) computer 2 receives NewMembers (3, 4, phase B) computer 3 receives NewMembers (4, phase B) computer 1 receives NewMembers (4, phase B) |
| computer 5 enters too | computers 1, 2, 3 and 4 receive NewMembers (5, phase A) computer 5 receives JoinCluster (1, 2, 3, 4) computers 1, 2, 3 and 4 receive NewMembers (5, phase B) |

It is important to note that if the Cluster Manager supports adding more than one computer at a time, as is shown in the log for computers 3 and 4, it still must represent one of them as entering before the other. In the case shown on the log, it presents computer 3 as coming before computer 4, because computer 3 receives NewMembers notifications for computer 4, while computer 4 learns about computer 3 in its JoinCluster notification.

Figure 11B:
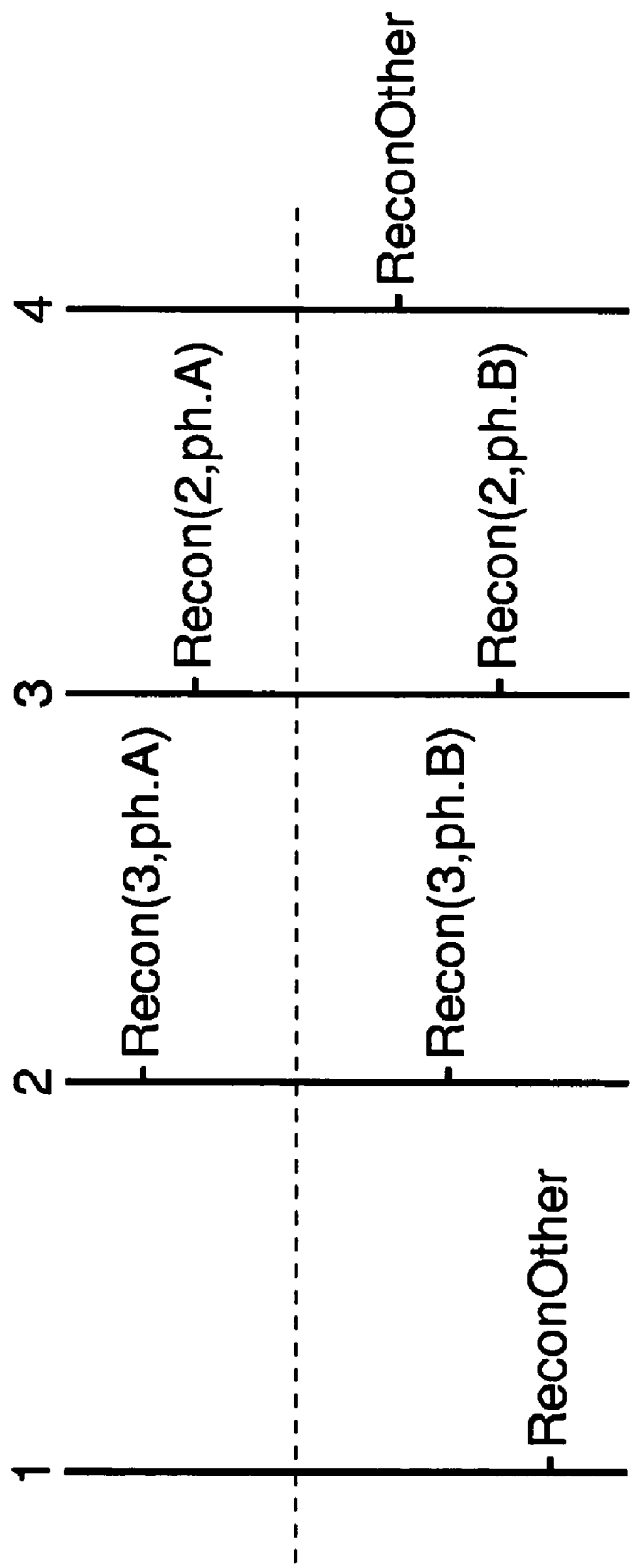

FIG. 11b is a diagram of two-phase reconnect technique according to an embodiment of the invention. As shown computers 2 and 3 temporarily lose their connection. This may result into losing part of the data sent in both directions and Reconnected and ReconnectedOther notifications are sent by cluster manager to oplock manager in order to recover. First, the two computers receive Reconnected(other,phase A) notification where 'other' identifies the computer with which communication is broken. After the notification is delivered to the oplock manager for both computers and a new connection is established, the oplock manager is presented with Reconnected(other,phase B) notification for both computers and all other computers in the cluster receive ReconnectedOther notification. ReconnectedOther notification is used to resend NEED, TOKEN and BRIDGE messages as described further below. While a computer is in the interim between Reconnected(phase A) and Reconnected(phase B) notifications any attempt to send it recovery message as consequence of receiving recovery message leads to rollback of any action done while handling the received message and queuing the received message to be 're received' again, whenever new cluster notification arrives. For example if BRIDGE message is received and this leads to sending BRIDGE_UP message to computer that is half reconnected, the received BRIDGE is queued for receiving when for example the Reconnected (phase B) notification comes.

Figure 11C:
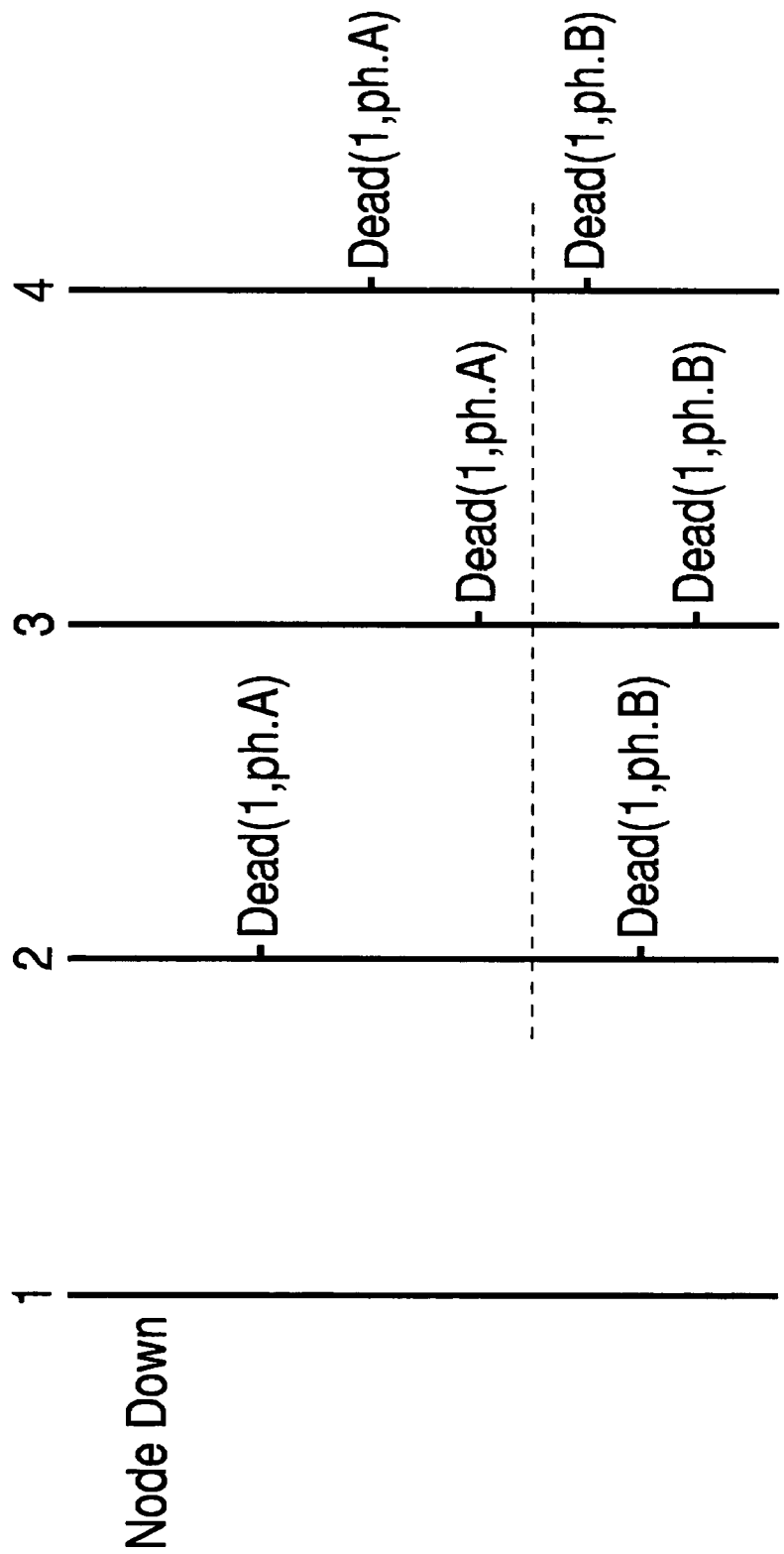

FIG. 11c is a diagram of a two-phase shut down technique according to an embodiment of the invention. As shown, the cluster manager 126 provides two-phase shutdown for member computers 110 that leave the cluster 145

The cluster manager 126 is responsible for specific ordering of the states. For example, whenever a computer leaves the cluster, the cluster manager 126 dispatches this information to every computer 110 still in the cluster 145. As a result, a computer leaving the cluster 145 is marked as in half-down state in every remaining computer via the DeadMembers (phase A) notification. When this happens, i.e. every computer yet in the cluster has received this notification, every computer is notified of the removal with a DeadMembers (phase B) event.

This two-phase shutdown technique allows the Oplock to resend some messages that might be lost due to a failing computer. When a computer 110-1 is notified of the failure of computer 110-2 via a DeadMembers(phase B) event, the computer 110-1 may resend communications to a third computer 110-3 without worrying that the receiver will remain unaware of the member 110-2 leaving the computer which could otherwise result in resending a message to a failed computer. This is because the receiving computer 110-3 will have computer 110-2 at least in half-down state (or probably in full-down state, that is it won't appear as member of the cluster), and will not communicate to it. Note also that full-down state is the final state of computer 110-2 in the cluster as seen by computer 110-1, and computer 110-1 can safely remove computer 110-2 from its list of computers in the cluster. The cluster manager must still provide that new members entering the cluster will receive such identification as to not be mistaken for leaving computers. While a computer is in the interim between DeadMembers(phase A) and DeadMembers(phase B) notifications, attempts to send it messages are handled the same as it was between Reconnected(phase A) and Reconnected(phase B) above.

In summary, the oplock manager sees every other computer in the cluster in one of the following states:

| | |
|---|---|
| entering | A NewMembers (phase A) was received for that computer, wile NewMembers (phase B) has not yet arrived. Messages received from computer in that state are queued until the computer enters inside state (i.e. the NewMembers (phase B) for it is received). When NM (phase B) is received, all queued messages are handled as if they were just received. This delay of handling is necessary because other cluster members may still have not received any notification about the new member and will drop any requests forwarded to them that mention it. |
| inside | NewMembers (phase B) or JoinCluster mentioning the computer had arrived. This is the normal state. |
| reconnecting | Reconnected (phase A) was received for that computer, but Reconnected (phase B) has not yet arrived. There is no valid connection to the computer, so no point in sending it any messages. Also messages received from that computer are ignored while in reconnecting state. |
| leaving | DeadMembers (phase A) was received for that computer, but DeadMembers (phase B) has not yet arrived. This state is handled the same as the reconnecting state. |
| down | This is virtual state: when computer leaves the cluster via DeadMembers (phase B), the computer is down and is removed from the virtual ring. The oplock manager discards any queued NEED requests with issuer the leaved computer or DRAIN requests that came from that computer. DRAIN requests which issuer or shrinker is down are kept, but the shrinker is flagged as down. |

If computer leaves the cluster while in entering or reconnecting state, the respective NewMembers(phase B) and Reconnected(phase B) notifications are never received. In this case DeadMembers(phase A then phase B) are expected as if the computer was in the 'inside' state.

Interfacing with Oplock Users

Figure 13:
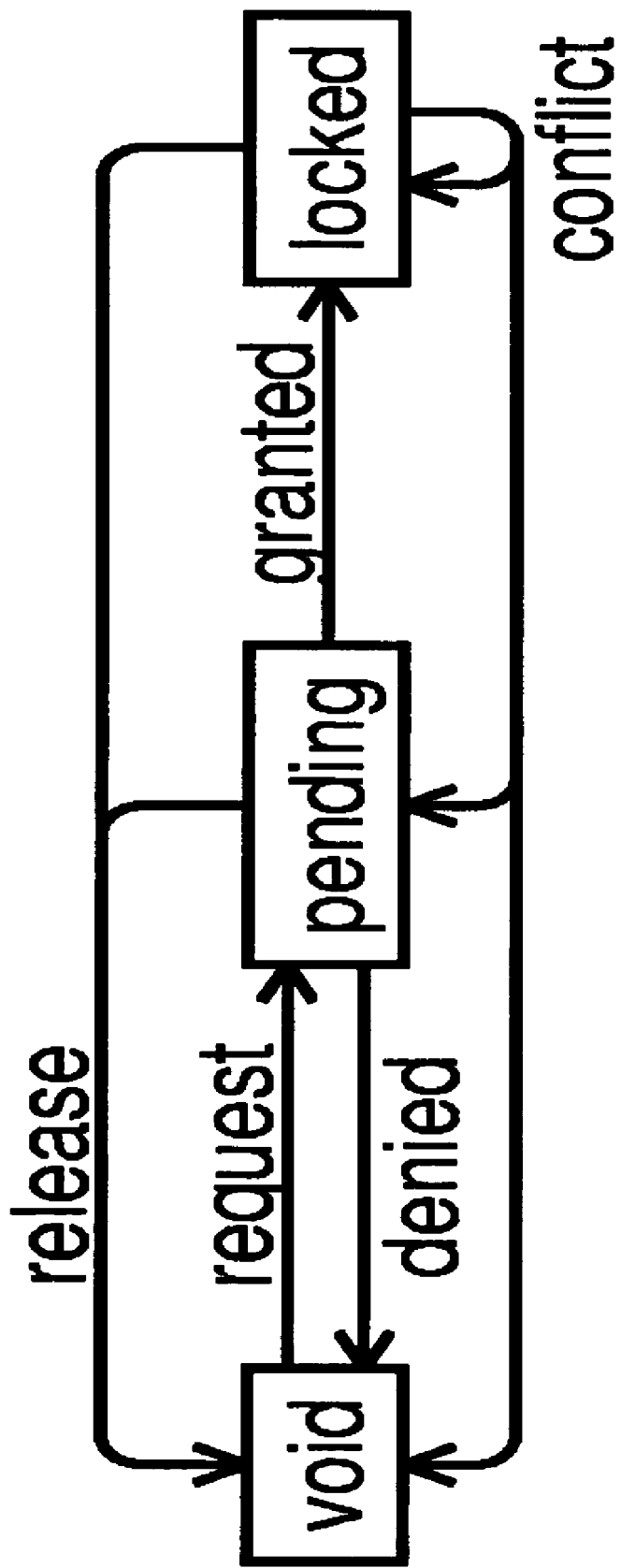
FIG. 13 is a diagram of a state transition diagram of a user request according to an embodiment of the invention.

FIG. 13 is a diagram of a state transition diagram of a user request according to an embodiment of the invention. One purpose of the oplock manager 132 is to provide shared and exclusive locks over shared resource (e.g., a range of shared storage 180).

The lock interface implemented by the oplock manager 132 can be described as objects supporting the following methods:

| Name | Description |
| --- | --- |
| request (g, a, hue) | Access a is requested with gravity g and color hue (lock). |
| release | The requested access is no longer needed (unlock). |
| deny (reason, a, hue) | The requested access will not be surrendered, and thus a request from another computer for access a is denied with color hue. The reason is additional data that can be passed to the denied requestor. |

The requested access may be either shared or exclusive. The gravity is optional value that orders request. When the Oplock needs to select between conflicting access requests, it selects the request with higher gravity.

An implementation may allow one or multiple requests at given time for same region.

The Oplock Manager responds with the following notifications:

| | |
| --- | --- |
| granted | The requested lock was granted. |
| conflict (g, a, hue) | After the request was granted, conflicting request was received. The user may release its lock allowing the received request to proceed. It may also defer, or deny the request. |
| denied (reason) | The request was denied. The reason is copied verbatim from the denying computer to the denied one. The Oplock stops working on that request as if release was called. |

Denial of requests is optional feature that provides notification for requesting users that some other computer is in unreleaseable state. For example some region may be devoted not to physical portion of the shared storage, but to logical state, such as that some file is opened with exclusive sharing access, and thus other attempts for exclusive open should fail. When a computer 110-1 receives request from computer 110-2 to leave its exclusive access to that region, it may discover that it still has that file opened with exclusive access and deny the request. Upon receiving the denial computer 110-2 will abort its attempt to open the file for exclusive access.

Basic Types

Basic types used in an oplock manager 132 include the following:

A. access

A computer in the cluster may be in one of these three states per named shared resource: enum access {NONE, SHRD, EXCL};

B. graviton

This type contains the gravity which lock was requested with. It has to provide full order among all its elements.

C. color

The color type holds the color component of a request. That color is passed verbatim to other request's conflict events. The color type has zero and defines match function that has to be symetric and reflexive, except that match(zero,zero) must not hold. For example the type can be bitmask and the match function could be the bitwise AND operator. The zero value is used by the Oplock Manager and cannot be used by Oplock users. If the color extension is not required the color will have two values: zero and normal, where the normal color will be used for user requests.

D. remote

This type maintains the link to specific computer. It can be used to send data to that computer. Received data is identified with such remote instance. A computer can also identify itself as a remote object known as localhost, although it cannot be used to send data (loopback is not used). Remote objects maintain total order among them (including the localhost), which is guaranteed by the network cluster to be the same regardless of the computer that does the comparison. For example if every cluster member has some numeric ID, that is unique within the cluster, the order may be provided by comparing the IDs that the compared computers have.

E. comparable

The comparable type consists of the triplet <graviton g, remote issuer, remote shrinker>. It allows user requests to receive consistent ordering among all the computers in a cluster 145. Comparing is done in the following order: topmost priority receive the graviton, if unequal, so are the comparables. If gravitons are the same, the issuers are compared according their total order. If issuers are the same, the shrinkers are compared by implementation-defined way that must give top priority to the shrinker that equals the issuer. Other shrinkers provide some total ordering only. The comparison of shrinkers differs from the comparison of issuers, but it still needs the properties for 'comparison stability' that, orders the computers in the cluster.

EXAMPLE

Assuming remote objects are represented by natural numbers, compare as numbers, and shrinkers compare the same as issuers with the required exception mentioned above, sample table with comparable objects is provided. In the table each column represents a comparable triplet; columns on the right represent greater comparables: they are considered more than the ones to the left of them, and less than the ones on their right:

| graviton g | 2 | 3 | 5 | 5 | 7 | 7 | 7 | 7 | 7 | 7 | 8 | 9 |
| --- | --- | --- | --- | --- | --- | --- | --- | --- | --- | --- | --- | --- |
| remote issuer | 6 | 3 | 3 | 8 | 3 | 3 | 4 | 4 | 4 | 4 | 4 | 2 |
| remote shrinker | 6 | 1 | 3 | 4 | 4 | 3 | 3 | 5 | 6 | 4 | 2 | 1 |

Note that the graviton component is optional: the oplock manager may be implemented without it, if for example there is no need for its users to prioritize their requests. In such case the graviton can be considered as having single value that compares equal to itself.

F. cluster time

The cluster time is numeric value that is property of each computer. The Network Manager appends the current cluster time to every message that is sent across the network. Upon receiving of a message, the receiving machine's cluster time is updated to be greater than the time stored in the received message. The oplock manager uses the cluster time to reason about ordering of events—event happened at cluster time A cannot have influenced event that happened at cluster time B if A≧B.

See also notes in the related application describing the transaction manager 172.

Figure 14:
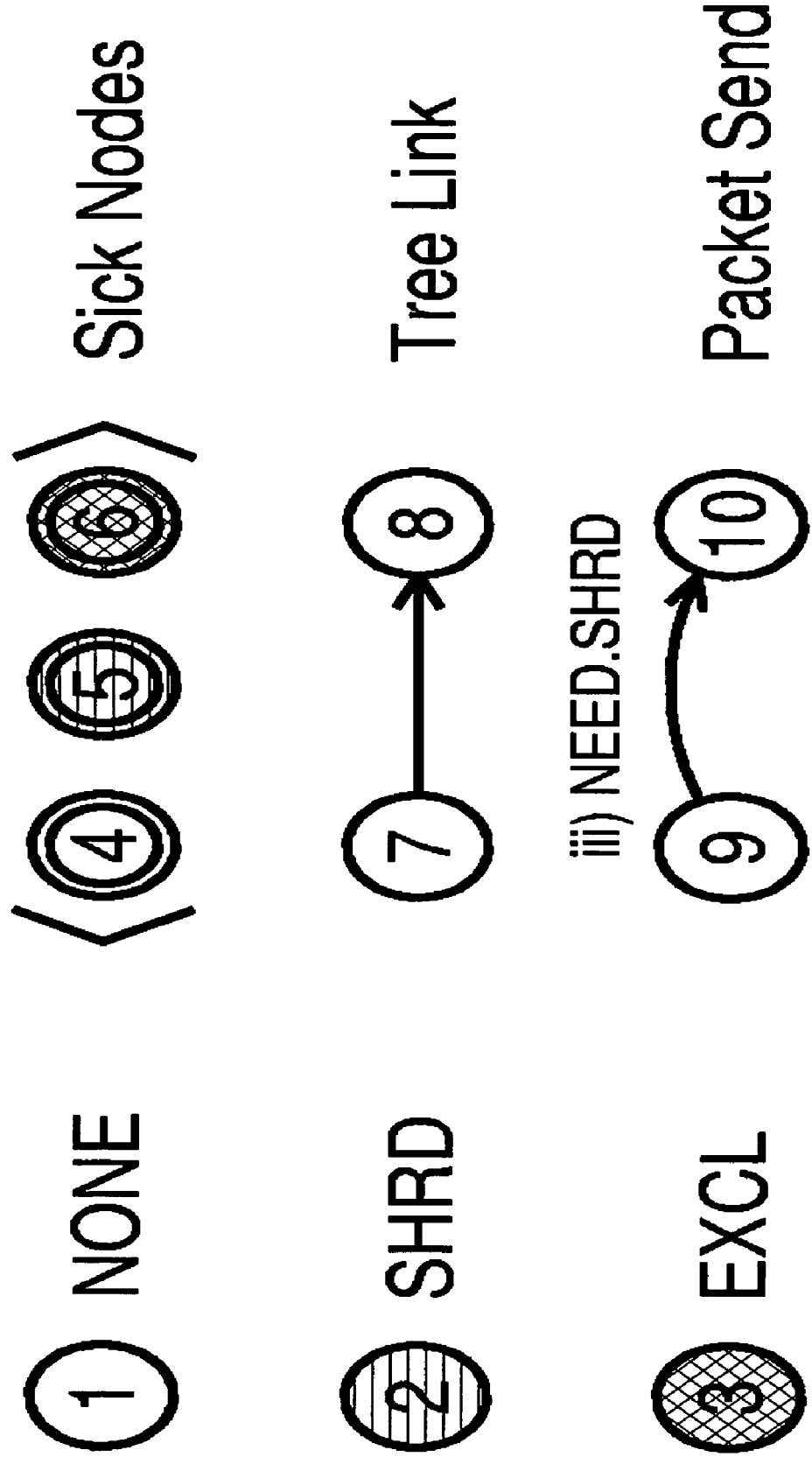
FIG. 14 is a diagram of symbols to describe connectivity and related features according to an embodiment of the invention.

FIG. 14 is a diagram of symbols to describe connectivity and related features according to an embodiment of the invention. In general, this specification utilizes the following notation: NONE describes a computer having no access rights, SHRD describes computers having shared (read) access rights and EXCL describes computers having exclusive (write) access rights to the given named shared resource. These symbols are used in other figures. The exact semantics of these three states is that computer having EXCL access can safely assume that all other computers have NONE access, and a computer having SHRD access can assume that no other computer has EXCL access.

Diagrams are used to represent the state of a cluster. As discussed, this can change over time. A computer is represented by a circle which is hollow for NONE access, horizontally hatched for SHRD access, and cross hatched for EXCL access.

A tree connecting the computers is displayed by straight arrows. Sending or transmission of messages is represented by curved arrows. Sick computers are denoted by a double circle. The sick state is used during recovery.

Note that certain figures in this specification include "Time Views" in where computers in a cluster are represented by vertical bars. In such time views, time increases downward so that older events are closer to the top of the page. A message sent from a computer to another computer is represented by arrow from one of the bars to the other. The position where an arrow begins and ends identifies an order of sending and receiving of messages.

Figure 15:
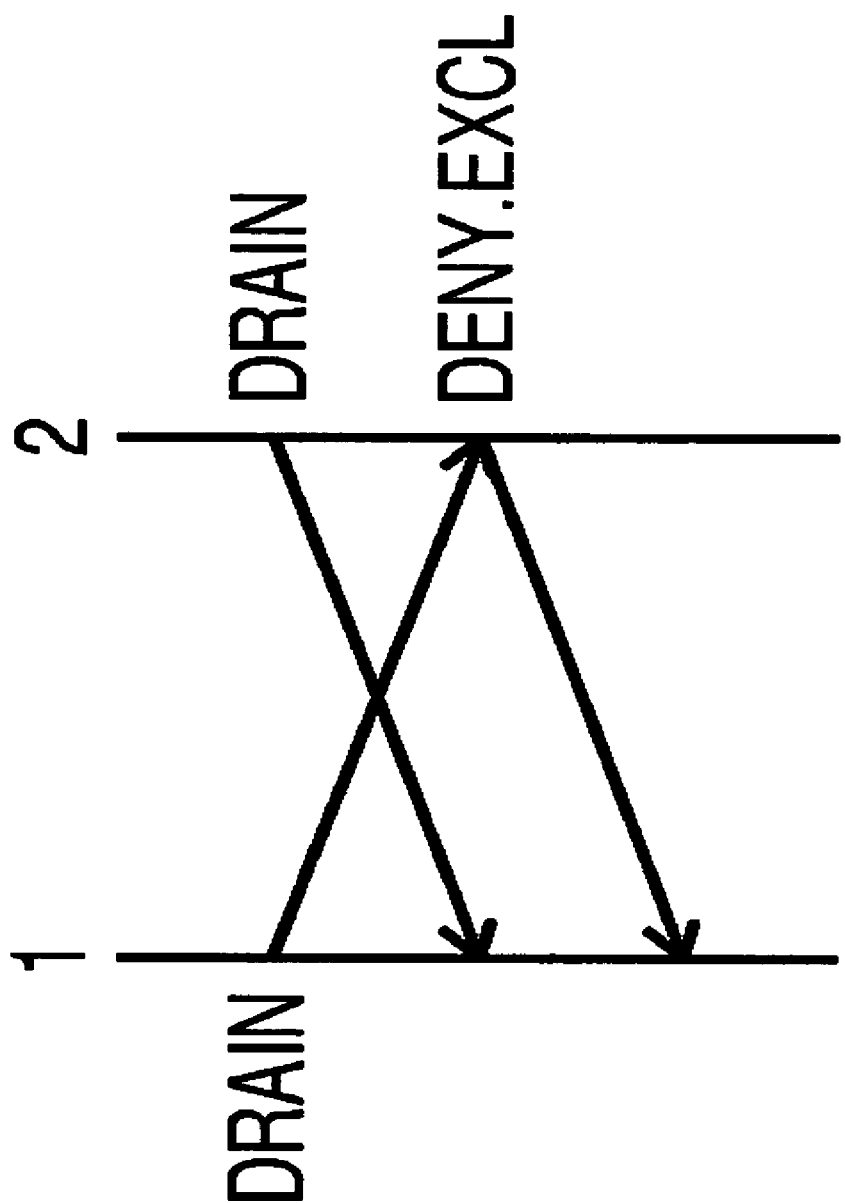
FIG. 15 is a diagram of a drain request process according to an embodiment of the invention.

FIG. 15 is a time view diagram of a drain request process according to an embodiment of the invention. As shown, there are two computers in the diagram, computer 1 and computer 2. The computers concurrently send DRAIN messages to each other. Assume that either one of the computers sent the message first. What is known is that the DRAIN request generated by computer 1 was received by computer 2 after computer 2 had sent its DRAIN message to computer 1. In this example, computer 2 answers with DENY.EXCL message to computer 1 after it received the DRAIN from computer 1. So computer 1 sent DRAIN and then received DRAIN followed by DENY.EXCL. Computer 2 sent DRAIN and after receiving another DRAIN sent DENY.EXCL.

Note that any two messages sent from one computer to another computer have the same order of arrival as their sending order. For example, since computer 2 above sent DRAIN message before sending DENY.EXCL to the same computer 1, computer 1 will receives the DRAIN message before the DENY.EXCL.

Figure 16:
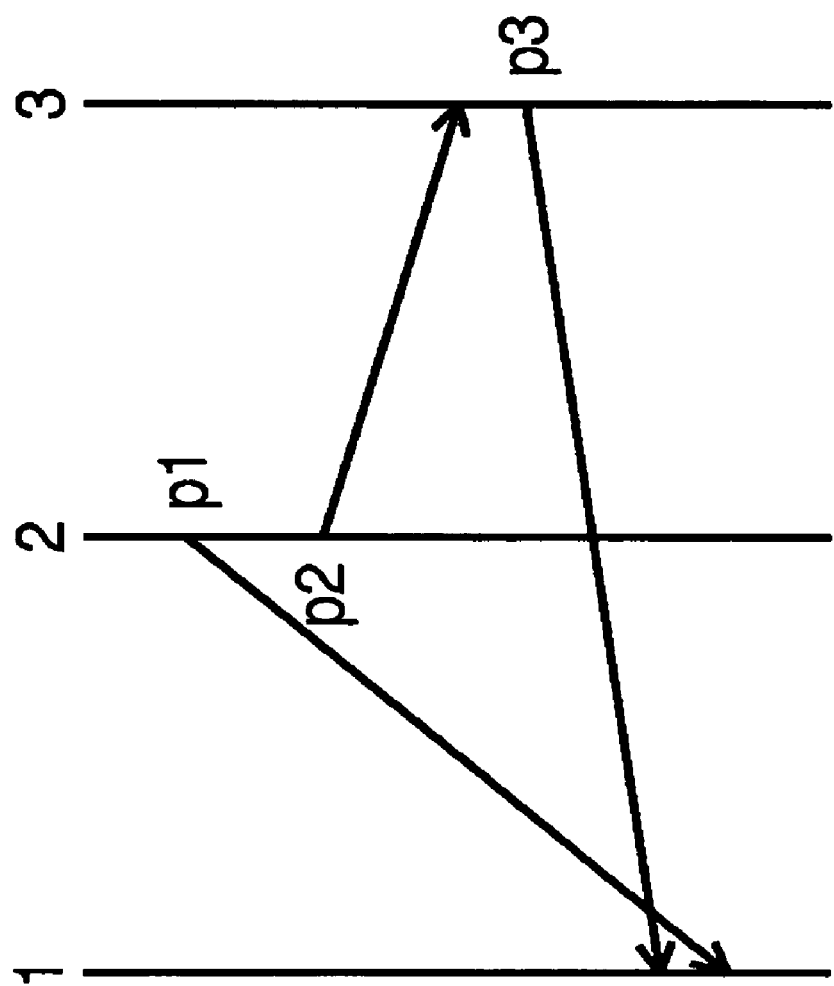
FIG. 16 is a diagram of a message outrun according to an embodiment of the invention.

A reordering of when messages are received is possible when three or more computers are involved. This is shown in FIG. 16, which is a diagram of a message outrun according to an embodiment of the invention. According to FIG. 16, Computer 2 sends the message p1 before sending message p2. The receiving of p2 by computer 3 causes computer 3 to send message p3 to computer 1 a little later. It is possible that p1 arrives before or after p3 in computer 1. In the diagram, message p3 arrives before p1.

As previously discussed, computers in the cluster 145 are connected in a tree structure. The tree is rooted at some computer. Every computer except the root has link toward some other computer, which is named leader of the computer. A computer without a leader or pointer is a sole leader. In general, computers include links that point toward computers having the same or greater access rights. If the link is between computers with SHRD access, both computers know each other as having shared access. The link is still asymmetric—one of the computers is leader of the other. If the link is from computer with NONE access, the target computer keeps no back link. As consequence, computer with EXCL access links to no other computer, while it may be the case that every other computer (each having NONE access) has linked to it (as its leader).

Figure 17:
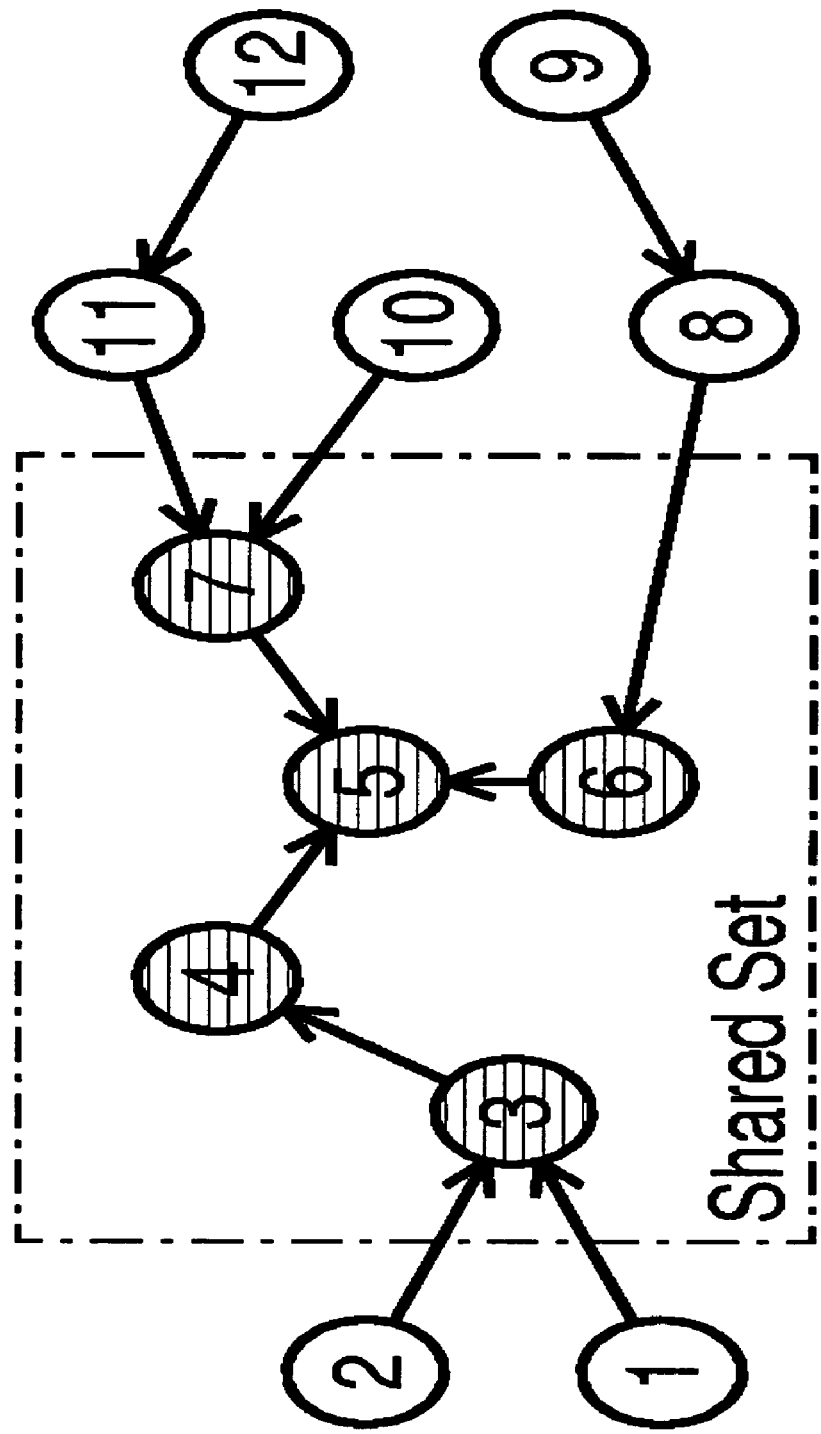
FIG. 17 is a diagram of a sample cluster with shared owners according to an embodiment of the invention.

FIG. 17 is a diagram of a sample cluster with shared owners according to an embodiment of the invention. Computers 3 to 7 have SHRD access. Other computers have NONE access. The leader is computer 5. Computers 1 and 2 point to 3 as their leader. Computer 3 does not keep record that these computers point to it. Computer 3 points to computer 4 as its leader. Computer 4 points to computer 3 and 5 as other shared computers, from which computer 5 is its leader. Computer 5 points to computers 4, 6 and 7 of which no one is its leader as computer 5 is the root. A computer 110-4 with shared access has link to one or more other computers that also have shared access. The difference between computers having SHRD and NONE access is that, computers having NONE access will not receive any notification if another computer receives EXCL access, while all computers having SHRD access will get notified and will even be waited upon to release their access prior to granting EXCL access to another computer.

Figure 18:
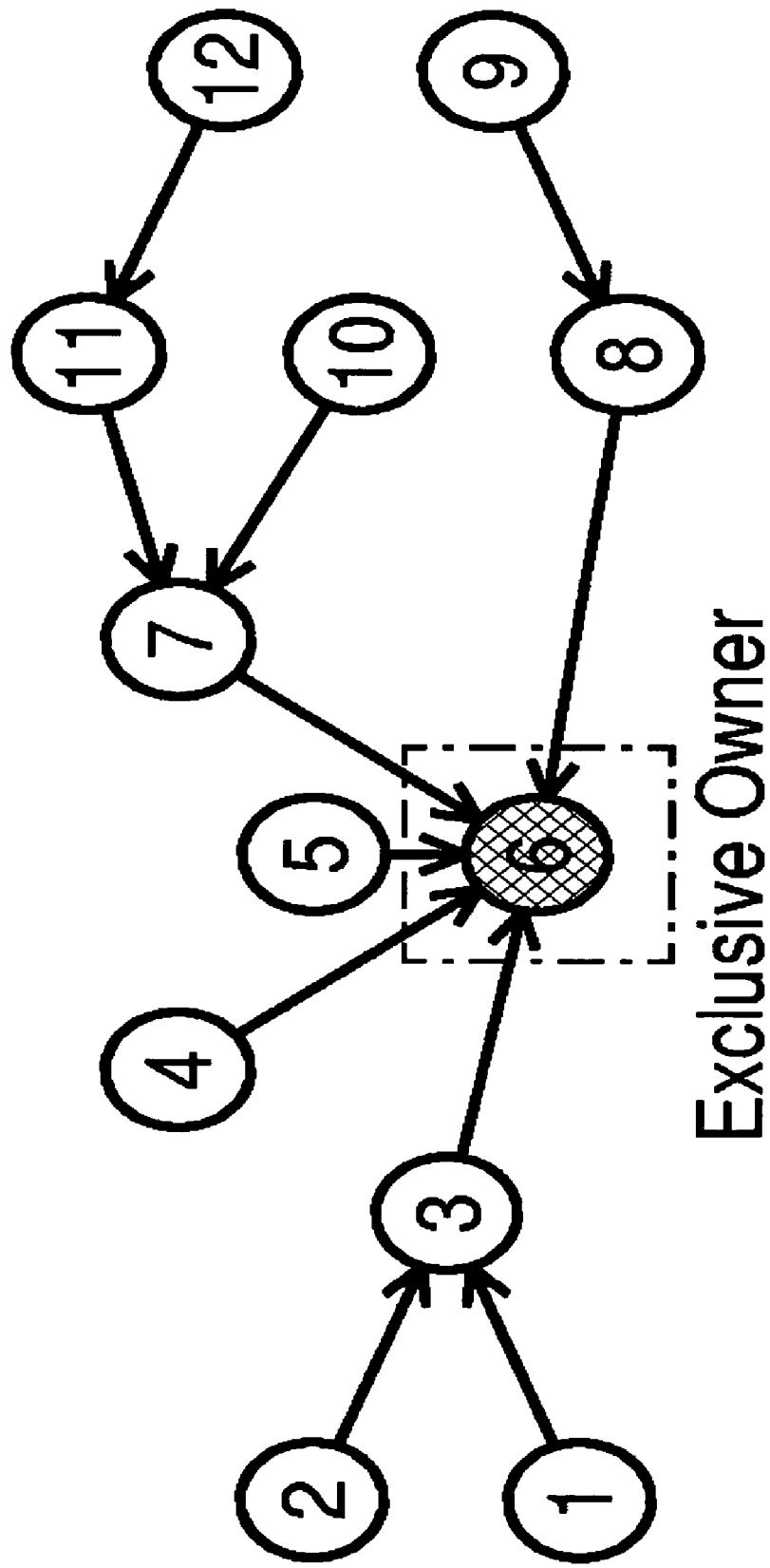
FIG. 18 is a diagram of a sample cluster with an exclusive owner according to an embodiment of the invention.

FIG. 18 is a diagram of a sample cluster with an exclusive owner according to an embodiment of the invention. As shown, computer 6 gained EXCL access rights from other computers as shown in FIG. 17. That is, other SHRD owners lost their access rights. The tree is reorganized so all SHRD owners have computer 6 as their leader now. Computer 6 is the root computer.

Bootstrapping a Cluster

Figure 19:
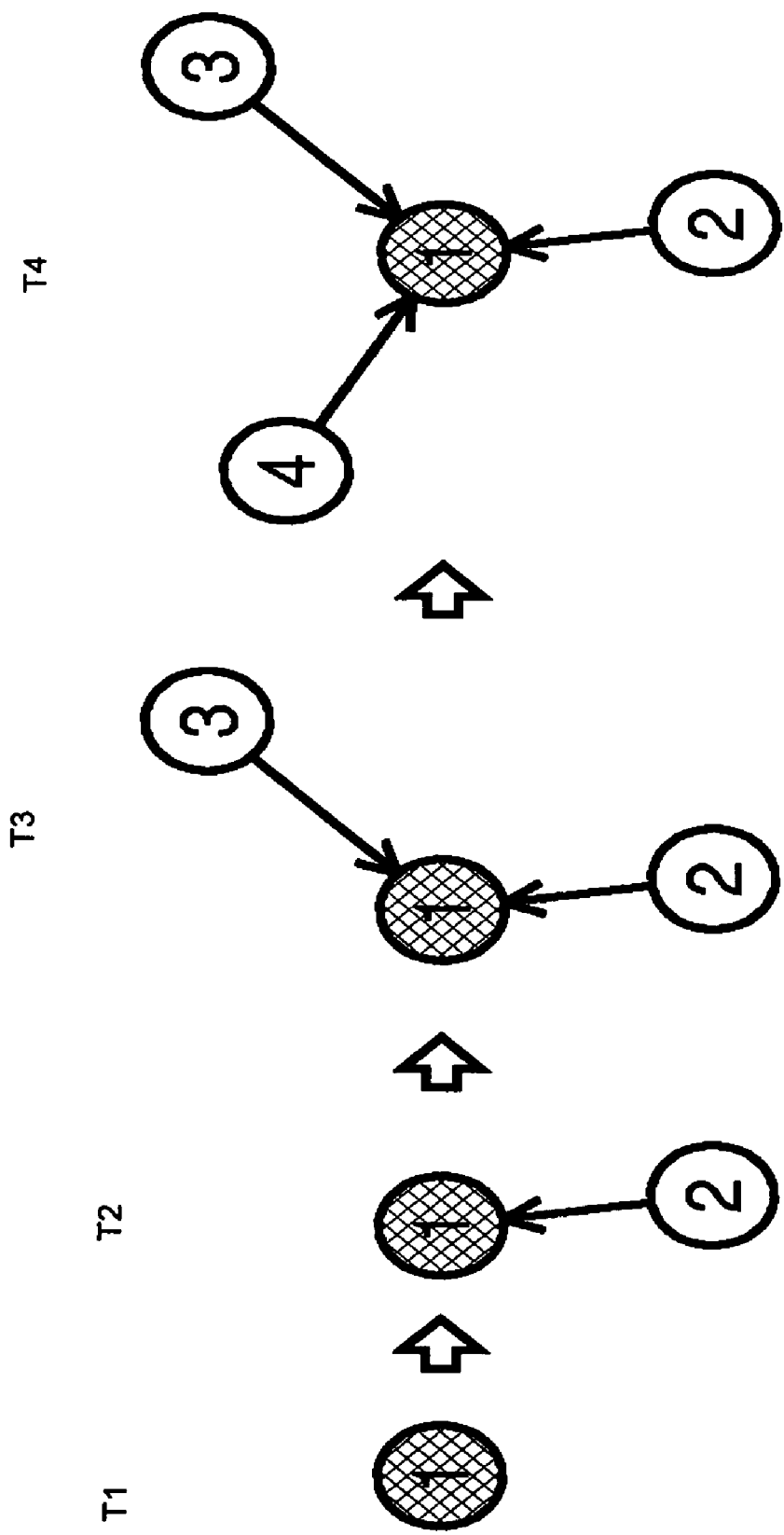
FIG. 19 is a diagram of starting a cluster according to an embodiment of the invention.

FIG. 19 is a diagram illustrating starting of a cluster 145 according to an embodiment of the invention. A first machine (labeled 1) that enters the cluster 145 at t1 is assigned EXCL rights immediately. Subsequent machines (e.g., computers 2, 3, and 4 at respective times t2, t3, and t4) start with NONE access and attach themselves via pointers to a machine that is already inside the cluster as their leader.

Increasing Access for Computer with NONE Access

To obtain access rights for a machine having NONE rights, the computer (e.g., respective computer 110 in the cluster 145) without access sends a NEED request (NEED.SHRD or NEED.EXCL) to its leader. The request, sent over the network, contains the desired access (shared or exclusive), the computer, that needs that request (the issuer computer) and the gravity and color of the request. The request is forwarded through one or more leader computers until the request reaches a computer with at least SHRD access. If the request has high enough priority, the request is satisfied by a computer receiving the request responding with a JOINT request from SHRD owner so now both computers know themselves are SHARED computers (e.g., both computers have shared access rights to a region).

Figure 20:
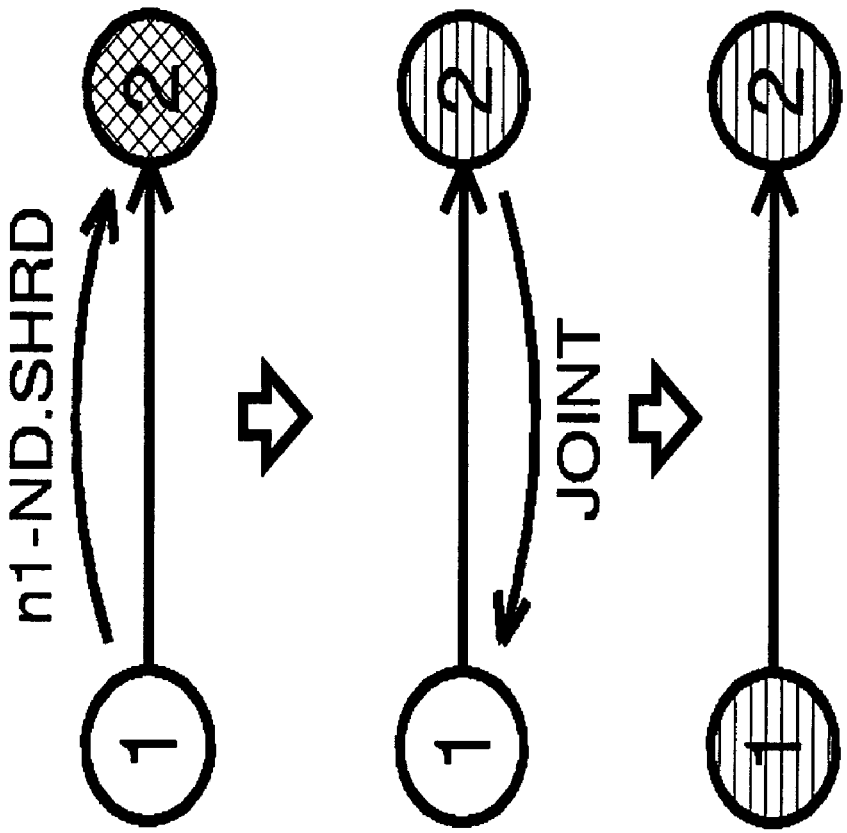
FIG. 20 is a diagram illustrating a direct shared grant according to an embodiment of the invention.

FIG. 20 is a diagram illustrating a direct shared grant by a leader computer according to an embodiment of the invention. For example, at step 2010 computer #1 sends a request message for shared access to computer # 2 which initially has exclusive access rights.

In step 2020, computer #2 changes its access rights to shared and send a JOINT message to computer #1. Computer #2 records computer #1 as its neighbor.

In step 2030, based on receiving the JOINT message, computer #1 changes its status from NONE to SHARED access. Computer #1 sets computer #2 as its neighbor and leader.

Figure 21:
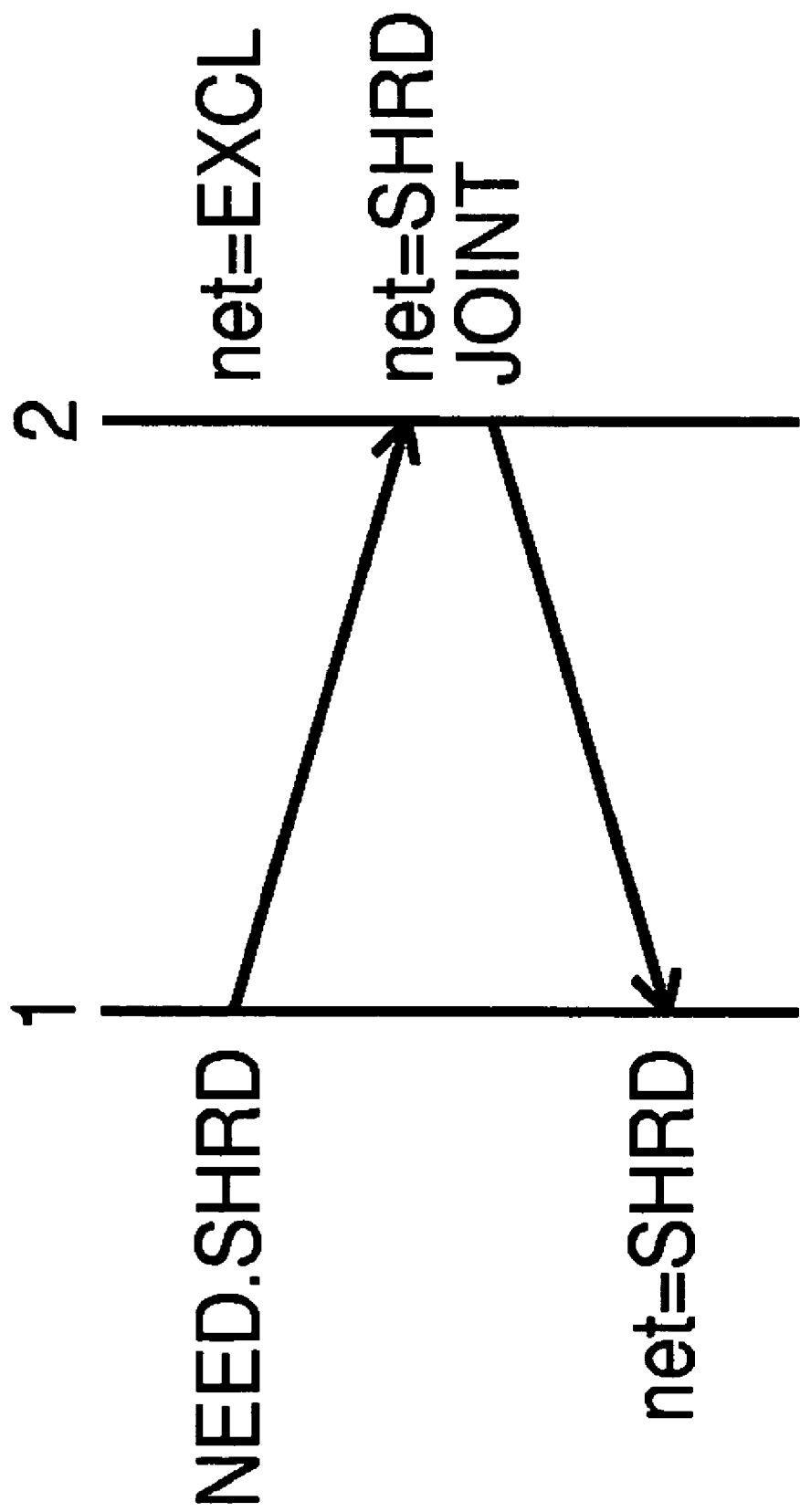
FIG. 21 is a timing diagram of a shared grant according to an embodiment of the invention.

FIG. 21 is a timing diagram of sending and receiving messages as discussed above for FIG. 20 according to an embodiment of the invention. As shown, computer #1 sends a request for shared access to computer #2. Computer #2 responds by transmitting a JOINT message to computer #1.

Figure 22:
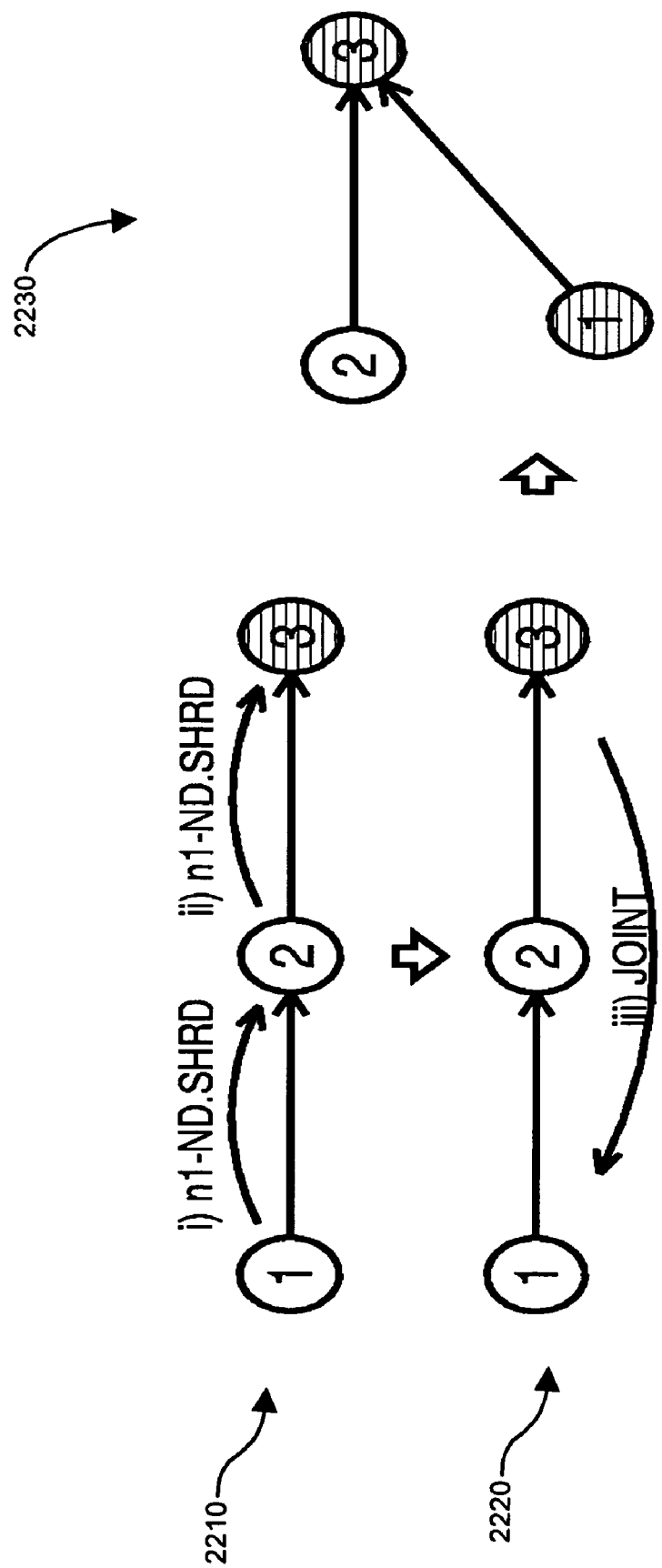
FIG. 22 is a diagram of a direct shared grant via a no access computer according to an embodiment of the invention.

FIG. 22 is a diagram of forwarding a request among multiple successive computers to a leader having access rights in the region. As shown in step 2210, a NEED access request is passed through a leader machine having NONE access until the request reaches a computer having SHARED or EXCLUSIVE access rights.

At step 2220, computer #3 sends a JOINT message to the issuer computer as specified in the request: computer #1 in response to receiving the request and adds computer #1 as a neighbor.

Figure 23:
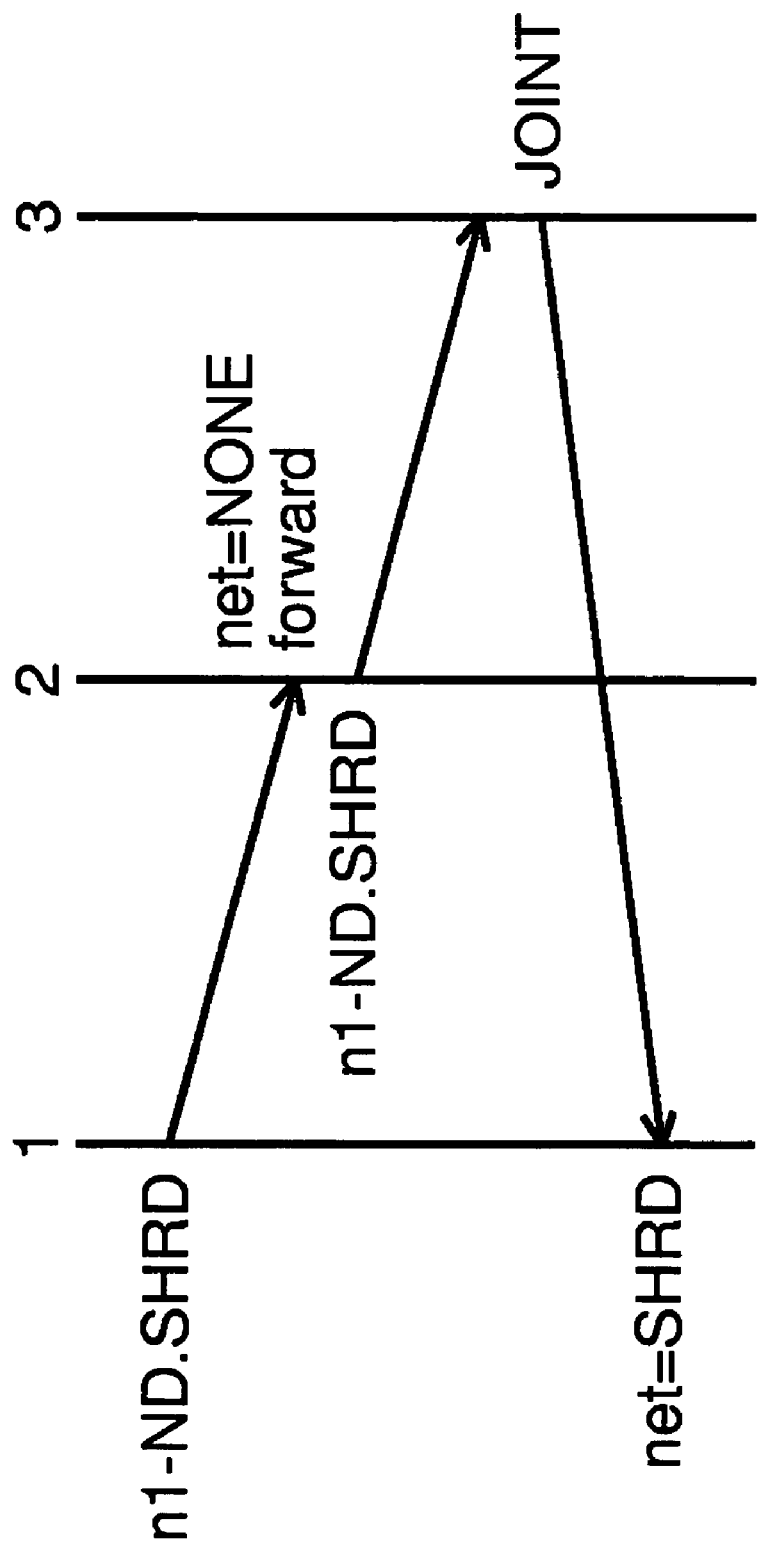
FIG. 23 is a diagram of a direct shared grant via a no access computer according to an embodiment of the invention.

At step 2230, computer #1 sets computer #3 as its leader (i.e. updates its neighbor set to include single pointer associated with the sender of the JOINT message, computer #3 and records computer #3 as its leader. FIG. 23 is a timing diagram illustrating a transmission of messages for the steps described in FIG. 22 according to an embodiment of the invention.

In both figures (20 and 22) the requesting computer does the same thing: it requests access by sending NEED request to its leader. In both cases it gets access when receiving JOINT messages: it upgrades to SHRD access, and sets the sender of the JOINT message as its new leader (and neighbor). FIG. 22 also shows the behavior of intermediate computers with NONE access to forward NEED requests up to their own leader.

Saturation

Figure 24:
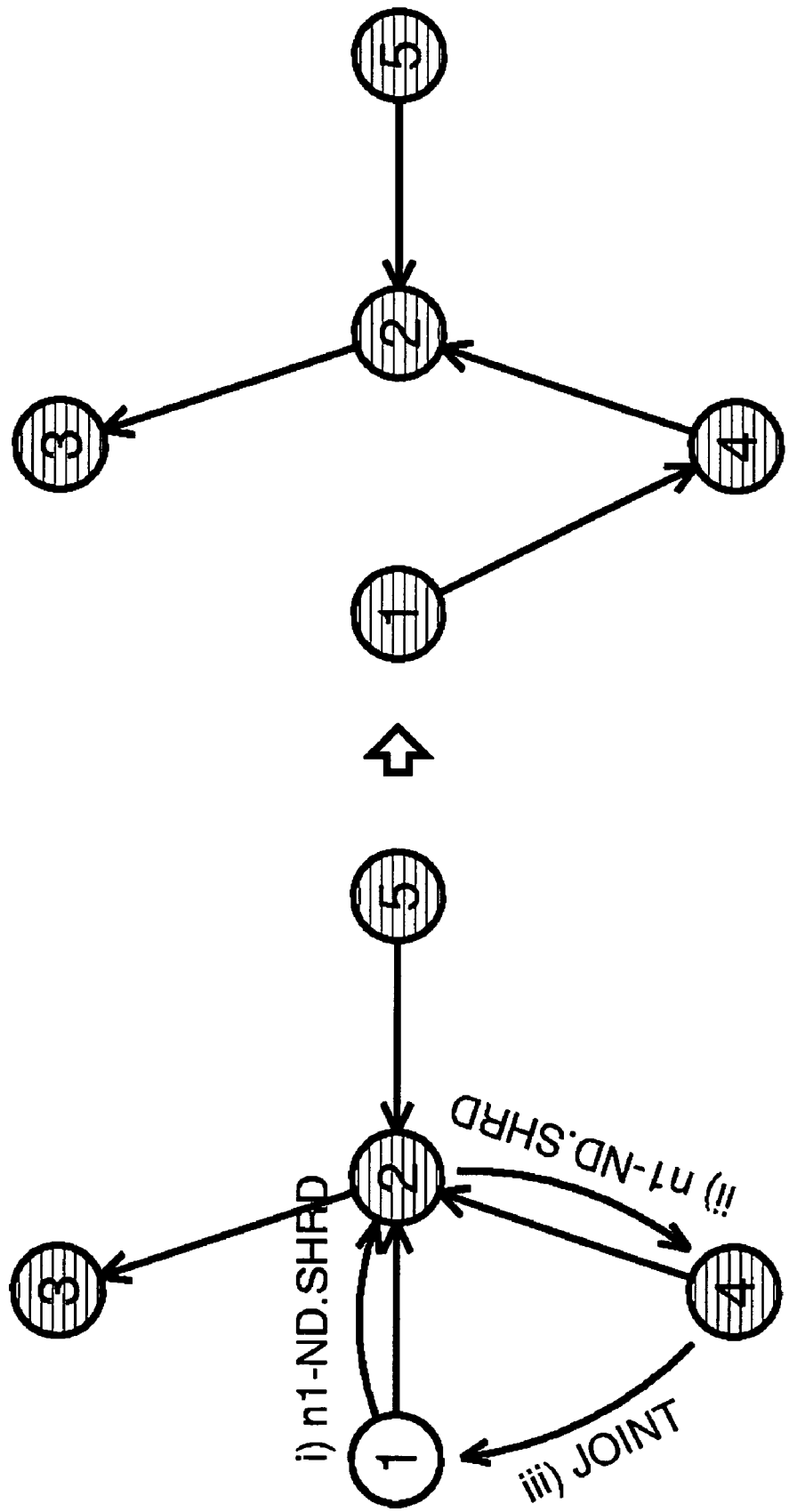
FIG. 24 is a diagram of a grant resulting in saturation according to an embodiment of the invention.

FIG. 24 is a diagram of a grant of access rights according to an embodiment of the invention.

In one embodiment, a computer having SHARED access may impose an upper limit on the number of other computers that it may point to identifying other SHARED computers. A limit may be imposed to prevent the neighbor set 510 at a given computer 110 to grow too large. When a pointer limit is reached, the computer is saturated. When a saturated computer decides to satisfy a SHRD access request, it has to redirect the requesting computer to one of its neighbors. For example, if computer 2 cannot point to more than three other computers having SHARED access rights, it will have to forward the NEED request message to computer 3, 4 or 5.

More specifically, as shown in FIG. 24, computer 1 in cluster 145 sends (step i) a NEED.SHRD access request to its leader, computer 2. Computer 2 has SHRD access and decides to satisfy the request, but it is saturated so it forwards (step ii) the request to another member in cluster to which it points such as computer 4. Computer 4 also decides to satisfy the request. Computer 4 is not saturated so it sends (step iii) the JOINT request to computer 1. Computer 1 is added to the neighbor set of computer 4. Computer 1 receives SHARED access and sets computer 4 to be its leader computer. Consequently, computers 2, 3,4, and 5 initially have shared access. However, based on the request by computer 1, computers 1, 2, 3, 4, and 5 have shared access.

In one embodiment, request messages are redirected so that new members are evenly added to an existing set of computers having shared access. For example computer 2 may rotate the neighbors it forwards to (upon saturation) NEED.SHRD requests, i.e. after forwarding to computer 4, if another request comes, it may be forwarded to computer 5, then 3, 4 and so on. It is advisable that request messages are never sent back as to ensure finite number of redirects before reaching non-saturated computer.

Direct Transfer of EXCL Access

Figure 25:
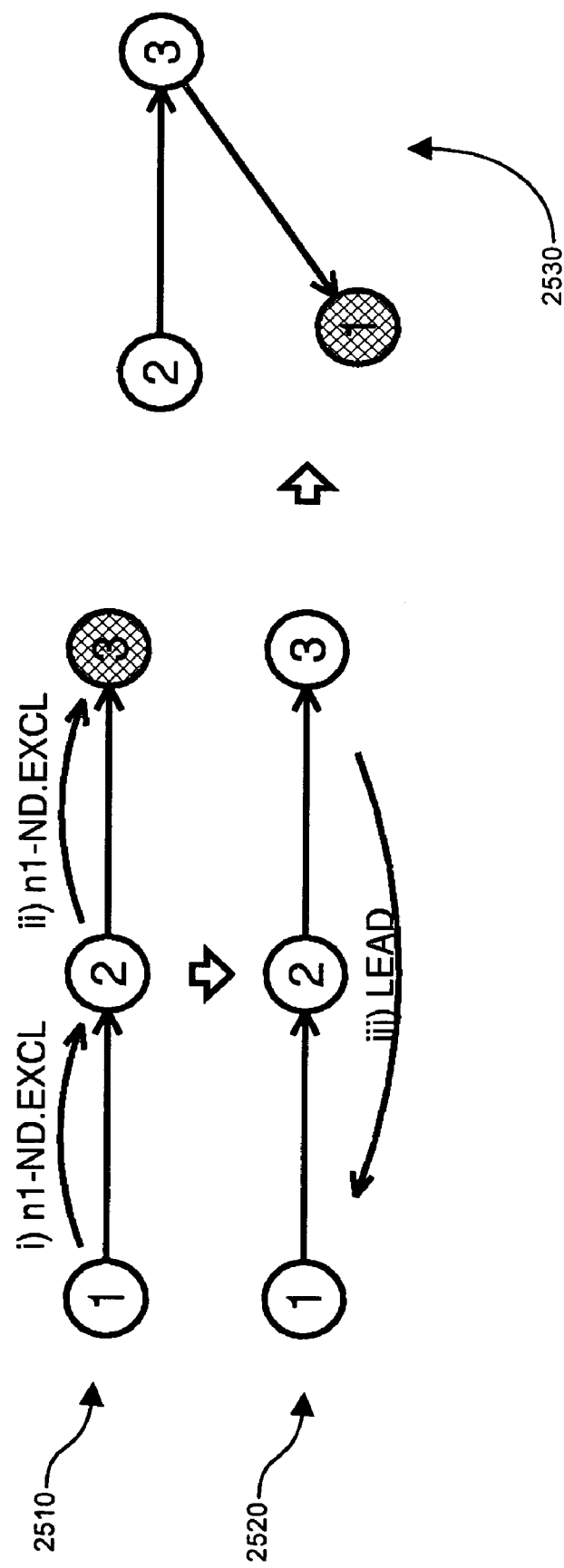
FIG. 25 is a diagram illustrating usage of a lead message to transfer access rights according to an embodiment of the invention.

FIG. 25 is a diagram illustrating usage of a lead message according to an embodiment of the invention. As shown, a computer with NONE access requesting EXCL rights needs to send a NEED.EXCL request message up to its leader. Computers without access forward the request to the computer having exclusive access rights as with NEED.SHRD request. Computers with SHRD access cannot directly handle that request. They must first reach EXCL access. Computers with EXCL access transfer their access to the requester with single LEAD message.

For example, in step 2510, computer 1 transmits a need exclusive access request message to its leader, computer 2. Computer 2 in turn forwards the request to its leader, computer 3.

In step 2520, computer 3 sends a LEAD message to computer 1 indicating to computer 1 that it is granted the exclusive rights. Computer 3 sets computer 1 as its leader computer.

In step 2530, computer 1 accepts the exclusive access and deletes its pointer to computer 2. Node 1 is the root computer having exclusive access now.

Figure 26:
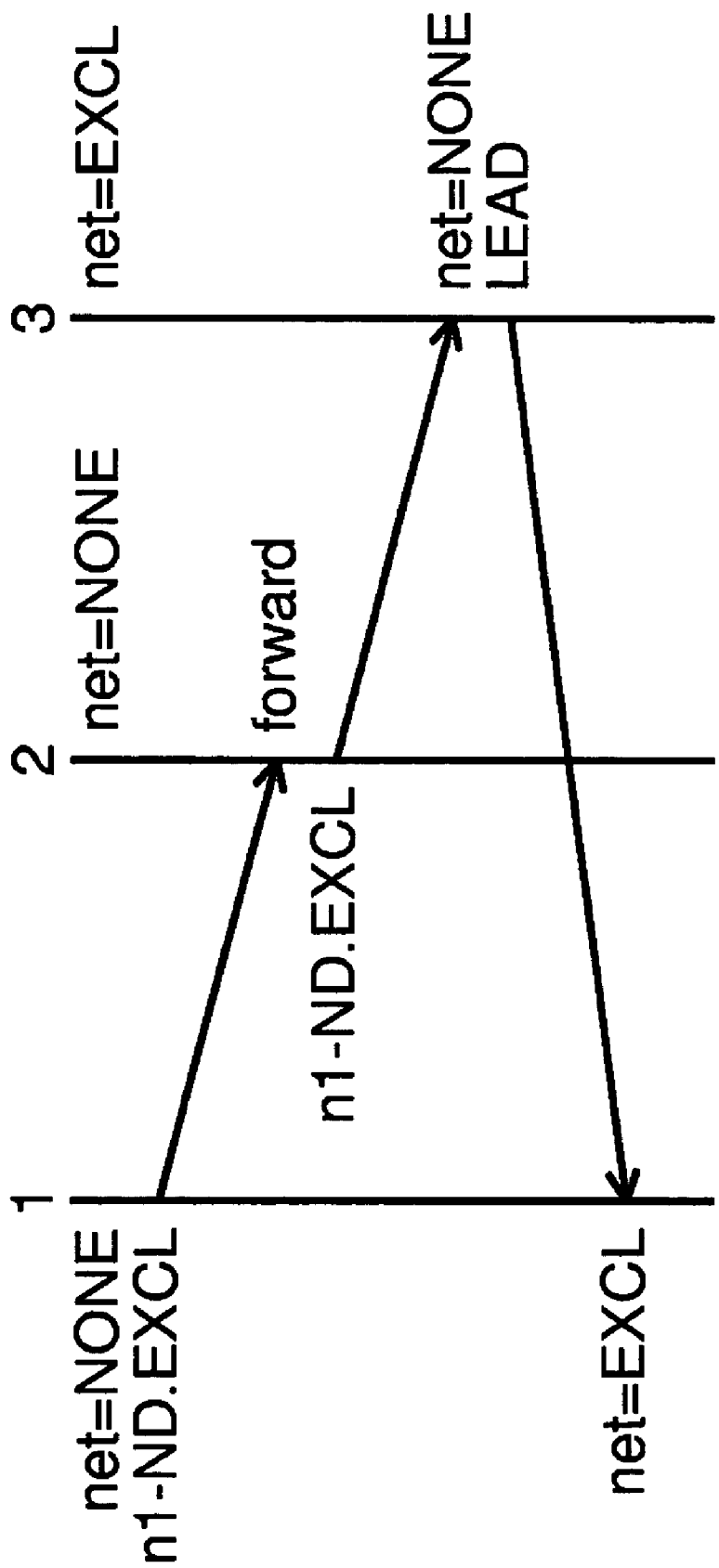
FIG. 26 is a timing diagram illustrating usage of a lead message according to an embodiment of the invention.

FIG. 26 is a timing diagram illustrating transfer of exclusive access rights to a computer previously having no access rights according to an embodiment of the invention as discussed in FIG. 25.

Draining SHRD to EXCL Access

Figure 27:
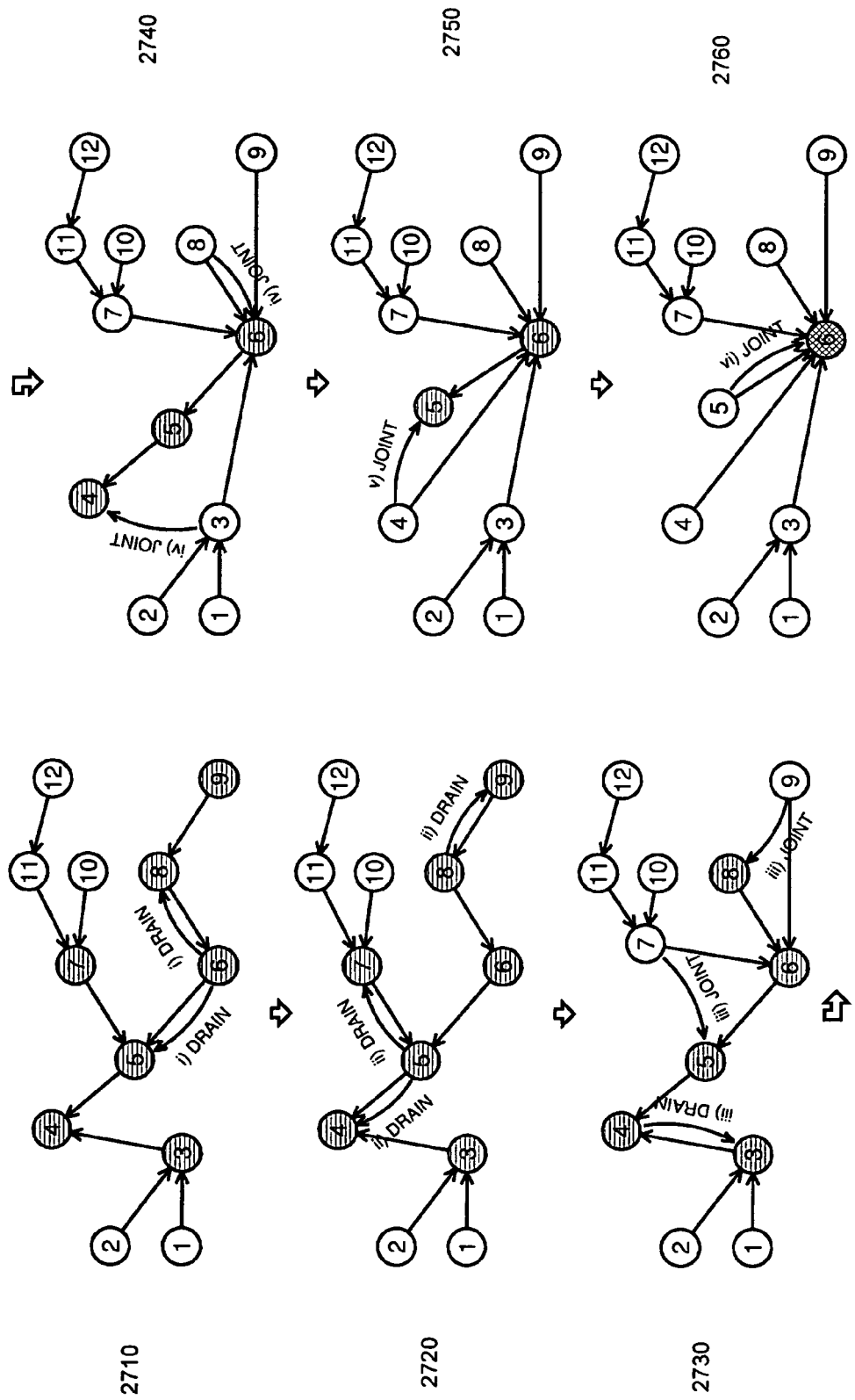
FIG. 27 is a diagram illustrating an example of draining according to an embodiment of the invention.

FIG. 27 is a diagram illustrating an example of draining computers according to an embodiment of the invention. As shown, a computer having SHRD access rights utilizes a method called draining to obtain EXCL access rights.

Since a computer such as computer 6 has shared access, it is connected with other owners having shared access. The draining process involves shrinking the neighbors set around the requestor using DRAIN and JOINT messages. The diagram below shows how computer 6 uses draining to shrink the neighbors set around itself, so it can achieve EXCL access. DRAIN messages contain the so called 'shrinker' computer that performs the draining (computer 6 on FIG. 27), the gravity and color of the request and the computer that had requested EXCL access (the issuer). The issuer and the gravity are used to order competitive drainings only. The issuer is the same as the shrinker in the example on FIG. 27.

In step 2710, computer 6 requests exclusive access for a given region of the shared storage 180. At the time of the request, computer 4 is the root computer. Computer 6 begins a drain process by sending drain messages to its neighbors—computer 5 and computer 8.

In step 2720, computer 5 forwards the drain request to computer 4 and computer 7. Computer 8 forwards the message to computer 9. The drain message propagates outward from a set of computers having shared access until fringe computers have no pointers to other SHARED computers.

In step 2730, computer 4 forwards the drain request to computer 3. Computer 7, having no other neighbors than the requesting computer 5, drops its access: It updates its access rights to NONE access, sets computer 6 (the shrinker received with the DRAIN request) as its leader and sends a JOINT message to computer 5. Computer 7 also removes computer 5 from its neighbor set so only its leader remains there. Computer 9 respectively sends a JOINT message to computer 8 and updates its leader computer to be computer 6 removing computer 8 as a neighbor. Computer 9 updates its access rights to be NONE too.

In step 2740, computer 3 sends a JOINT message to computer 4 and updates its leader computer to be computer 6 removing computer 4. Computer 3 updates its access rights to be NONE. Computer 8, handles the JOINT message from computer 9 by removing computer 9 from its neighbor set. Thus it remains with only computer 6 as a neighbor, and thus proceeds as computer 3: It sends a JOINT message to computer 6 and updates its access rights to be NONE. Computer 8 continues to maintain a pointer to computer 6 as its leader.

In step 2750, computer 4, also left with single neighbor, sends a JOINT message to computer 5 and updates its leader computer to be computer 6, removing computer 5 from its neighbor set. Computer 4 updates its access rights to be NONE.

In step 2760, computer 5 sends a JOINT message to computer 6. Computer 5 updates its access rights to be NONE and sets computer 6 as its leader (and only neighbor). Computer 6 updates its rights to EXCL access.

Note that when a computer disconnects from a set of computers having shared access, the computer sends a JOINT message to notify members of the neighbors set. The computer also sets the shrinker computer propagated by the DRAIN messages as its leader.

As shown, JOINT messages are used to both create and destroy 'shared' links among computers. A link is established when computer with NONE access receives SHRD access via JOINT message. The sender of the message has put the issuer in its neighbor set. The receiver, having NONE access promotes to SHRD access and sets the sender of the JOINT message as its only neighbor and leader.

JOINT messages also destroy that link. When a computer has only one neighbor, it can drop its access to NONE. This happens by sending JOINT message to that neighbor, to notify it, that the 'shared' link is discontinued. Dropping of shared access is initiated by DRAIN request received by one of the computer's neighbors. If the computer has other neighbors in its neighbors set, it requests them to drop access (by forwarding the DRAIN request), and records the DRAIN request in internal queue. When the neighbor that sent the DRAIN request remains the only neighbor, the request is removed from the queue and handled by updating to NONE access, sending JOINT to that last neighbor and setting the DRAIN's shrinker as only leader. If the neighbor that sent the DRAIN discontinues the link (by sending JOINT message), the DRAIN is discarded from the queue.

The semantics of the JOINT message are determined according to the current state of the receiving computer: if the receiver has NONE access it accepts JOINT as a 'shared grant', if the receiver has SHRD access and the message comes from one of its neighbors, it removes the sender out of its neighbors set.

It is possible that computer has requested SHRD access multiple times. One of the requests gets satisfied and the computer receives SHRD access. Later another computer, that queued the other request, decides to also satisfy it and sends JOINT to the same requestor. As result the requestor, now having SHRD access receives JOINT from non-neighbor. In this case it bounces the JOINT back which effectively cancels the second grant.

It is possible that two computers (having SHRD access) at the same time decide to give SHRD access to each other. Thus both computers will send to each other JOINT message. In this case when the JOINT is received, both computers will detach the shared link as if they had requested it via a DRAIN.

In summary, JOINT is only accepted by computer with NONE access, and is bounced back otherwise. This ensures that cycles do not occur and that even if a computer may create incorrect link to another computer, this will be remedied soon.

Multiple DRAIN requests might be active at the same time. To avoid deadlock, DRAIN requests are subject to a comparison technique to determine priority. An order can be expressed in comparable entities having members: gravity which EXCL access is requested with; the issuer computer ID, which asks for the access; and the shrinker computer ID that initiated the draining. Ordering of these entities is defined in the Basic Data Types section. When a computer with SHRD access initiates draining, the issuer and the shrinker parts are the same—that computer. The issuer differs from the shrinker when a computer, having SHRD access, begins draining in order to satisfy NEED.EXCL request from another computer. In this case the issuer comes from the NEED.EXCL request, while the shrinker is the computer that starts the draining.

Figure 28:
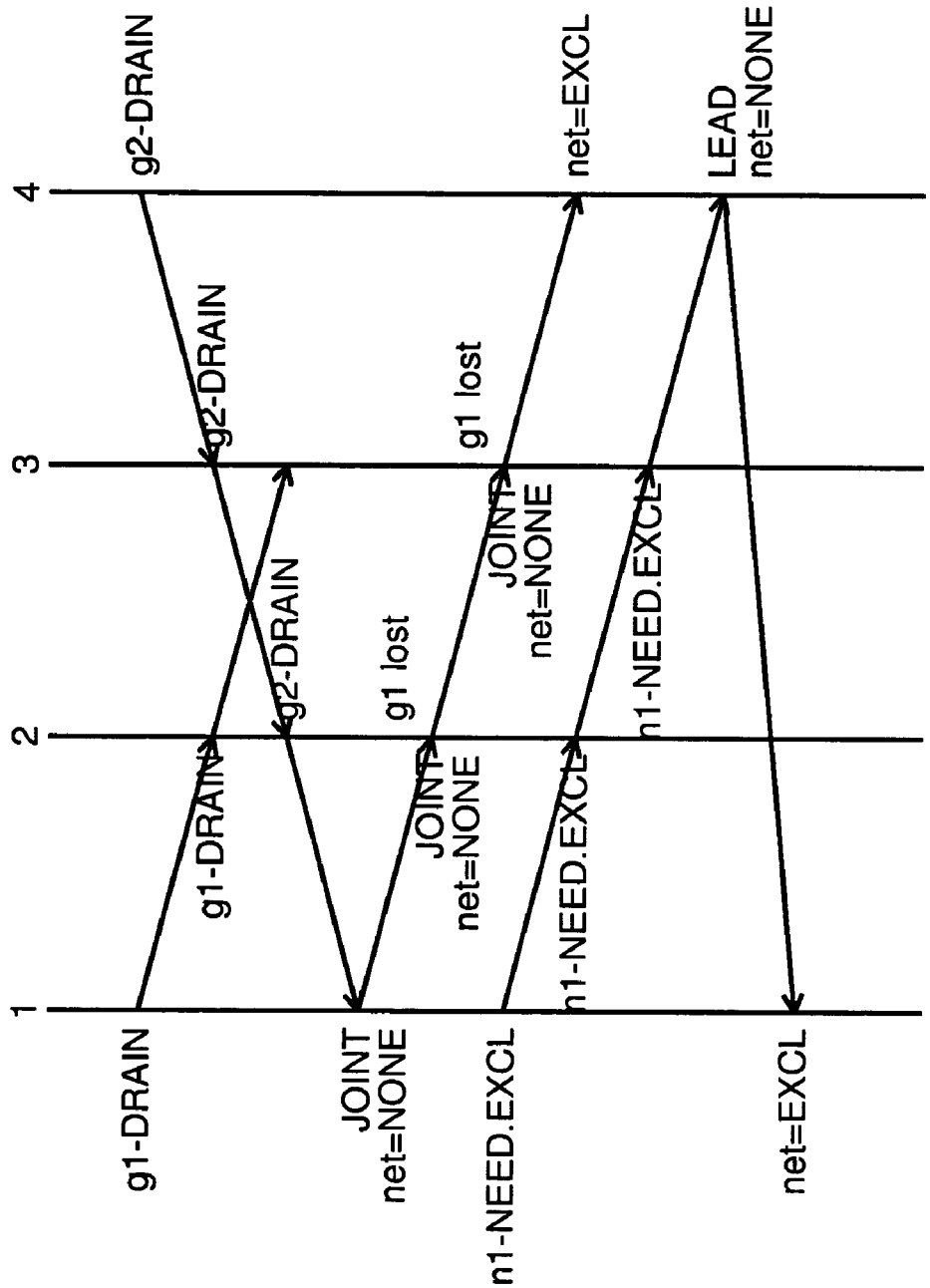
FIG. 28 is a timing diagram illustrating an example of draining according to an embodiment of the invention.

FIG. 28 is a timing diagram illustrating an example of draining according to an embodiment of the invention. As shown, both computer 1 and 4 initiate a draining routine by sending DRAIN messages. Since computer 4 drains with higher gravity (2), draining of computer 4 finishes first. Computer 1 loses its access and has to rerequest its desire for EXCL access (using NEED.EXCL message as it has NONE access now). This diagram also shows a LEAD message message that computer 4 will use to transfer the EXCL access to computer 1. For example, computer 4 in the latest point in the diagram transmits a message to computer 1 so that computer 1 gets exclusive access.

The 'g1-lost' labels on FIG. 28 represent the fact that when computer loses a neighbor, it deletes any pending DRAIN requests received from that neighbor. In the case of FIG. 28, DRAIN requests from computer 1 are sent to computers 2 and 3. Computer 3 has already received stronger DRAIN from computer 4 and can (temporarily) suspend sending computer 1's DRAIN message to computer 4. So the only computers that know of (i.e. keep state about) computer 1's draining are computers 1, 2 and 3. All the three computers destroy the message when they receive the JOINT requests. Thus the stronger request from computer 4 manages to shrink the neighbors set around itself alone, thus receiving exclusive access and the other computers have the same state as if computer 1 had never requested access. In order for computer 1 to still gain access, it has to request it again. Since it has NONE access, this is accomplished via NEED requests as already described. It is possible that after giving away its SHRD access, computer 1 no longer needs any access. In one embodiment of the invention, computer 1 will not re-request access if it no longer needs it.

Message Semantics

NEED Message

A NEED message includes access, gravity, remote issuer. This message is sent from a computer having NONE access to its leader computer in the tree. If the receiving computer has no access also, it forwards the computer to its leader. In one embodiment, a computer defers forwarding a request or message if the computer already has stronger request pending for the region. Otherwise the message is processed (using some of the NEED/JOINT/DRAIN/LEAD/DENY messages).

NEED requests are recorded by the receiving computer until destroyed or satisfied. If a stronger NEED request with the same issuer arrives, the weaker request is destroyed. If weaker NEED is received, it is ignored. If a NEED request with the same gravity and issuer arrive, the request having stronger access survives.

A NEED request is satisfied when the computer can afford to grant the requested access right. SHRD access is granted by computers with SHRD or EXCL access (EXCL is demoted to SHRD). EXCL access is granted only by computers having EXCL access. In order for a computer with SHRD access to grant NEED.EXCL request, the computer must first obtain EXCL access. In this case, the computer initiates draining in the name of the requestor (using its issuer in the DRAIN messages). If the computer reduces to NONE access, such a computer it will forward the NEED message to its leader (unless the computer is trying to obtain access with higher gravity).

DRAIN Message

A DRAIN requests includes information such as gravity, remote issuer, remote shrinker, color hue and master flag. As discussed, a DRAIN message is sent from a computer with SHRD access to other neighbors of the computer having SHARED access. This message asks computer having SHRD access to drain the SHRD access from all other neighbors as well as to relinquish its own SHRD access rights. When this happens, the computer will answer with JOINT request. If the receiving computer has access different from SHRD, or the sender is not a neighbor of the computer, the DRAIN request is ignored. DRAIN requests are compared to each other by forming comparable objects including comparable items such as: gravity associated with the request, issuer ID of the computer that needs EXCL access, and a shrinker ID identifying the computer initiating the draining operation.

NEED is compared to DRAIN request by encoding it in comparable instance too: The gravity and issuer come from the NEED request, while the shrinker comes from the current computer. Thus the NEED request compares the same as DRAIN messages from draining that would be initiated by the current computer because of that NEED request.

DRAIN requests are recorded by a receiving computer until destroyed. The request becomes obsolete and is destroyed if the computer that sent the message stops being a neighbor by either receiving JOINT message from that neighbor, or because the recording computer sends JOINT message (which happens when it drops its access to NONE). Note that computer receives EXCL access when all its neighbors unlink, which will cancel any pending DRAIN requests, and thus computer with EXCL access has no DRAIN requests queued. For example, on FIG. 28, computer 3 keeps the drain message from computer 1, that it received via computer 2 until computer 2 sends it JOINT message to tell it no longer has SHRD access. At the same time, this allows to satisfy the drain message, that computer 3 keeps from computer 4, as computer 3 has no other neighbors (besides computer 4), so it changes its access to NONE and notifies computer 4 via JOINT on its own. As computer 4 also loses its shared link with computer 4, it also discards the just-executed drain from computer 4.

If a stronger DRAIN is received from the same neighbor, the weaker request is destroyed. Accordingly, weaker DRAIN requests are ignored upon arrival.

A DRAIN message succeeds when its source remains the only one in the neighbors set of computers, the computer is healthy and the message gravity orders it to proceed before any other pending requests. When access rights of the computer fall to NONE access, the corresponding computer puts the DRAIN shrinker as its leader, and notifies the last SHARED computer with a JOINT message. The computer points to no shared computers anymore.

Temporary Shared Links

Figure 29A:
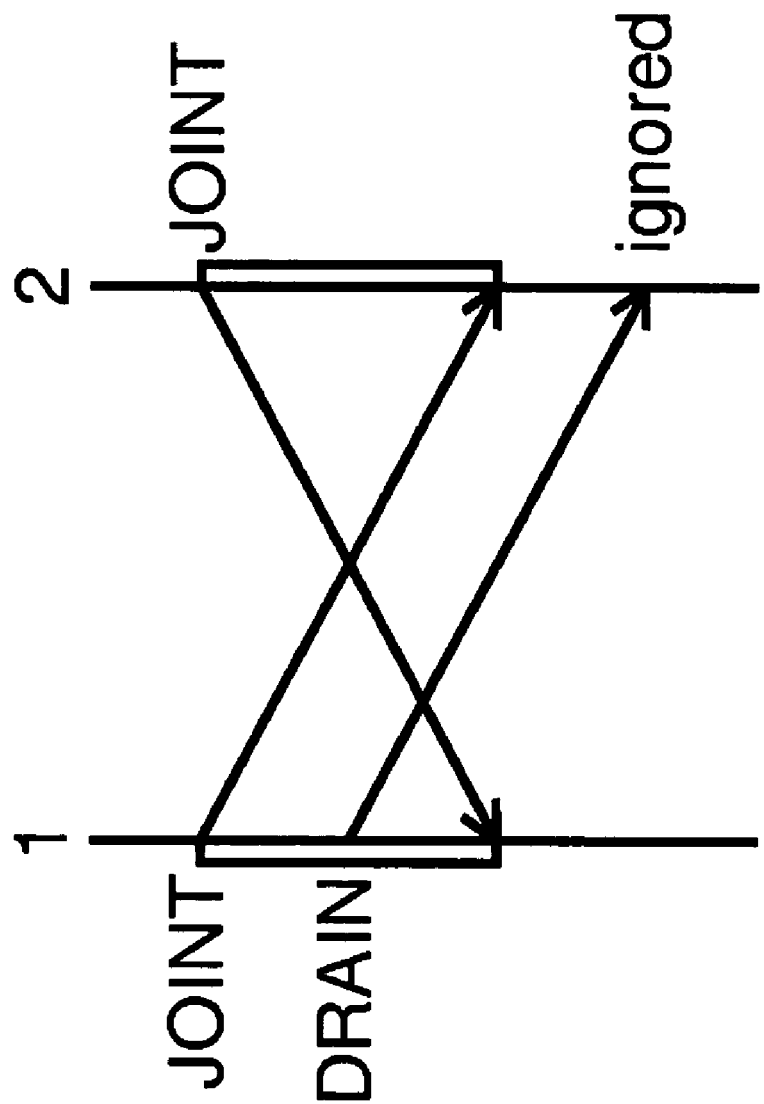
FIGS. 29a, 29b, 29c, and 29d are diagrams illustrating use of a master flag according to an embodiment of the invention.

FIG. 29a is a diagram illustrating two computers, both having shared access that try to grant each other shared access by sending each other JOINT messages (probably because of old queued NEED.SHRD requests). According to the semantics of the JOINT message, both computers will destroy the temporary 'shared link' between them when they receive each other's JOINT message (The double vertical lines represent the time when each computer knows the other as a neighbor). This prevents the distributed tree from obtaining a cycle, as by design computers with shared access are already interconnected in a tree. For example it is possible that computers 3 and 7 on FIG. 17 both decide to grant each other SHRD access because of some old NEED.SHRD requests they queue about each other. If that link was allowed, the tree will contain a cycle as computers 3 and 7 are already connected by the 3-4-5-7 path (FIG. 17).

Returning to FIG. 29a, although the disallowed link is somewhat open for a while, every message sent in that time span will be received at the other end after the receiver has closed the link (when the JOINT message is received). So, the DRAIN message on FIG. 29a, although correctly sent by computer 1, will be ignored upon arrival. This will not harm the shrinking that computer 1 intended, as the DRAIN message will be satisfied by the received (by computer 1) JOINT message. That is, although the JOINT message sent by computer 2 is not sent in response to the DRAIN request from computer 1, it serves as valid answer to the DRAIN request.

Master Flag

Figure 29B:
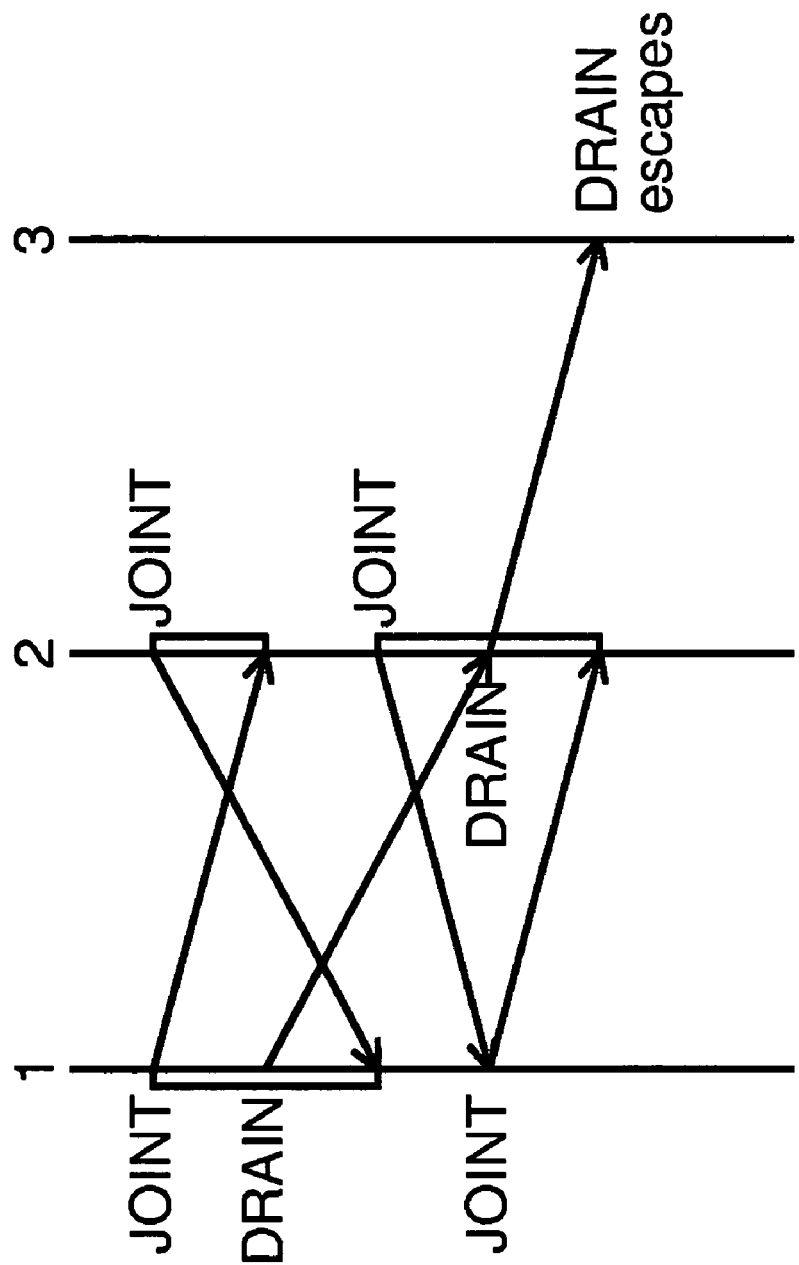

FIG. 29b is a diagram that represents development of FIG. 29a. Here three computers have SHRD access. Computer 3 has shared link with both computers 1 and 2 (not shown). Computer 1 decides to grant shared access to computer 2 and computer 2 decides to grant shared access to computer 1 twice—the second time after the link is discontinued for the first time. This allows for a DRAIN request coming from computer 1 to be received by computer 2 in a time, where computer 2 considers computer 1 as a neighbor. Thus the DRAIN message will be accepted. Accepting that message may lead to forwarding it to computer 3 which will not harm the operation of the protocol but is redundant, and can be avoided via a "master flag".

According to one embodiment of the invention, DRAIN messages are extended with a boolean value named master flag. That flag is set when the sender of the DRAIN message is the leader in the shared connection (that is it was the computer that granted shared access to the other computer by sending it a JOINT message). If the DRAIN is from the other (slave) computer, the flag is cleared.

Figure 29C:
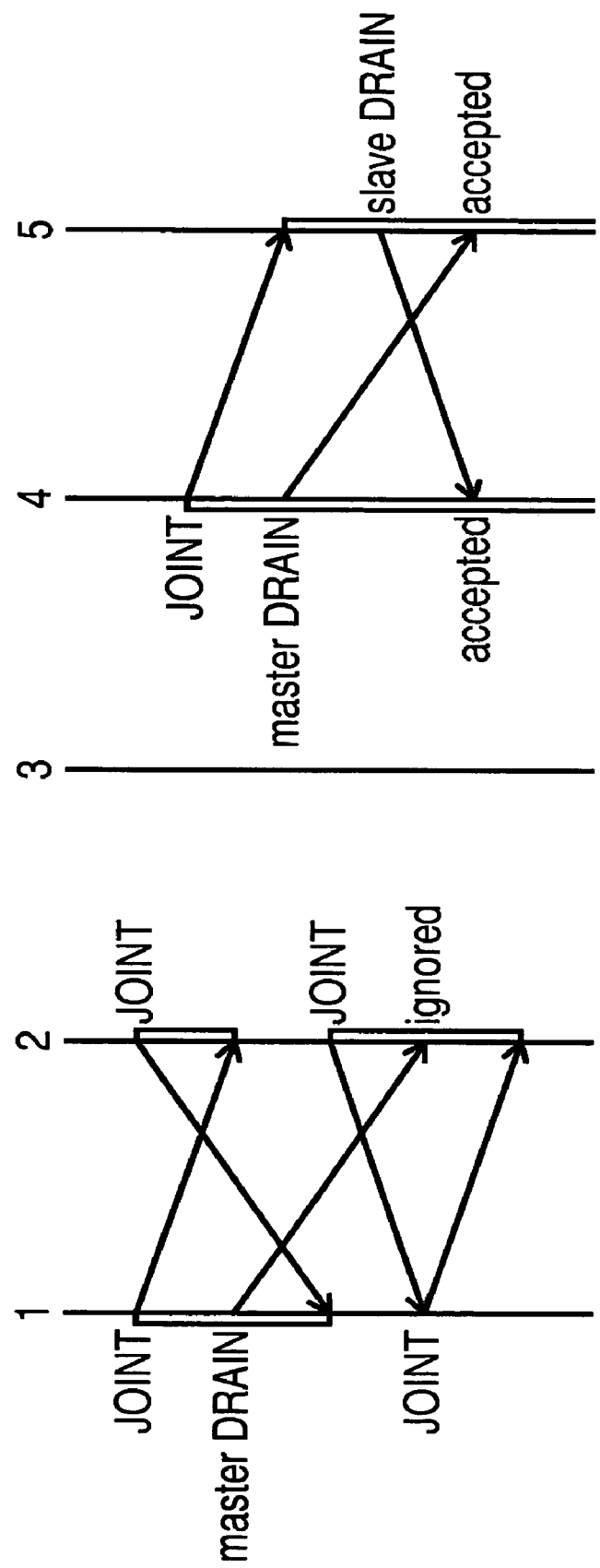

FIG. 29c shows the operation of the master flag. Upon receiving of a DRAIN message, if the master flag is set, but (according to the local state that the receiving computer has) the message is received from slave computer, the message is dropped. This prevents accepting DRAIN messages that have sneak out via temporary shared links as is the case with the DRAIN message coming from computer 1, but still allows DRAIN messages to pass via valid shared links as shown with the DRAIN messages coming from computers 4 and 5.

A master flag indicates who is the uppermost leader or root computer of a tree. The computer that gave SHRD access to another computer is its leader. When the computer passes leadership, it clears its own flag while the new leader sets its flag. When received the flag is checked to determine whether it is consistent with the receiver's understanding of who is leader. In one embodiment, the oplock manager 132 does not employ use of a master flag.

Request Remember

It is possible that a computer requests access, but before receiving response, it abandons it. Unless the oplock manager explicitly remembers what access was requested via each shared link (that is to remember the priority of the highest-in-priority DRAIN request it has sent) it may happen that the tree may lose its root.

Figure 29D:
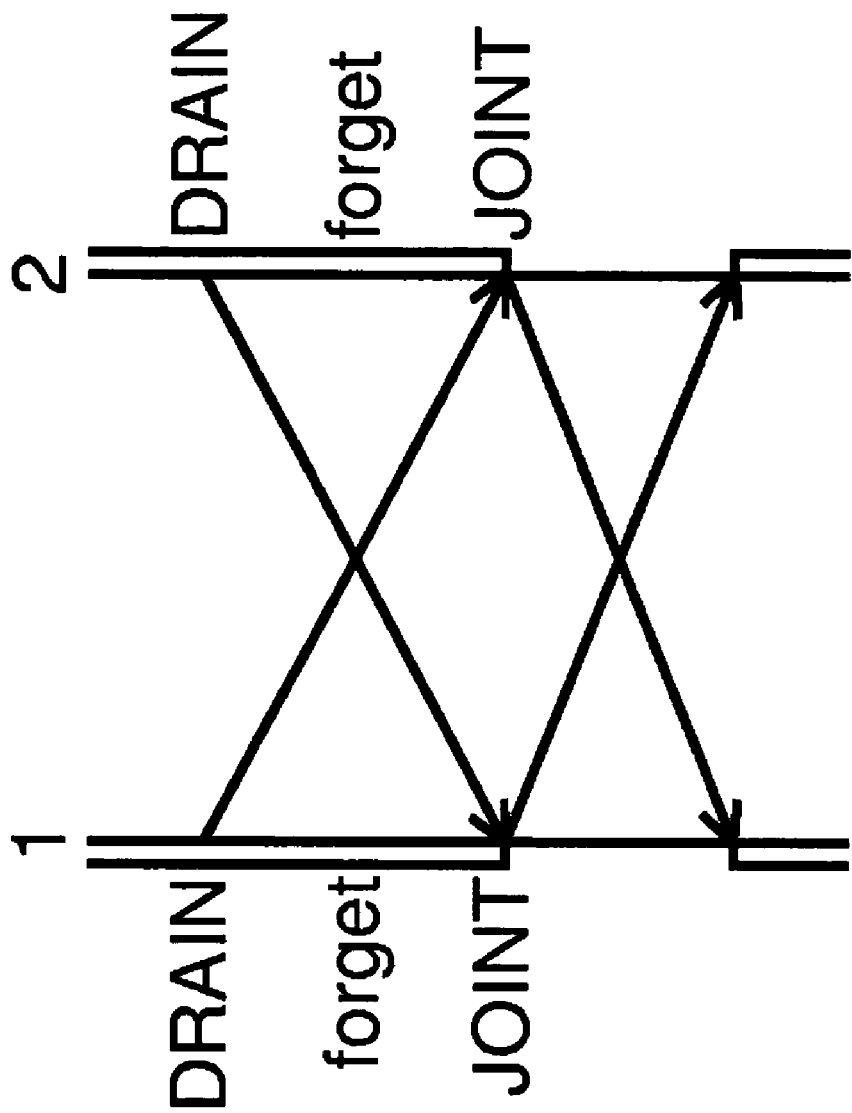

FIG. 29d shows such a loss. Here, computer 1 and 2 are the only computers with SHRD access. They have only one neighbor—the other computer. Then both of them decide to request EXCL access, but soon after they forget it, so when the DRAIN messages are received, they are both handled immediately—both computers fall to NONE access and notify the other via JOINT message. Then, when the JOINT messages are received they both recover their SHRD access, with the only problem being that both computers record the other as their leader, and thus the tree looses its notion of distinct leader. This can be recovered either by the computers keeping track of what access (and what gravity) they have requested (as thus the situation shown on FIG. 29*d* cannot happen), or in the following way:

When a computer receives from its leader a message stating that the sending computer is slave, and if the computer has higher computer ID, the computer silently changes its state to be leader of the sender. The higher ID check is necessary as otherwise it is possible that both computers change to leaders. The messages that state that the sender is a slave are ISLAND and BRIDGE_UP. An implementation may detect slave-DRAIN if master flag is implemented, but is not required.

Denying Access

According to one embodiment of the invention, the oplock manager supports denial of requests. The reason of denial is up-to the users of the oplock protocol. For example if one computer has shared access and another asks it to leave its access in order for the other computer to obtain exclusive access, the asked one may deny by sending back DENY message. The purpose of DENY messages is twofold: they serve to notify users at the requesting computers that the request will not be granted at all, and also serve to purge a cache the oplock manager may have about requested access. That cache includes remembered DRAIN messages over shared links and remembered NEED messages, sent by computers having NONE access. These caches should record only highest priority requests.

A DENY message consists of requested access (SHRD or EXCL) first priority value (request gravity), request issuer (the computer that initiates the request) and request shrinker (the computer that started the draining if draining was denied, or if NEED request was denied, the shrinker equals the issuer). DENY messages also hold a 'reason' field, which is passed verbatim to the offended requestor and a 'color' field that matches the 'color' of the request. The color comes from NEED and DRAIN requests and if implemented is a value passed when request is handed to the oplock manager at some computer. The intent of the color is to bring some additional information to the other computers in the cluster as to why is the attempt for their access demotion.

In one embodiment of the invention separate colors are used for requests that are immediately needed, and requests that try to lock-ahead, that is to obtain access rights before actually needing them. Then if a lock-ahead request is received where access is still needed it may be denied without interfering with normal operation as the DENY message, holding the lock-ahead color will only deny requests from the lock-ahead subsystem and will not hamper concurrent normal request.

DENY message generated in response to NEED request are sent directly to the issuer computer recorded in the NEED requests. DENY message generated in response to a DRAIN request is send to the sender of the DRAIN message, as the sender may have cached the gravity of the request.

When DENY message is received, all pending requests for the same access (i.e. shared or exclusive) that have matching colors are denied. That is the 'denied' event on FIG. 13 changes the state of the request from 'pending' to 'void'.

If the DENY is received from a shared link, and the strongest DRAIN that was sent over that link has the same priority (that is same gravity, issuer and shrinker), the request is forgotten and later attempts for access will need resending the proper messages. If the DENY is received by computer with NONE access and its priority corresponds to the strongest NEED request requesting the same access, the NEED is forgotten.

Also if there are pending remote requests that request the same access and have matching colors are also denied. NEED requests are denied by forwarding the DENY message back to the issuer stored in the NEED request, and DRAIN requests are denied by forwarding the DENY message back to the neighbor that had sent the DRAIN message.

DRAIN Restore

When a computer in the cluster 145 initiates a DRAIN for EXCL access rights because some other computer asked for EXCL from it, the draining wave may reach the same computer that requested the access rights. For this access request to be satisfied, the computer's granted SHRD access must be drained out. In one embodiment, this is unacceptable. In such a case, the computer detecting this circumstance issues a special DENY request towards the DRAIN source The DENY message has the same gravity, issuer, and shrinker as the incoming DRAIN and has zero color, and denier set to that computer. Receiving of the DENY purges the channel as explained in the DENY message notes, and explicitly denies the recorded DRAIN messages (but with color zero, that is without affecting any local requests at the receiving computers, only remote ones). This causes a flushing of the channels, without denying any Oplock user (as the zero color does not match with any color).

Figure 30:
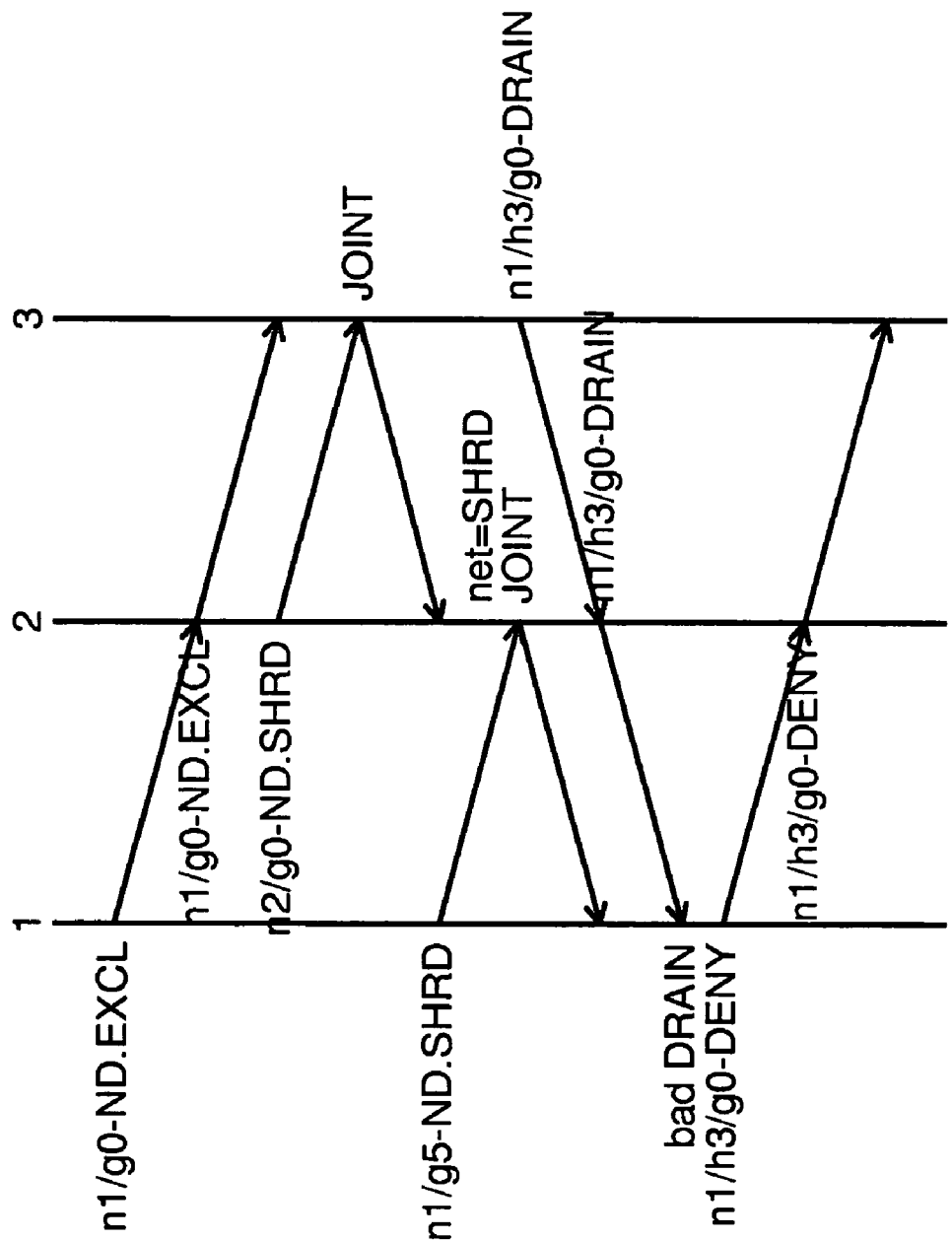
FIG. 30 is a diagram illustrating a drain restore according to an embodiment of the invention.

FIG. 30 is a diagram illustrating a "drain restore" technique according to an embodiment of the invention. As shown computer 1 having NONE access, requests EXCL access rights. It sends NEED.EXCL request with gravity 0 and issuer node 1 to its leader—computer 2. Computer 2, also having NONE access, forwards the request to its leader computer 3. Computer 3, having exclusive access, postpones granting that request as it still has strong shared lock over the region (note that a computer may use less access than it currently has as is in the example: computer 3 at this time needs only shared access, but it has exclusive. Thus it can grant shared request immediately, but will delay requests for exclusive access). Later, computer 2 requests shared access from computer 3, which is granted immediately. Then computer 1 also requests shared access which it receives directly from its now shared leader. At this time computer 3 stops needing its shared access. It decides to grant the NEED.EXCL request it has recorded. Since, in the mean time, the computer has fallen to SHRD access it needs to restore its EXCL access in order to grant a NEED.EXCL, so it initiates draining. The DRAIN message keeps the same gravity (0) and issuer (computer 1) and specifies itself (computer 3) as the shrinker. This message is sent to its only neighbor—computer 2, computer 2 simply forwards the DRAIN requests to its other neighbors which happen to be only computer 1. When computer 1 receives the DRAIN message it discovers it is for itself alone as it has itself recorded as the issuer of the request. If the computer still needs exclusive access with the same gravity, it may either begin its own draining back (by sending DRAIN message with issuer and shrinker itself, and the same gravity), or it may respond with DENY message to cancel the expectations of the other computers that they will have their access increased. For example if computer 3, after sending the DRAIN message decides it also needs exclusive access for itself, but with lower gravity, it may wait for the stronger drain to be completed. To avoid deadlock, the DENY message is sent back from computer 1 to computer 2 copying the same content, that DRAIN had, with the color changed to a zero value. Also DENY messages are extended with a denier value indicating the computer that started DENY-ing (as forwarding DENY messages loses that information). When computer 2 receives the message, it flushes its expectation for disconnecting JOINT from computer 1 (as the strongest DRAIN sent has the same gravity-issuer-shrinker). Also since it has a corresponding recorded DRAIN (by gravity-issuer-shrinker, denier that matches the DRAIN.issuer, and color of zero) from computer 3, it also denies the DRAIN by forwarding the DENY back to computer 3 and discarding the recorded DRAIN request. Upon receiving of the DENY message, computer 3 stops waiting for JOINT from computer 2 and discards the NEED request (because gravity and issue match, and color is 0)

Note that responding to bad DRAIN message with a DRAIN is possible, because by only changing the shrinker to match the issuer (as new draining is started), the total ordering of requests will make the later DRAIN with higher overall priority. Note also that if DENY messages are implemented, response using DRAIN cannot be used as that drain may also get denied. Thus if implementation supports DENY messages, the answer to bad draining must be via DENY message. If implementation chooses to not use DENY messages, it can respond to bad drain with the higher-priority DRAIN described.

In summary, computer 3 attempts to drain the SHRD access rights from computer 1, because computer 3 wants EXCL access rights (in attempt to satisfy the request from computer 1 it has recorded). Computer 1 responds with a DENY message (to avoid losing its shared access, even in the goal of obtaining exclusive access later) that notifies computer 2 that JOINT will not be issued from computer 1 for the last DRAIN. Computer 2 denies the recorded DRAIN message from computer 3 by replying to computer 3 with another DENY message, so computer 3 also is notified that corresponding JOINT will not be issued. Thus, if for some other reason computer 2 or computer 3 happens to need EXCL access rights, such computers will issue new DRAIN messages.

JOINT Message Details

A JOINT message is handled in different ways depending on the state of a receiving computer at the time it is received. If the receiving computer has NONE access, the message is accepted as a JOIN event—the computer sets its access to SHRD setting the sender computer as only neighbor and leader. If the receiver has shared access and has shared link with the sender, an UNLINK event occurs. Otherwise, the message is refused by a computer. The refusing computer sends back the JOINT message to the original sender.

As discussed, a JOIN event gives the receiver SHRD access. The UNLINK event removes the sender from the list of computers having SHARED access. If there is pending DRAIN request with the same sender, it is destroyed.

A LEAD message transfers EXCL access rights from one computer to another. The sender of the LEAD message reduces its status from EXCL to NONE access and the receiver of the LEAD message obtains EXCL rights. The sender of the LEAD message sets the new EXCL owner as its leader. In one embodiment, it is an error for a computer with more than NONE access rights to receive such a message.

A DENY message includes information such as access, gravity, remote issuer, remote shrinker, color hue, reason, remote denier. The DENY message is sent when requested access cannot be granted. The access, hue and reason are provided by the denying oplock user. A denying event occurs either because of an Oplock user requesting it or by receiving a DENY message. The denier is the remote computer originating the denying.

The purpose of the DENY message is twofold. First, the DENY message notifies an access requesting computer that the computer will not receive access rights. Second, DENY message can be used for updating computers. In one embodiment, updating of computers is needed because each computer records a highest gravity value associated with requests for some of their channels. These computers expect to receive some access after they requested it via some channel. For a computer with NO access, that channel is its leader. If a NEED request is forwarded by several computers having NO access, none of them has updated their expectation and they need not be notified. For computers with SHRD access, the channels are all its neighbors (from which DRAIN with some gravity tries to reduce their subtree-s access to NONE).

If a DENY message is received from some channel, and that channel is expecting that same access with the same gravity, the channel is purged to state where it expects no access gains from it. If the channel has higher expectation, its not altered. Consequently, use of the DENY message is as follows:

When a DENY message is received by a computer with SHRD access, the sending neighbor may be purged as described. When a DENY message is received by a computer with NO access, its leader channel may be purged. Any pending NEED or DRAIN requests with colors that match the color from the DENY are denied. Requests are denied by sending DENY message with gravity, issuer and shrinker from the requests, and with color, reason and denier from the DENY message (or the denying Oplock user). For NEED requests, the message is sent to their issuer, and for DRAIN requests—to their source (the neighbor that sent them).

Recovery

A tree connecting computers 110 in a cluster 145 is guarded by the protocol so that no cycles should evolve, every computer should be (indirectly) connected to all others, and every computer's leader should point along a path of the tree to a computer with either SHRD or EXCL access. Thus, a request generated by a computer can be satisfied by forwarding the request through the tree to proper receiving computers. However, computers may leave the cluster at any given instant of time. This results in chopping the tree into pieces, which must be repaired to be whole again.

Figure 31:
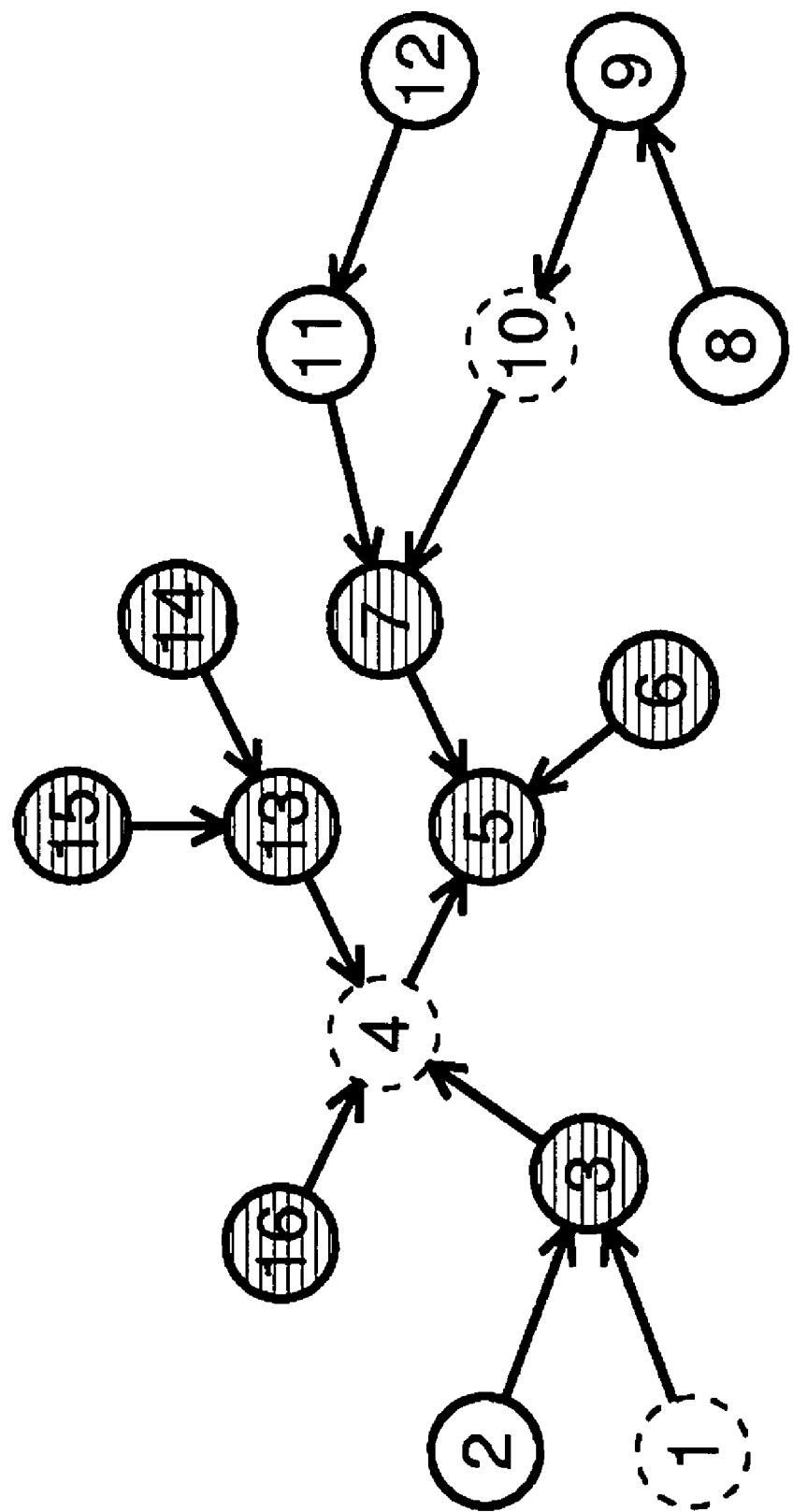
FIG. 31 is a diagram illustrating recovery according to an embodiment of the invention.

FIG. 31 is a diagram illustrating recovery according to an embodiment of the invention. As shown, computers marked by dashed outline have left the cluster. Computers 3, 5, 6, 7, 13, 14, 15, and 16 have shared access rights. Computer 4 previously had SHRD access, and by quitting the cluster, computer 4 splits the set of shared computers into 4 shared islands. For example, one island consists of computers 5, 6 and 7, one island consists of computers 13, 14 and 15, one island consist of computer 3, and a last island consists of computer 16.

The elimination of computer 1 (which had NONE access) from the cluster 145 does not impose new problems to the structure because it is not a leader of any other computer. However, losing computer 10 (which had SHRD access) leaves computer 9 with no leader, and leaves computer 7 with a dangling shared link. Thus, there are two problems that may occur when computer quits the cluster: i) a computer with NONE access can lose its leader, and ii) a computer with SHRD access can lose a share. A computer that incurs such loss enters sick state and initiates a recovery routine. When the recovery procedure completes the computer is healed and normal operation continues. Sick computer cannot increase its access before healing itself (i.e. before completing its part of the tree recovery). Sick computer with NONE access has no leader and thus it does not know which computer it can send its NEED request. Sick computer with SHRD access cannot grant itself EXCL access if all its shared links get dropped (either because the neighbor has quit the cluster, or because it has discontinued the link via JOINT message), because the computer may be isolated in a shared island as is the case with computers 3 and 16 in FIG. 31. Computer with EXCL access cannot become sick as it has no link to other computers that it can lose.

As a trivial case, if a computer remains as the only computer in the cluster, it grants itself EXCL access without getting sick.

Recovery of a Computer Having NONE Access Rights

A computer with NONE access that loses its leader must find another computer to be its leader. Until then, the computer is considered sick because the tree is not contiguous. A new leader may be any other computer remaining in the cluster 145 except computers that have that computer as a (indirect) leader. To find such computer, the cluster time of the computers is used. As already noted, cluster time is property of each computer. To implement recovery of computers with NONE access, each computer records the cluster time of the computer when it drops to NONE access in variable named release time. If a computer has some access (either SHRD or EXCL) its release time is not needed and may be discarded. Thus if computer with NONE access has leader that also has NONE access, it is guaranteed that the leader has higher released time than the slave computer. Thus, the following rules apply:

If computer A has a later cluster time than computer B, then computer B is neither a direct nor indirect leader of A. In this way, computer B may set computer A as its leader.

An oplock implementation that supports regions must keep release time for every region that has NONE access, while the cluster time may be shared across the computer.

If all computers have NONE access and have earlier released time than a computer with no access, then there are no computers with any access. In such a case, there are also no pending LEAD messages on the network. The computer can grant itself EXCL access. If multiple computers simultaneously seek new leader, only one will grant itself EXCL access, while the others will find a computer to be their leader.

It is possible that computer with EXCL access leaves the cluster and then all other computers (having NONE) access, remain with the same released time. Thus if two computers with the same released time seek a leader, and they discover each other, the one with the higher computer ID must be selected to be leader of the other (it may be the lower one too, but the decision must be uniform and based upon their cluster IDs). But not all such 'equal' pairs can settle this way: Computers that join the cluster also start with NONE access. They init the released time to some fixed unreachable minimum time, i.e. 0 if all other cluster times are greater than 0. Thus it is possible that new computer with cluster time 0 points to another computer with cluster time 0. But as already discussed, during recovery one of them may set the other as its leader which may lead to a cycle. So the final rule when determining if a computer should set another computer, that has the same released time, for its leader is: The other computer must have higher computer ID, and be also sick (without leader).

The discovery of a leader for computer with NONE access is accomplished by TOKEN message that includes the computer that seeks leader (issuer) and the released time it had at the time of generating the message.

The message is sent to the right computer in the virtual ring as shown in FIG. 12. Thus, if a computer becomes broken from the tree, the computer can query each computer in the cluster 145 so that it can point again to a leader in the tree, or potentially reach EXCL access if no other computer can serve as its leader. If a TOKEN message is received by the issuer, and if the issuer has NONE access and the same released time as is recorded in the received message, the computer grants itself EXCL access rights. If another computer receives the message other than the issuer, the computer agrees to be leader of the issuer of the TOKEN if any of the following is true:

The receiving one has SHRD or EXCL access.

The receiving has NONE access but has bigger released time.

The receiving has NONE access, and the same released time but is both with higher computer ID than the issuer and is also sick.

The first two cases capture the simple case of either a computer having greater access rights, or later cluster time. However, it is possible that EXCL owner of access rights died and all other computers have NONE access and the same cluster time. To overcome this situation, the third rule comes: the computer orders computers by their remote ordering. This avoids loops and forms a tree. It is important that only sick computers answer on equal cluster time to avoid possible looping. For example, consider a situation in which computer 1 has EXCL rights, and computer 2 points to it. Next computer 3 joins the cluster 145 and computer 1 quits the cluster 145. Computer 3 never sees computer 1 and links directly to computer 2 upon entering the cluster. Next, computer 2 gets notified for the loss of computer 1 and initiates a TOKEN message. The TOKEN message must not be answered by computer 3. Note that both computer 2 might never asked for access so both computer 2 and 3 may have the same initial cluster time they setup when entered the cluster at the moment. The answer is sent as TOKEN_ACK message to the issuer that suggests it to place the sender as its new leader. The sender passes its own released time in the message, or if it has more than NONE access it sends its current cluster time. In other cases, if the computer cannot accept being leader of the issuer, the message is forwarded to the computer on its right according to the virtual ring at FIG. 12.

The TOKEN_ACK (including time last_change) message indicates to the receiver to replace a pointer making the sender of the TOKEN_ACK its new leader. If the receiving computer is still sick and has NO access rights and a lower released time than the received with the message one (or the same cluster time, but if receiving from remote with higher computer ID), it accepts the message. When accepting the message, the computer sets the sender as its leader and enters a healthy state. If the message is not accepted, and the computer is still sick having NONE access, new TOKEN message needs to be generated again.

Recovery with SHRD Access

When a computer with SHRD access leaves the cluster 145, this means that the set of remaining shared computers can be broken into islands. Because leadership among computers is preserved when they have SHRD access, every island has distinguished leader computer. The leader of an island is either original leader before the occurrence of a computer failure or is a computer that became leader because its previous leader quit the cluster. The goal of reconnecting the islands back into consistent tree lies upon the leaders of the islands. In order to detect the broken state, shared leaders must enter sick state. Those computers that had lost their leaders become sick leaders automatically. But the original leader of the tree may not detect the disconnection if it happened farther from it (for example if computer 6 on FIG. 31 was the leader of the tree prior to computer 4's quit, it won't detect the break into islands). To repair the islands into one tree again, the recovery proceeds as follows:

Sick computers in a cluster 145 having SHRD access rights are locked. This means they will not release their SHRD access rights even if there is enough gravity by another computer to relinquish the rights. They can still grant requests for shared access though.

Every sick SHRD owner (e.g., sick computers having shared access rights) that is not leader tries to get the leader of its island sick too, so they will be locked.

The locked sick leaders of all islands initiate bridge operations to discover and reconnect to each other.

Leaders reconnect by setting some other discovered leader as their leader and heal themselves. The final sick leader discovers that it is the only sick one and heals itself too. At the end of the sequence, the set of computers having shared access are connected to repair the tree.

Sick SHRD owners attempt to notify the leader of their island of the break via ISLAND messages. Hosts that have sent ISLAND messages enter special island mode, which grants that the leader will not miss the notification.

A computer becomes leader either when it gains EXCL rights or when its leader quits the set of computers having shared access because it is down or via the JOINT message. The leadership can also be transferred between neighbors via the LEAD_BRIDGE message described below. When a computer becomes leader and it is in island mode, the computer quits island mode, becomes sick and starts recovery as defined for sick leaders.

As discussed, every sick computer having SHRD access is locked. This means that it can no longer change from its SHRD access. It may still grant NEED.SHRD requests or attempt draining over the live neighbors but it will remain with SHRD access until unlocked. This state lasts as long as the sick state lasts. Whenever such computer becomes healthy it is unlocked and may again enter NONE or EXCL access.

Sick leaders can initiate bridging operation in attempt to discover other sick leaders. This results in BRIDGE message being sent to a right computer (e.g., a computer in the cluster 145 having a higher ID in the virtual ring of FIG. 12). When a conforming sick leader receives BRIDGE request, it answers with BRIDGE_TO message asking the sending leader to connect to it. A leader is conforming if the requesting computer is ring-less than the leader. One of the computers is said to be ring-minimal, Then first computer is ring-less than second if by traversing the virtual ring at FIG. 12 the first computer is encountered before the second. The ring-minimal computer may change during changes in the cluster, but this change must be consistent among all other computers in the cluster. For example if computers have numeric IDs identifying them, the ring-minimal computer may be the computer with smallest ID, and the ring-less relation will simply state that first computer is ring-less than second if and only if the first computer's ID is smaller than the second computer's ID. This avoids a loop that may occur among the sick leaders. For example in large cluster having computers numbered from 2 to 9 if, a computer having shared access leaves the cluster, and forms three shared islands, with leaders computers 3, 6 and 8, then all leaders will send BRIDGE messages: computer 3's BRIDGE will be accepted by computer 6, joining the first and the second islands, computer 6's BRIDGE will be accepted by computer 8 recovering the shared set, but computer 8's BRIDGE will not be accepted by computer 3 even if computer 3 is still sick shared leader, thus preventing computers 3, 6 and 8 from introducing a cycle in the tree.

To ensure that BRIDGE message won't outrun ISLAND one, a BRIDGE message received by a sick SHRD computer having leader is passed up via its leader chain using BRIDGE_UP messages, thus following the ISLAND messages. When received by leader, BRIDGE_UP continues with BRIDGE_DOWN or HEAL messages. The bridging requires that every computer that initiates BRIDGE have one free slot for accepting a BRIDGE_TO answer (to add the BRIDGE_TO sender as neighbor and leader). The leaders that became such by noticing their leader lost the cluster, have one such slot. But if the pre-failure leader remains in the cluster it may be saturated and may be unable to link to other leader. When saturated leader gets sick, it transfers its leadership to some of its neighbors via the LEAD_BRIDGE message. Note that if a computer sends BRIDGE message, it has to maintain one slot in its neighbor set available for the possible BRIDGE_TO answer. That is, although sick computers with SHRD access can still grant NEED.SHRD request, for sick shared leader the saturation must be enforced as to not use that final slot. For example if implementation chooses to maintain at most 4 neighbors, sick leader must use at most 3 for granting NEED.SHRD requests.

Figure 32:
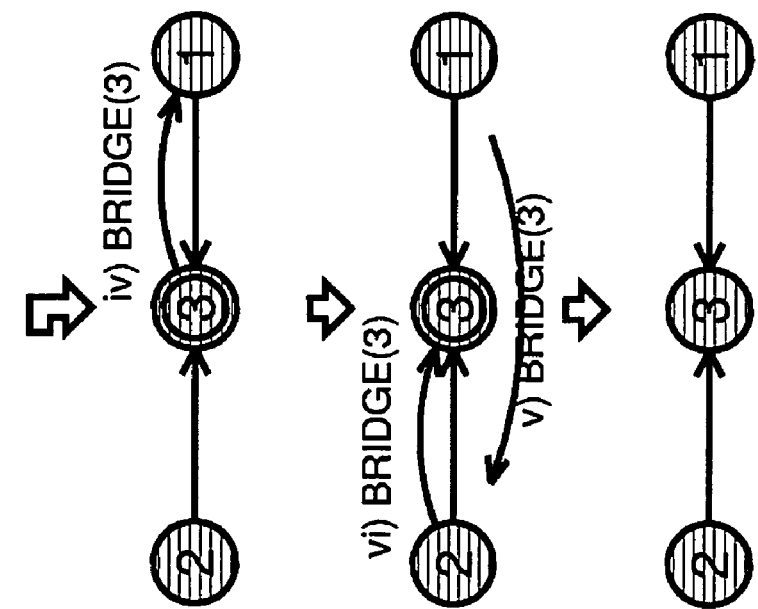
FIG. 32 is a diagram of sample bridging according to an embodiment of the invention.
Figure 32:
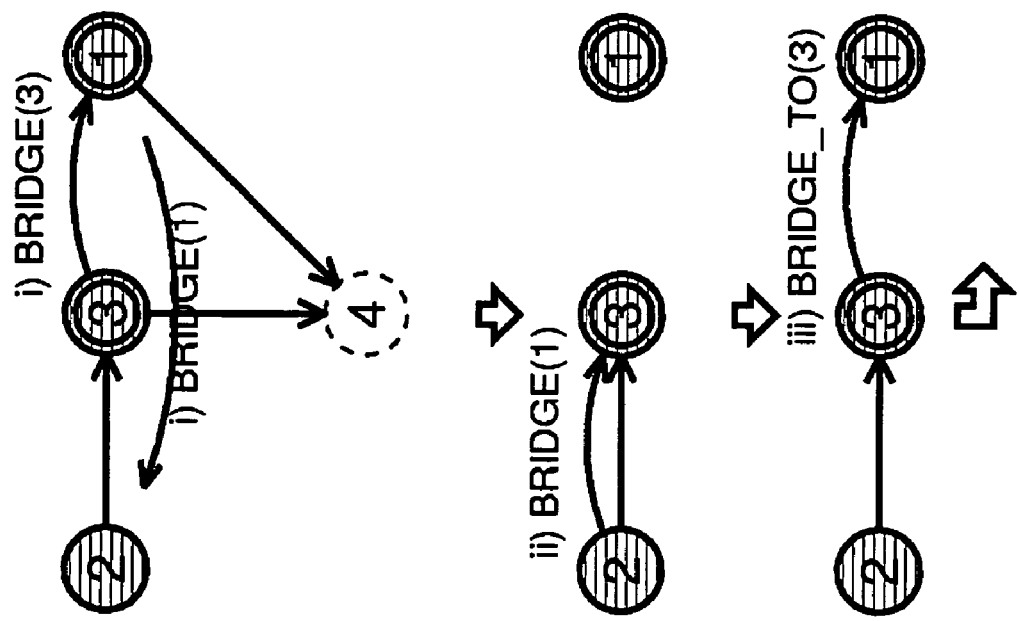

FIG. 32 is a diagram of sample bridging according to an embodiment of the invention. As shown, computer 4 has failed and is down. Computers 1 and 3 become sick SHRD leaders. In one embodiment, the computers discover that computer 4 has failed as discussed in related applications.

In step 3210, both computers 1 and 3 initiate a BRIDGE message to fix the tree.

In step 3320, computer 1 ignores computer 3's BRIDGE message, but computer 3 accepts the message form computer 2.

In step 3230, computer 3 sends a BRIDGE_TO message to computer 1, which is accepted by computer 1.

In step 3240, computer 1 adds computer 3 as a new computer having SHARED rights and as leader and heals itself.

In step 3250, after sending the BRIDGE_TO message, computer 3 resends its own BRIDGE message, which passes undisturbed through the cluster 145 back to computer 3. Computer 3 heals itself.

In step 3260, recovery is complete.

Figure 33:
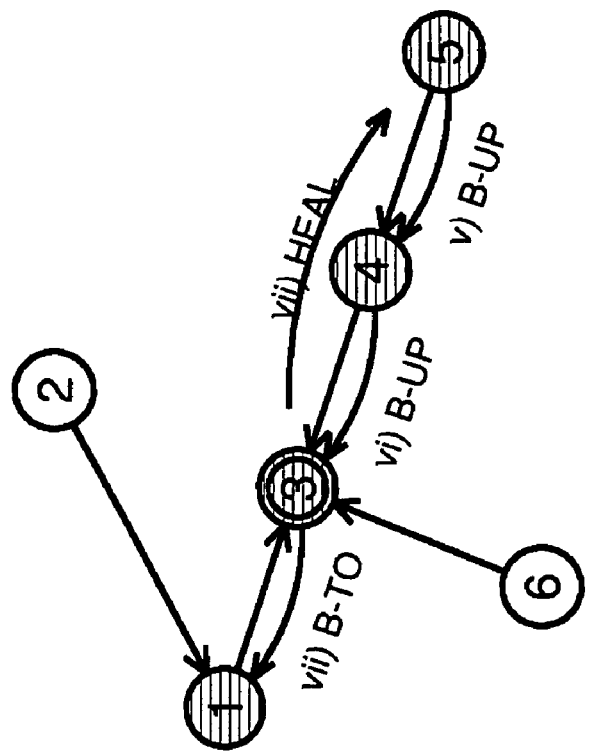
FIG. 33 is a diagram of a bridging operation according to an embodiment of the invention.
Figure 33:
Figure 33:
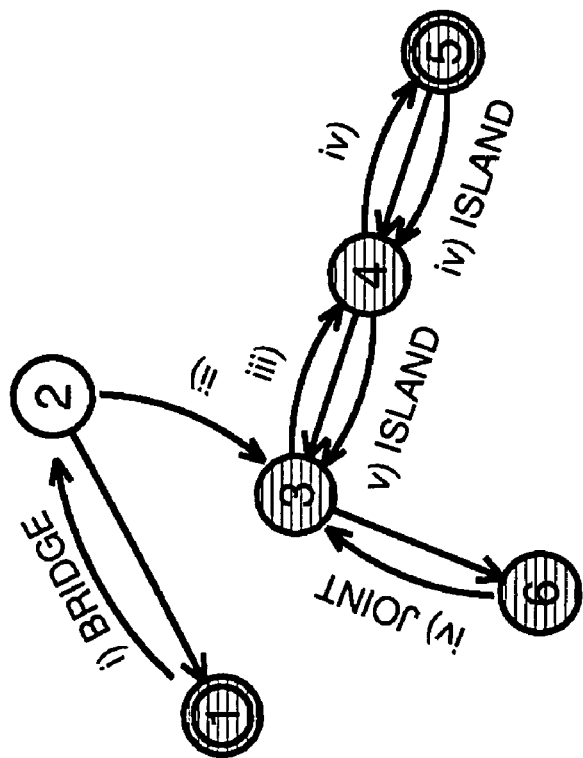

FIG. 33 is a diagram of a bridging operation according to an embodiment of the invention. As shown, computers 1 and 5 are sick with SHRD access. There are two islands: a first group including computers 1 and 2 and a second group including computers 3, 4, 5, and 6. Computer 6 is leader but it is not sick.

In step 3310, computer 1 initiates a BRIDGE message. While the BRIDGE message eventually reaches computer 4, computer 6 decides to unlink. It falls to NONE access and sends JOINT to computer 3. When the BRIDGE from computer 1 is received at computer 5, computer 3 becomes leader. By this time computer 4 receives the ISLAND message from computer 5. ISLAND Messages reach computer 3 and convert them to sick leader (ISLAND_ACK messages and computer 3's own BRIDGE messages are not shown).

In step 3320, on the right side of the picture, computer 5 converts the BRIDGE message from computer 1 to BRIDGE_UP (saving computer 1 as issuer, and computer 5 as the computer that converted BRIDGE to BRIDGE_UP) which reaches the leader computer 3. Computer 3 accepts it and sends BRIDGE_TO message to computer 1, and a HEAL message to computer 5. As a result, computer 1 and 5 become healthy. Computer 1 sets computer 3 as its neighbor and leader. Later, when computer 3's own BRIDGE returns to it, it will heal itself, which will complete the recovery process.

The ISLAND message is sent by sick SHRD non-leader computers in attempt to make the leader of the island sick. If the ISLAND message is not received by a computer with SHRD access rights, it is ignored. If the receiver has SHRD access, the receiver responds to the sender with ISLAND_ACK message. If the computer is a leader, it becomes sick. If the computer is not a leader, the computer enters island mode and sends ISLAND message up to their leader.

Figure 34:
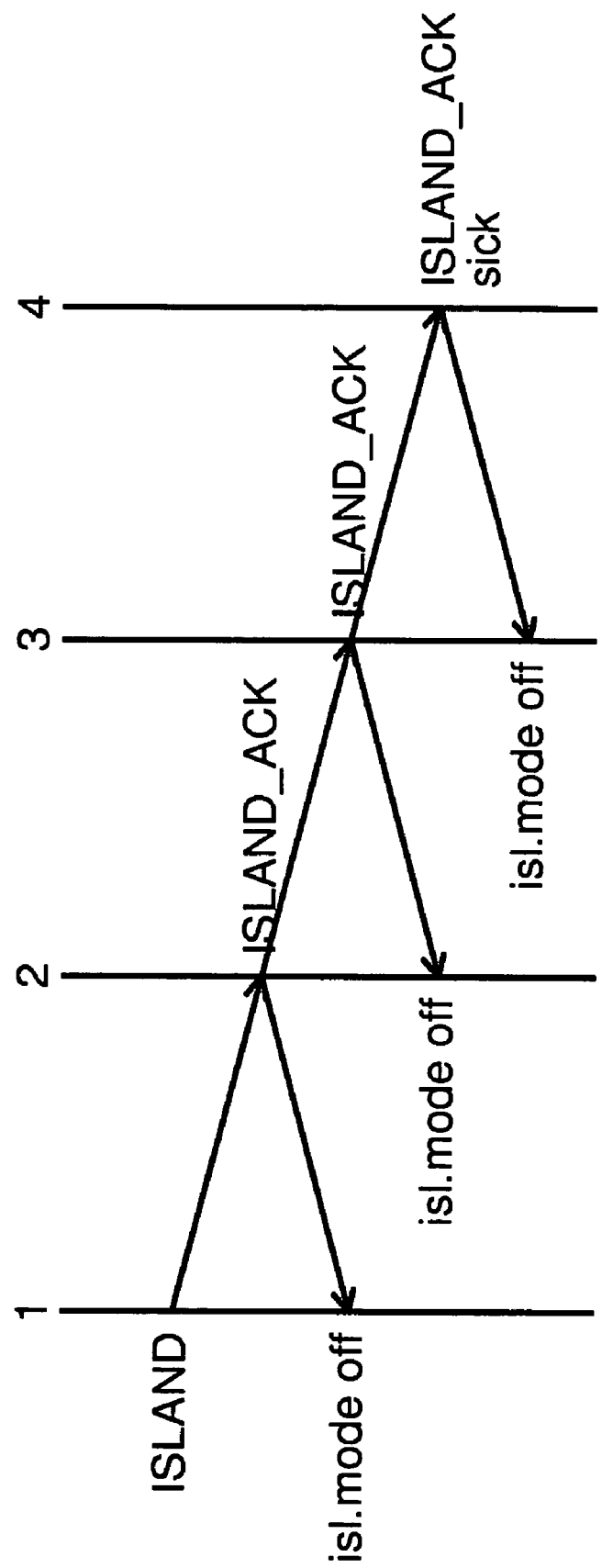
FIG. 34 is a diagram of island mode propagation according to an embodiment of the invention.

FIG. 34 is a diagram illustrating propagation of an island mode according to an embodiment of the invention. As shown, computer 1 is a sick SHRD non-leader. It has to make its leader (currently computer 4) sick too. This diagram shows sending of ISLAND messages up to the next leader in the island. When this message is received, the computer enters island mode, forwards to its leader and replies with ISLAND_ACK. Receipt of ISLAND_ACK turns island mode off. Computer 4 receives the ISLAND message while being leader, which makes it a sick computer.

Figure 35:
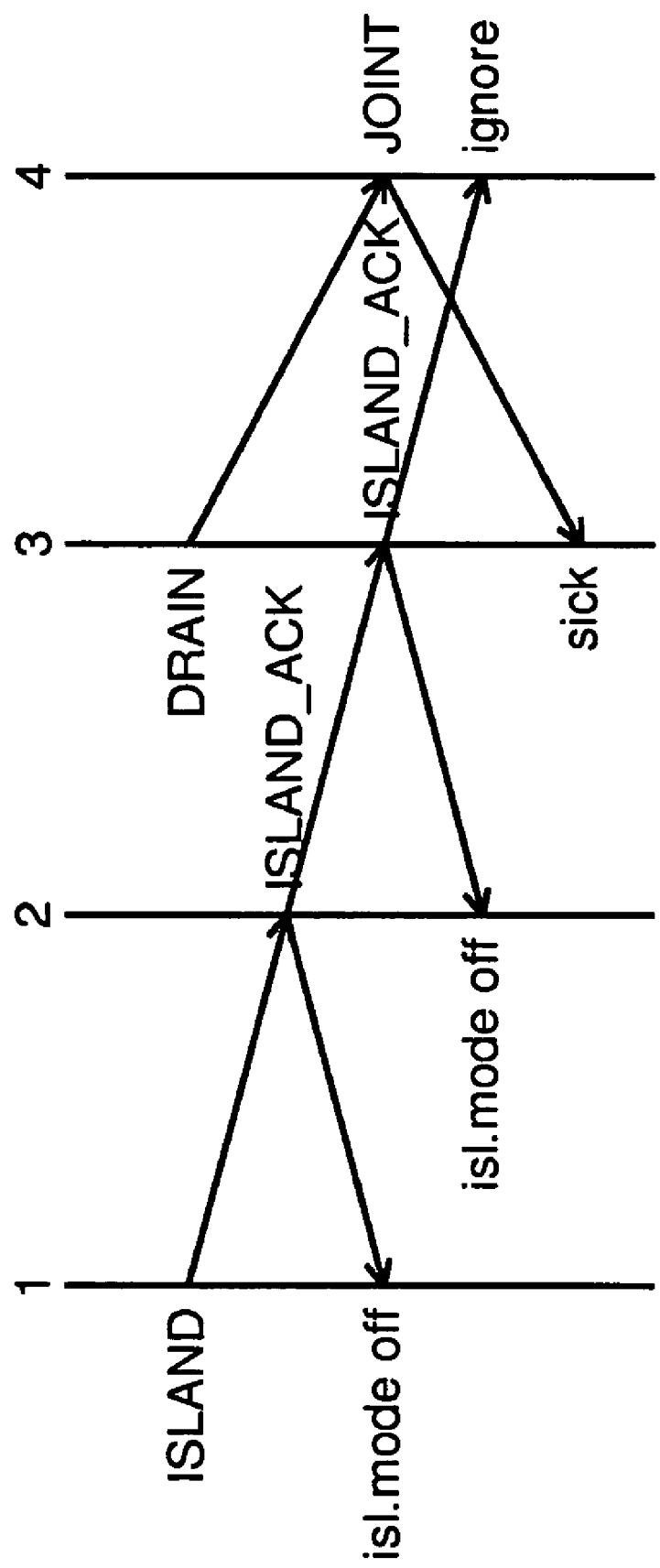
FIG. 35 is a diagram of island and joint messages according to an embodiment of the invention.

FIG. 35 is a diagram of island and joint messages according to an embodiment of the invention. As shown, the DRAIN and, more importantly, the resulting loss of access to NO access in computer 4 causes the last ISLAND message to be ignored. However, when computer 3 receives the notifying JOINT message, it will become leader, and since the computer is in an island mode, the computer will convert itself being sick (and additionally turns island mode off).

The ISLAND_ACK message is sent as result of receiving an ISLAND message. Its only purpose is to clear the island mode of the receiver.

The BRIDGE message is sent by sick leader computer in order to find another sick leader. The message is sent to a next or right computer in the virtual ring of FIG. 13, with issuer set to the initiator computer. If the message is received by a leader that is higher in order (i.e. with higher computer ID) than the issuer, then the issuer is added as a computer having shared access rights and a BRIDGE_TO message is passed to it. The receiver computer then gets sick (and resends BRIDGE message according to the Message Retransmission section below).

If the BRIDGE message is received by the issuer, the issuer heals itself and recovery is complete.

If the BRIDGE message is received by a sick non-leader computer (with SHRD access), the message is transformed to BRIDGE_UP(issuer, current-computer) and sent to the leader. If another computer receives the message, it forwards it to the right computer in the virtual ring formed by members of the cluster 145. In each, case if the BRIDGE's issuer is down, the message is ignored.

The BRIDGE_UP message (including remote issuer, remote reached) is sent up the leader chain of computers with SHRD access. The message keeps the issuer of a BRIDGE received, and the remote that converted the BRIDGE to BRIDGE_UP.

If the message is received by a non-SHRD computer, or the sender is a computer not having shared access, the message is ignored.

If the receiving computer has a leader, the receiving computer forwards the BRIDGE_UP message to that leader.

If the receiving computer is leader, it has to determine if the preceding BRIDGE has missed a leader. This is the case if walking from the issuer, via right computers in the virtual ring, and the current computer is reached before the reached from the BRIDGE_UP message. This is the case as shown on FIG. 33, where computer 3 receives BRIDGE_UP(issuer 1, reached 5) which means, that computer 3 had missed that message (passed it via the virtual ring) as it was neither sick, nor leader at the time the BRIDGE had arrived. It is said that computer 3 is ring-between computers 1 and 5, because traversing the virtual ring from computer 1, computer 3 is encountered before computer 5. Thus for example computer 3 is not ring-between computers 5 and 1 (order matters), as traversing the virtual ring starting from computer 5 does encounter computer 3 after encountering computer 1.

If BRIDGE was missed, the final computer (the one that converted BRIDGE to BRIDGE_UP) is sent a HEAL message, and the BRIDGE_UP message is handled as if a single BRIDGE(issuer) message was received.

If no BRIDGE was missed, the BRIDGE_UP activity is rolled back: The final computer receives BRIDGE_DOWN (issuer) message to continue the BRIDGE traversal.

The BRIDGE_TO(including bool joined) represents a positive response from BRIDGE (or BRIDGE_UP) message and means that the sender has added the receiver as a computer having shared access and expects the receiver to do the same. The joined flag states whether the sender had the receiver as neighbor before the BRIDGE(_UP) message. This is only possible under partially created shared links, where one computer has the other as a neighbor, but the other one still does not.

The message is semantically similar to a JOINT message with JOIN intent. It suggests accepting neighbor-link from SHRD owner. The difference is that JOINT messages are refused by SHRD owner with the sender not a neighbor (to avoid cycles in the tree) and BRIDGE_TO is accepted only by SHRD sick leader. Handling of this message is summarized in the following table. Only the right part of the first row that has left part true is executed.

| Condition | Action |
| --- | --- |
| NONE access and joined is false | The computer behaves as if JOINT message was received. |
| NONE access | Ignored |
| EXCL access | Error |
| joined is true | The computer resends BRIDGE if still sick leader. |
| source is already a neighbor | The source is removed from the neighbors set. The computer resends BRIDGE if still sick leader. |
| Computer is sick leader | Accept: add source as neighbor and leader. Heal. |
| Otherwise | Refuse: send JOINT message back |

Figure 36:
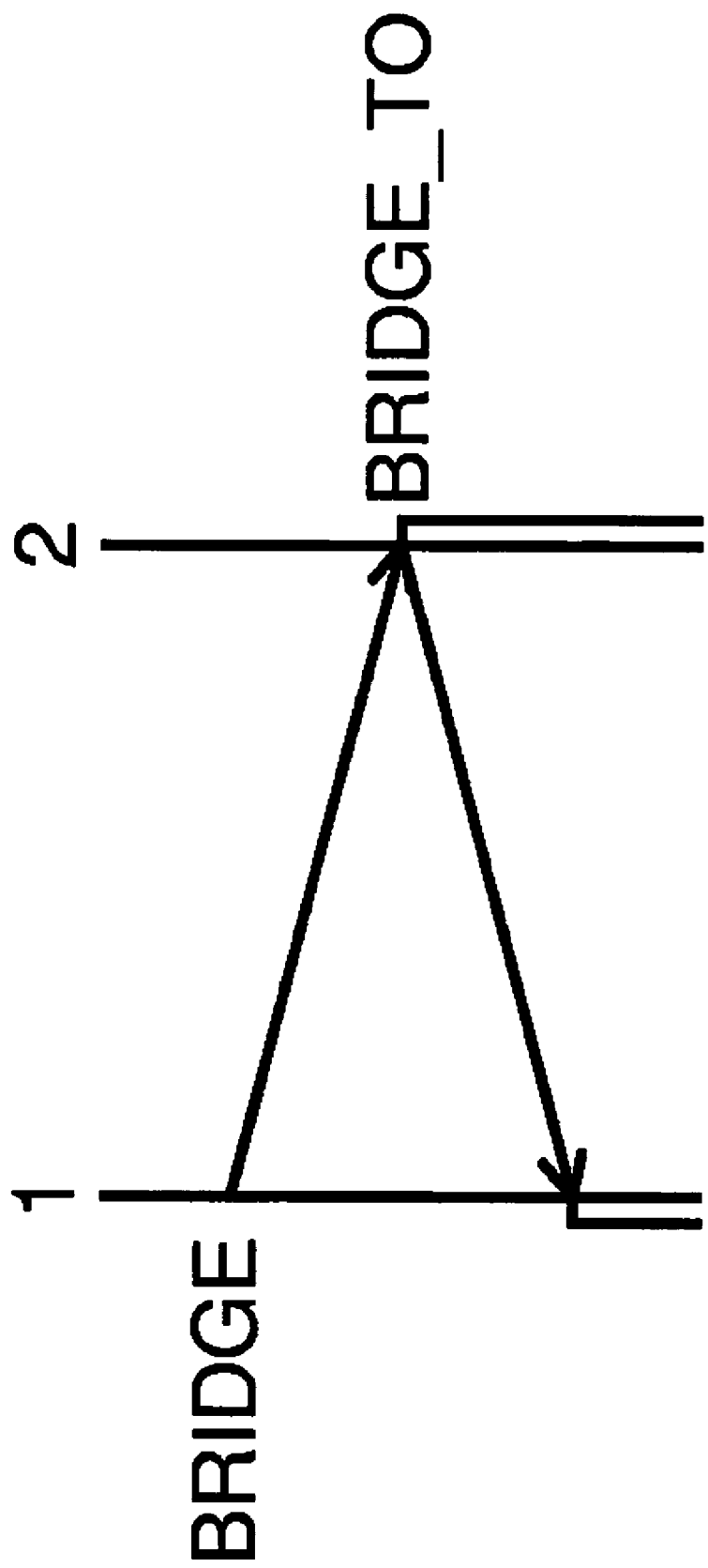
FIG. 36 is a diagram supporting bridging according to an embodiment of the invention.

FIG. 36 is a diagram supporting bridging according to an embodiment of the invention. This figure illustrates default behavior when BRIDGE message is acknowledged by BRIDGE_TO, which is accepted. The double vertical lines 3610-1 and 3610-2 represent when each computer includes the other in its neighbors set.

Figure 37:
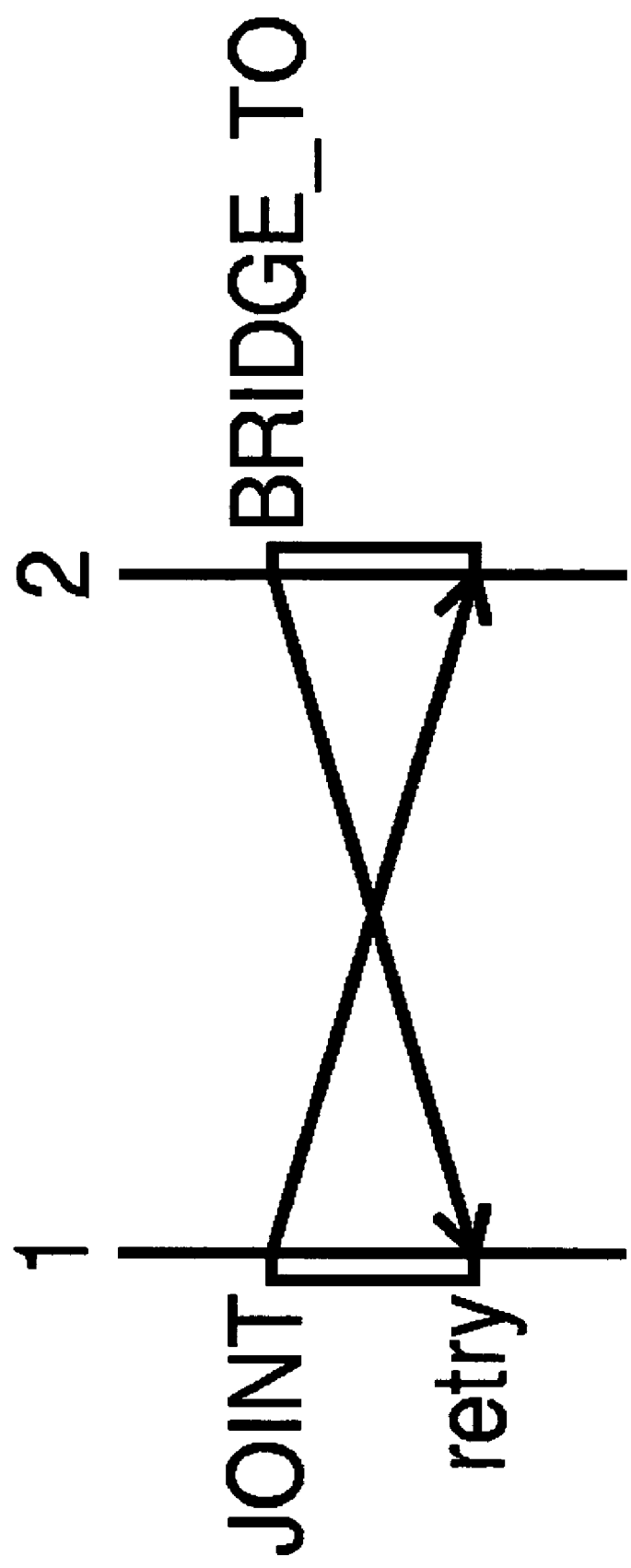
FIG. 37 is a diagram supporting bridging according to an embodiment of the invention.
Figure 38:
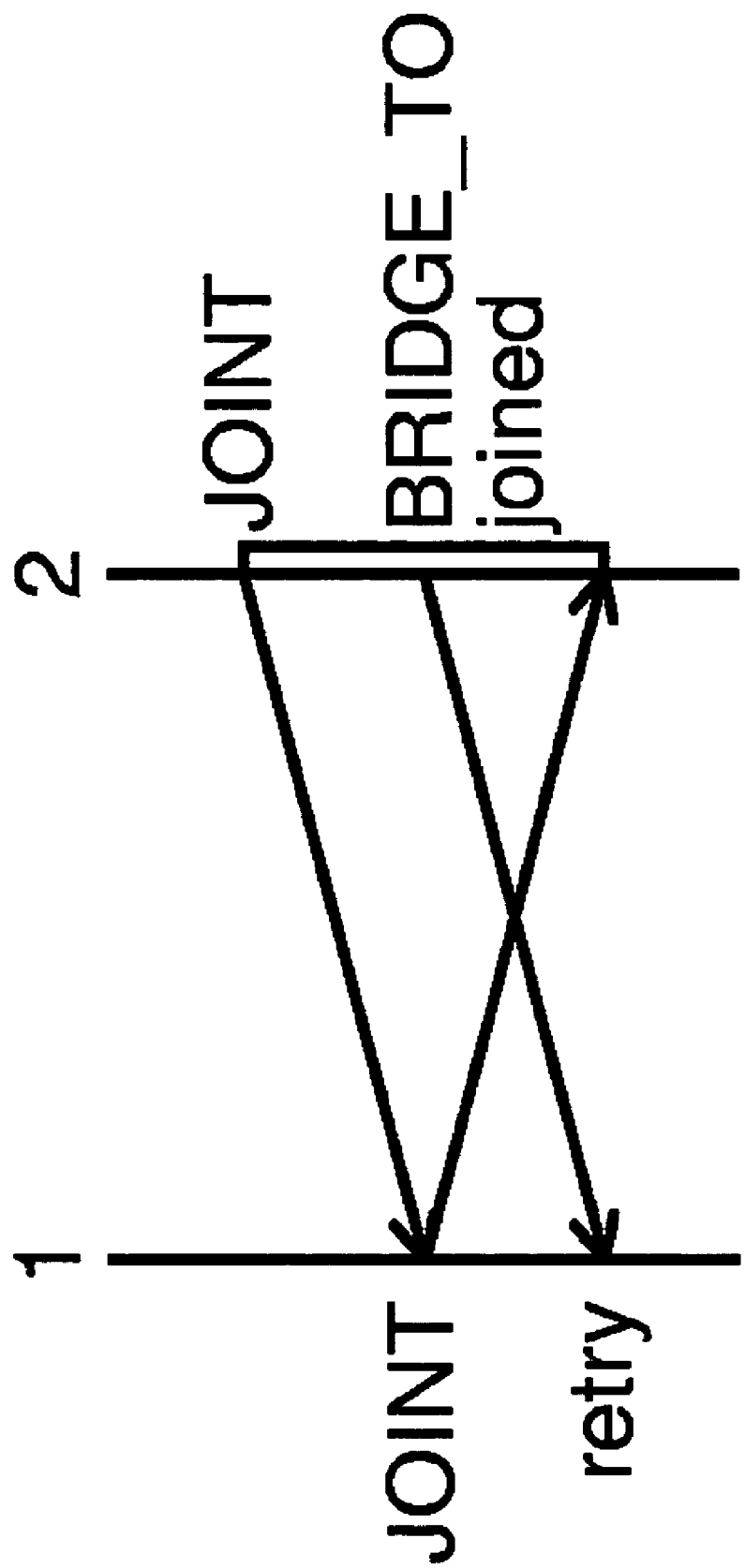
FIG. 38 is a diagram supporting bridging according to an embodiment of the invention.
Figure 39:
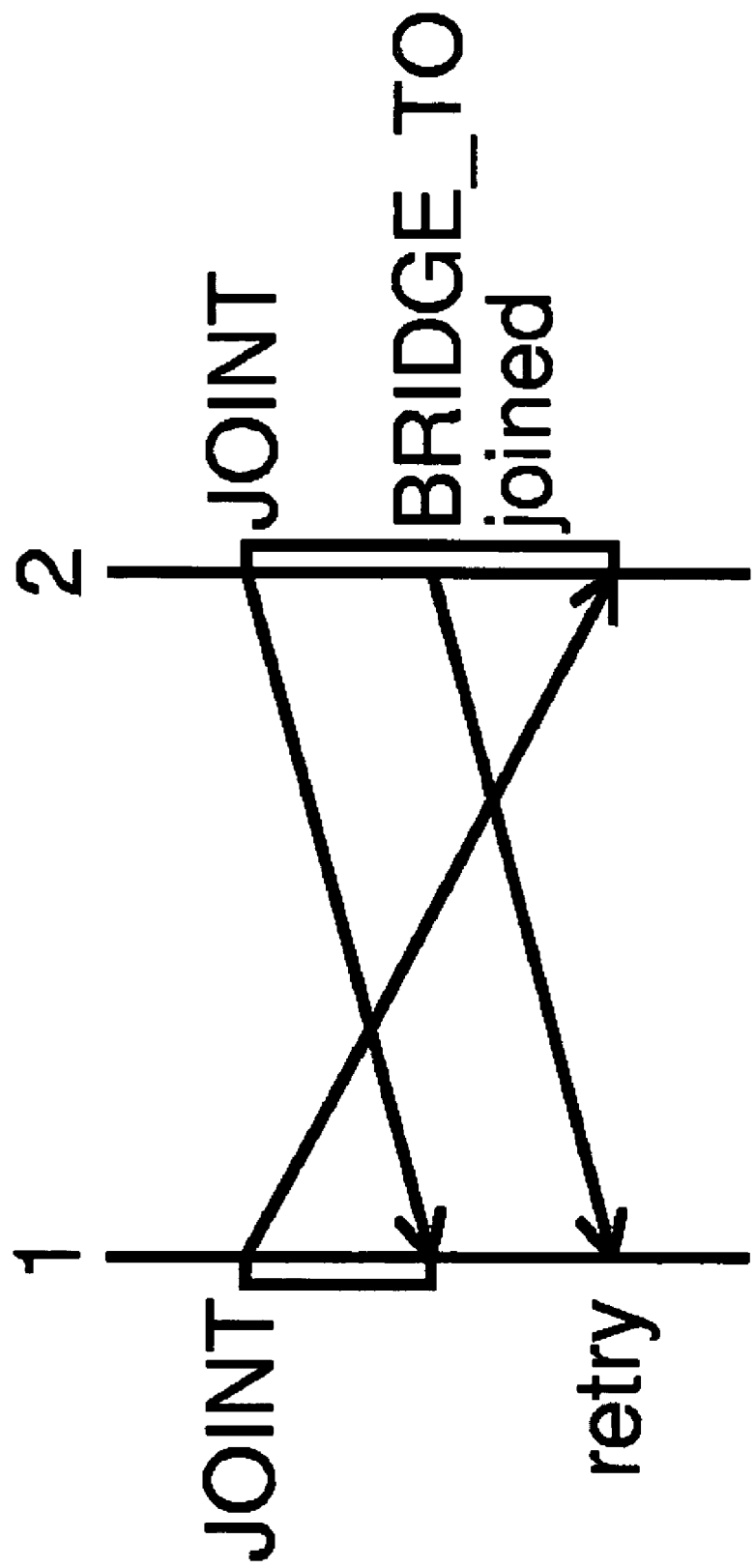
FIG. 39 is a diagram supporting bridging according to an embodiment of the invention.

The following diagrams in FIGS. 37, 38, and 39 show how JOINT interferes with BRIDGE_TO messages. Note that JOINT messages attempting to grant SHRD access are allowed while in recovery. Therefore, the BRIDGE sender may decide to grant some old shared request it keeps. This may include a computer that will answer with a BRIDGE_TO message.

FIG. 37 is a diagram supporting bridging (e.g., BRIDGE_TO/JOINT) according to an embodiment of the invention.

FIG. 38 is a diagram supporting bridging (e.g., BRIDGE_TO/JOINT) according to an embodiment of the invention.

FIG. 39 is a diagram supporting bridging (e.g., BRIDGE_TO/JOINT) according to an embodiment of the invention.

All of the above cases end in a state labeled retry. This means that if computer 1 is still a sick SHRD leader, it has to resend its BRIDGE message. Otherwise, the message is ignored.

Upon receiving a BRIDGE DOWN message, the receiving computer heals itself and sends BRIDGE(issuer) to the computer on its right completing the rollback of the BRIDGE_UP messages.

The HEAL message heals the receiving computer. Normal communication continues.

The LEAD_BRIDGE message transfers leadership in a neighbors set. It is sent from saturated leader to one of its neighbors when that leader becomes sick. The sender enters island mode and heals itself. If the message is received by non-SHRD computer, or the sender is not leader of the computer, the message is ignored. Otherwise, the message is accepted.

Accepting the message means that the receiving computer puts itself as a leader. The receiving computer also sends ISLAND_ACK back as if ISLAND was sent (since the sender has also entered island mode), and gets itself sick—becoming sick leader. The receiver of LEAD_BRIDGE may also be saturated, so it may need to repeat that leadership delegation by also sending LEAD_BRIDGE to some other neighbor and also entering island mode and healing. Island mode helps in the same way as for ISLAND messages. I.e. if the receiver has drained its access and had sent JOINT back (as in FIG. 35), the LEAD_BRIDGE message will be ignored, but the receiver of the JOINT will become sick leader again.

When a computer quits the cluster, NEED, TOKEN, and BRIDGE messages may be lost. Thus, a computer without access has to purge its expectations for access (and resend corresponding NEED requests). A computer without access and without a leader must resend its TOKEN message, and a sick SHRD leader must resend its BRIDGE message.

If the connection between two computers gets lost, and then becomes available, the messages such as NEED, TOKEN, BRIDGE have to be retransmitted too. If these computers happen to be neighbors, they are removed from each computer's neighbor set and the computers get sick as if the other party was down.

It should be noted that, even for single region, recovery processes in parallel, from all the computers that need recovery. The recovery competes even with normal requests, grants and denials. An embodiment of the implementation may defer recovery of computers that had lost one of the computers in their neighbor sets until they become needed. For example computer having NONE access may defer recovery of its leader until the need for that leader arises (either because the computer needs access, or has to forward NEED request). Accordingly, computer with shared access may defer recovery of lost shared link until it becomes to need EXCL access, or some other computer asks it to drain out its access. It may still grant SHRD access without initiating recovery. In any case, when recovery message is received, any postponed recovery must be executed prior to handling the incoming message. Thus, there is no distinguished recovery state: the oplock may have fully operational (healthy) regions, some that have recovery in progress, and some that have sick computers but that need no access increases, and remain sick while other computers intensively change their own access into that region.

As discussed, techniques of the invention are well suited for use in applications in which multiple computers in a networked computer system communicate (e.g., arbitrate negotiate, coordinate, compete, etc.) amongst each other to coordinate access to the same regions of shared storage. The distributed tree structure according to one embodiment reduces a requirement for communications because the tree itself stores a partial history of access rights among the computers in a network. It should be noted that embodiments of the invention are well suited for applications other than those discussed above and thus are not limited to such use.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A computer-implemented method for granting access rights associated with a set of named resources to a given computer, the given computer and multiple other computers being part of a cluster having shared access to the set of named resources, the computer-implemented method comprising:

maintaining current access rights associated with the given computer for the set of named resources, the set of named resources including a first named resource, a second named resource and a third named resource;

associating exclusive access rights to the first named resource for the given computer indicating that the multiple other computers have no associated access rights to the first named resource;

associating no access rights to the second named resource for the given computer indicating that the given computer has no knowledge about access associated with the multiple other computers for the second named resource;

associating shared access rights to the third named resource for the given computer indicating that none of the multiple other computers has associated exclusive access rights to the third named resource;

maintaining a respective sets of identifiers of neighbor computers in the cluster, the respective sets of identifiers forming a respective tree associated with a respective resource, each node in the respective tree representing a computer in the cluster, each computer in the tree having a pointer pointing to computers at a higher level towards a root computer of the tree;

receiving a request by a computer in the tree to obtain access rights with respect to the resource;

in response to receiving the request, modifying the respective tree to change access rights associated with at least one computer in the cluster in response to a request by a computer in the tree to obtain access rights to the respective resource;

upon receiving a request from a particular computer in the cluster for exclusive access to a given shared resource, the request being received at a time when multiple computers including the particular computer have shared access rights to the given shared resource, recording the request for later examination and sending a drain message to computers identified in a neighbors set associated with the given shared resource, the drain message including the request and being sent to the computers identified in the neighbors set to initiate granting of exclusive access rights in the given shared resource to the particular computer; and upon receiving a draining message about a shared resource by a computer that has associated shared access rights for that shared resource, if the corresponding neighbors set contains only an identity of a computer that sent the drain message, performing the following steps:

associating no access rights to the given shared resource for the receiving computer;

assigning the shrinker computer in the received drain message as a leader computer for the given shared resource;

associating a neighbors set containing only the identity of the shrinker computer for the shared resource for the receiving computer; and sending a 'joint' transformation message to the sender of the draining message.

2. A method as in claim 1 further comprising:

maintaining each respective tree to include a root computer in the cluster with other computers having one of the computers in their neighbors set as a leader neighbor for that tree, either pointing directly or indirectly to the root computer via a chain composed of leader neighbors.

3. A method as in claim 1 for ordering processing of conflicting requests for access from computers in the cluster to a particular named resource, the method comprising:

detecting simultaneous access requests from multiple computers in the cluster for access to the particular named resource, where at least one of the access requests is for exclusive access to the particular named resource;

ordering computers within the cluster, based on their corresponding cluster-wide unique identification, wherein ordering is used to resolve conflicts in favor of computers having a higher ranking than other computers in the cluster, a ranking of the computers in the cluster providing an order of among the computers in the cluster;

the cluster-wide unique identification being a stable value regardless of whether other computers are added or removed from the cluster.

4. A method as in claim 3, wherein the access requests are further extended to include a priority value, the method comprising of:

overriding an ordering of the access requests having a different priority value by ordering requests with higher priority over conflicting access requests that have a lower priority value; and maintaining an ordering of access requests that have the same priority value.

5. A method as in claim 4 for deferring processing of conflicting access requests, the method comprising:

for a given shared resource, deferring processing of received access requests for the given shared resource having orders lower than a recorded request for the given shared resource;

the deferring being effective until either of the conflicting access requests is discarded or satisfied;

if a respective higher-priority request gets discarded or satisfied, then processing the deferred request as if the deferred request was just received.

6. A method as in claim 2, wherein a single computer in the cluster has exclusive access rights for a given shared resource while other computers in the cluster have no access rights for the given shared resource, the method further comprising:

maintaining the single computer having exclusive access to the given shared resource as a root computer of a respective tree corresponding to the given shared resource, the root computer associated with no neighbor computers; and maintaining computers other than the single computer in the cluster as having no access rights to the given shared resource in which each of such computers has only a single neighbor computer associated with the given shared resource, the single neighbor computer being a respective leader computer towards the root computer.

7. A method as in claim 6 for transferring exclusive access rights from the single computer having the exclusive access rights for the given shared resource to some other computer in the cluster, the method further comprising steps of:

maintaining a requesting computer having no access rights to a named shared resource to send a request for exclusive access rights for the given shared resource to the respective leader computer associated with a tree of the given shared resource, the request including identification of the requesting computer and a name of the given shared resource for which exclusive access is being requested;

upon receiving the request for exclusive access rights by another computer in the cluster also having no current access rights for the given shared resource as specified by the request, forwarding the need request to a respective leader computer towards a root computer having the exclusive access rights to the given shared resource;

upon receiving the request for exclusive access rights by the root computer currently having the exclusive access rights for the given shared resource which name is specified in the request, changing access rights to no access rights for the receiving root computer for the given shared resource, associating the computer requesting the exclusive access rights to be a leader and only neighbor computer for the given shared resource and sending the requesting computer a lead message indicating that the requesting computer is allowed to associate itself with exclusive access rights for the given shared resource, the message including the name of the shared resource; and upon receiving the lead message associated with the given shared resource at the requesting computer in the cluster, assigning the requesting computer with exclusive access rights for the given shared resource and associating an empty neighbors set for the given shared resource at the requesting computer.

8. A method as in claim 1 wherein at least two computers in the cluster have shared access to a given named shared resource while all other computers, other than the at least two computers, in the cluster have no access rights to the given shared resource, the method comprising:

maintaining a root computer of a tree associated with the given shared resource to be one of the at least two computers that has shared access associated with the given named resource;

maintaining non-root computers to have one of the computers in their neighbors set as a leader neighbor for that three, either pointing directly or indirectly to the root computer via a chain composed of leader neighbors;

maintaining a leader computer associated with the given shared resource for a computer having shared access to the given shared resource to be associated with shared access for the given shared resource;

maintaining a set of neighbor computers associated with the given shared resource for each of the at least two computers that have shared access to the given shared resource, the neighbor sets providing direct or indirect paths from each of these computers to all other computers of the at least two computers that have shared access, all paths traveling only through computers having shared access, the paths provide a bidirectional link between computers having shared access associated with the given shared resource in a corresponding tree; and maintaining a computer to have no access rights to a given shared resource having an identity of single neighbor computer associated with that shared resource, the single neighbor being leader of the computer for that shared resource.

9. A method as in claim 8 for modifying a set of computers associated with shared access for the given shared resource, the method comprising:

sending a joint transformation message containing a name of a shared resource between computers in the cluster;

upon receipt of the transformation message, if a respective receiving computer has no access rights associated with the given shared resource whose name is provided in the transformation message, the respective receiving computer assigns shared access rights with respect to the given shared resource and changes its neighbors set association for the given shared resource to contain an identification of a sender of the joint transformation message as an only element in a set and associates the sender computer as leader neighbor for the shared resource;

upon receipt of the joint transformation message, if the receiving computer has shared access associated with the given shared resource whose name is provided with the joint transformation message and an identification of a respective computer that sent the joint transformation message is included in a neighbors set associated with the given shared resource for the receiving computer, the receiving computer excludes a respective sender of the joint transformation message from the neighbors set; and upon receipt of the joint transformation message, if the receiving computer has shared access associated with the given shared resource whose name is provided with the joint transformation message and the identification of a respective computer that sent the joint transformation message is not included in the neighbors set associated with the given shared resource for the receiving computer, the receiving computer sends the joint transformation message back to an originator of the joint transformation message.

10. A method as in claim 9 for associating shared access rights to the given shared resource for computer having no access rights associated with the given shared resource, the method comprising:

maintaining a requesting computer in the cluster having no access rights to a given shared resource, the requesting computer sending a request for shared access to the given shared resource to a leader computer associated with the given shared resource, the request containing an identifier of the requesting computer and a name of the given shared resource for which shared access is requested;

upon receiving the request for shared access by a computer in the cluster having no current access rights for the given shared resource as specified by the request, forwarding the request to a leader computer in the cluster;

upon receiving the request for shared access by a computer in the cluster having shared access rights for the given shared resource whose name is specified in the request, adding an identifier of the requesting computer in the neighbors set associated with the computer receiving the request and sending the requesting computer a joint transformation message as in claim 9; and upon receiving the request for shared access by a receiving computer in the cluster having exclusive access rights for the given shared resource whose name is specified in the request, associating shared access with the receiving computer for the given shared resource, adding the requesting computer in a neighbors set associated with the receiving computer and sending the requesting computer a joint transformation message.

11. A method as in claim 9 further comprising:

if after handling a received joint transformation message, a neighbor set of the receiving computer associated with the given shared resource whose name as specified in the joint transformation message is empty, assigning exclusive access rights associated with the given shared resource to the receiving computer.

12. A method as in claim 11 for associating exclusive access rights to a given shared resource for a requesting computer in which multiple computers in the cluster currently have shared access rights to the given shared resource, the method comprising:

upon receiving a request for exclusive access by the requesting computer that has shared access rights to the given shared resource, recording the request for later examination and sending a drain message to all computers identified in a neighbors set associated with the given shared resource, the drain message containing a content of the request and identification of a computer receiving the request as a shrinker computer;

upon receiving the drain message by a computer that has associated shared access rights for the given shared resource, if a neighbors set associated with the given shared resource for the computer receiving the drain message contains the identity of the requesting computer that sent the drain message, forwarding the drain message to all other computers identified in the neighbors set and recording the drain message for later examination;

upon receiving a draining message about a shared resource by a computer that has associated shared access rights for that shared resource, if the corresponding neighbors set contains only an identity of a computer that sent the drain message, performing the following steps:

associating no access rights to the given shared resource for the receiving computer, assigning the shrinker computer in the received drain message as a leader computer for the given shared resource, associating a neighbors set containing only the identity of the shrinker computer for the shared resource for the receiving computer, sending a 'joint' transformation message to the sender of the draining message;

upon changing the neighbor set for a computer associated with given named shared resource such that only one computer is contained in the set and there is a recorded draining message containing the name of the shared resource that was received from the computer that remained in the neighbor set, then processing the recorded draining message as if just received and then discarding the record of the draining message;

upon changing the neighbor set for some computer associated with given named shared resource such that a computer is removed from that set and there is a recorded draining message at the given computer for the same shared resource that was sent from the removed computer, discarding the record of the draining message;

upon receiving a draining message about a shared resource by a computer that is not associated with shared access rights for that shared resource or the associated neighbors set does not contain the identity of the computer that sent the message, discarding the message;

upon associating a computer with none or exclusive access rights for given shared resource and if there is recorded request for exclusive access at that computer, processing the request as if just received and then discarding the record.

13. A method as in claim 12 for ordering a processing of conflicting drain messages based on an overall ordering of computers within the cluster based on cluster-wide unique identification associated with the computers in the cluster, where a first drain message orders higher than a second drain message if one of the following is true:

priority associated with the first drain message is higher than a priority associated with the second draining message;

priority associated with the first drain message and the second drain message is the same and the computer requesting access via the first drain message has a higher priority than a computer requesting access via the second drain message;

priority associated with the first drain message and the second drain message and respective requesting computers are equal, the computer recorded as a shrinker computer or drain-starter of the first drain message is the same as the requesting computer and the computer recorded as the shrinker computer of the second drain message differ from the requesting computer;

priority associated with the drain messages and the requesting computers are respectively the same, the computers recorded as shrinkers of the drain messages are different from the requesting computer and the shrinker of the first draining message has a higher priority than the shrinker of the second drain message, the ordering used for comparing shrinkers needing not be the same as the ordering used for comparing requesting computers.

14. A method as in claim 13 for ordering processing of conflicting drain messages, the method further comprising:

maintaining no priority for the drain messages, the ordering then being a fictitious priority.

15. A method as in claim 13 for ordering processing of conflicting drain and need requests, the method comprising:

generating a second drain message corresponding to a need request, the drain message including the need request and having the computer that performs the comparison as a drain-starter;

comparing conflicting drain and need requests in a same way as an original drain message and generated drain message are compared.

16. A method as in claim 12 wherein a respective drain message is received by a computer having shared access rights for the given shared resource, the respective drain message specifying the receiving computer inside the request for exclusive access contained with the respective drain message, the method comprising:

instead of handling the drain respective message, processing a request for exclusive access contained within the respective drain message.

17. A method as in claim 10 allowing upper limit to be set on the size of the neighbor set associated with a named shared resource for given computer, the method comprising:

upon receiving a request for shared access by a computer that is associated with shared access rights for the shared resource which name is specified in the request, if the upper limit on the size of the neighbors set associated with the receiving computer for the shared resource is reached then forwarding the request to one of the computers associated with the neighbor set associated with the shared resource for that computer.

18. A method as in claim 17 wherein, if request for shared access is about to be forwarded as result of corresponding neighbor set being full, the forwarding is not bounced back to the sender of the request, thus preventing cascading forwards caused by full neighbor sets from repeating the same computer.

19. A method as in claim 2 for extending respective shared resource trees associated with corresponding shared resources to include new computers as they are added to the cluster, the method comprising:

associating access rights, leader computers and neighbor sets for new computers added to the cluster for corresponding named shared resources.

20. A method as in claim 19 further comprising:

associating exclusive access rights and empty neighbor sets for every shared resource for a computer that itself forms a cluster.

21. A method as in claim 19 for adding computer into the cluster, the method comprising:

providing communication channels for sending messages between a new computer added to the cluster and all other computers that were present in the cluster prior to adding the new computer to the cluster;

associating no access rights for every named shared resource for the new computer that joins the cluster;

for every named shared resource, associating one of the computers that was present in the cluster prior to adding the new computer to the cluster as a leader computer for the new computer;

associating neighbor sets containing only the identity of a selected leader computer for a corresponding shared resource for the new computer.

22. A computer system which is one of multiple computers in a cluster having access to a given resource in a shared storage system, the computer system comprising:

a processor;

a memory unit that stores instructions associated with an application executed by the processor;

a communication interface that supports communication with other computers having access to the shared storage; and an interconnect coupling the processor, the memory unit, and the communication interface, enabling the computer system to execute the application and perform operations of:

maintaining a storage region for the computer system;

in the storage region, maintaining an identifier associated with the computer system, the identifier being part of a distributed tree associated with the given resource, the identifier pointing to a next successive computer in the cluster in a direction towards a root computer of the distributed tree;

receiving a request for permission to access the given resource in the shared storage system; and in response to receiving the request, forwarding the request from the computer system over a network to the next successive computer as identified by the identifier in order to forward the request in a direction to the root computer and, based on negotiations with the root computer, acquire access rights to the given resource;

upon receiving a request from a particular computer in the cluster for exclusive access to a given shared resources, the request being received at a time when multiple computers including the particular computer have shared access rights to the given shared resources, recording the request for later examination and sending a drain message to computers identified in a neighbors set associated with the given shared resources, the drain message including the request and being sent to the computers identified in the neighbors set to initiate granting of exclusive access rights in the given shared resources to the particular computer;

upon receiving a draining message about a shared resource by a computer that has associated shared access rights for that shared resource, if the corresponding neighbors set contains only an identity of a computer that sent the drain message, performing the following steps:

associating no access rights to the given shared resource for the receiving computer;

assigning the shrinker computer in the received drain message as a leader computer for the given shared resource;

associating a neighbors set containing only the identity of the shrinker computer for the shared resource for the receiving computer; and sending a 'joint' transformation message to the sender of the draining message.

23. A computer program product including tangible computer-readable storage media having instructions stored thereon for processing data information, such that the instructions, when carried out by at least one processing device, enable the at least one processing device to perform the steps of:

maintaining a memory location for each of multiple resources;

in the memory location, maintaining a respective set of identifiers of neighbor computers in the cluster, the respective set of identifiers at least partially defining a respective tree associated with a respective resource of the multiple resources;

receiving a request for permission to access a region of the shared storage system; and in response to receiving the request, forwarding the request from the computer system over a network to at least one of successive computers in the respective tree as identified by the respective set of identifiers of neighbor computers in the memory location in order to acquire access rights to the region of the shared storage system;

upon receiving a request from a particular computer in the cluster for exclusive access to a given shared resource, the request being received at a time when multiple computers including the particular computer have shared access rights to the given shared resource, recording the request for later examination and sending a drain message to computers identified in a neighbors set associated with the given shared resource, the drain message including the request and being sent to the computers identified in the neighbors set to initiate granting of exclusive access rights in the given shared resource to the particular computer;

upon receiving a draining message about a shared resource by a computer that has associated shared access rights for that shared resource, if the corresponding neighbors set contains only an identity of a computer that sent the drain message, performing the following steps:

associating no access rights to the given shared resource for the receiving computer;

assigning the shrinker computer in the received drain message as a leader computer for the given shared resource;

associating a neighbors set containing only the identity of the shrinker computer for the shared resource for the receiving computer; and sending a 'joint' transformation message to the sender of the draining message.

* * * * *